(12) United States Patent
Sloop et al.

(10) Patent No.: US 12,529,721 B2
(45) Date of Patent: *Jan. 20, 2026

(54) METHODS AND SYSTEMS FOR DETECTION AND NOTIFICATION OF POWER OUTAGES AND POWER QUALITY

(71) Applicant: Whisker Labs, Inc., Germantown, MD (US)

(72) Inventors: Christopher Dale Sloop, Mount Airy, MD (US); Robert S. Marshall, Ijamsville, MD (US); Donnie Bixler, Woodsboro, MD (US); Chonglin Liu, Rockville, MD (US)

(73) Assignee: Whisker Labs, Inc., Germantown, MD (US)

( * ) Notice: Subject to any disclaimer, the term of this patent is extended or adjusted under 35 U.S.C. 154(b) by 355 days.

This patent is subject to a terminal disclaimer.

(21) Appl. No.: 18/094,555

(22) Filed: Jan. 9, 2023

(65) Prior Publication Data
US 2023/0160941 A1    May 25, 2023

Related U.S. Application Data

(63) Continuation-in-part of application No. 17/200,241, filed on Mar. 12, 2021, now Pat. No. 11,552,501.
(Continued)

(51) Int. Cl.
*G01R 31/08* (2020.01)
*H02J 13/00* (2006.01)

(52) U.S. Cl.
CPC ......... *G01R 31/086* (2013.01); *G01R 31/088* (2013.01); *H02J 13/00022* (2020.01)

(58) Field of Classification Search
CPC ................. G01R 31/086; G01R 31/088; H02J 13/00022
(Continued)

(56) References Cited

U.S. PATENT DOCUMENTS

| 6,459,997 B1 | 10/2002 | Andersen |
| 7,492,163 B2 | 2/2009 | Restrepo et al. |

(Continued)

FOREIGN PATENT DOCUMENTS

| CN | 102066956 A | 5/2011 |
| CN | 102822689 A | 12/2012 |

(Continued)

OTHER PUBLICATIONS

Invitation to Pay Additional Fees and Annex to Form PCT/ISA/206 issued in International Patent Application No. PCT/US2021/022176 on Jul. 15, 2021.

*Primary Examiner* — Md Azad
(74) *Attorney, Agent, or Firm* — Cesari and McKenna, LLP

(57) ABSTRACT

Described herein are methods and systems for estimating an originating location of a power quality event in an electrical grid. Each of a plurality of sensor devices connected to the electrical grid detects an input signal generated by electrical activity on the electrical grid, generates an output signal based upon the detected input signal, and transmits power quality data to a computing device via a communications network, where the power quality data is based upon the output signal. The computing device is configured to analyze the power quality data from at least a subset of the sensor devices to determine a power quality event occurring in the electrical grid, estimate an originating location of the power quality event based upon the power quality data, and transmit a notification to one or more remote computing devices based upon the estimated originating location of the power quality event.

36 Claims, 44 Drawing Sheets

Related U.S. Application Data

(60) Provisional application No. 62/989,415, filed on Mar. 13, 2020.

(58) Field of Classification Search
USPC .......................................................... 700/295
See application file for complete search history.

(56) References Cited

U.S. PATENT DOCUMENTS

| | | | |
|---|---|---|---|
| 7,804,280 B2 | 9/2010 | Deaver, Sr. et al. | |
| 8,385,038 B2 | 2/2013 | Saito et al. | |
| 9,739,813 B2 | 8/2017 | Houlette et al. | |
| 10,018,701 B2 | 7/2018 | Marshall et al. | |
| 10,354,345 B2 | 7/2019 | Sloop et al. | |
| 10,809,286 B2 | 10/2020 | Micali et al. | |
| 11,146,103 B1 | 10/2021 | Davies et al. | |
| 11,338,107 B2 | 5/2022 | Allen et al. | |
| 2004/0061616 A1 | 4/2004 | Fischer et al. | |
| 2009/0184835 A1 | 7/2009 | Deaver, Sr. et al. | |
| 2009/0187284 A1* | 7/2009 | Kreiss ................... | G06Q 50/06 700/297 |
| 2009/0187285 A1 | 7/2009 | Yaney et al. | |
| 2009/0187358 A1 | 7/2009 | Deaver, Sr. | |
| 2010/0007354 A1* | 1/2010 | Deaver, Sr. ............ | G01R 31/52 324/539 |
| 2010/0191487 A1 | 7/2010 | Rada et al. | |
| 2012/0109545 A1 | 5/2012 | Meynardi et al. | |
| 2013/0241746 A1 | 9/2013 | McKinley et al. | |
| 2014/0281645 A1* | 9/2014 | Sen ......................... | H02J 3/003 713/340 |
| 2014/0340236 A1 | 11/2014 | Rhoads et al. | |
| 2015/0032278 A1* | 1/2015 | Bhageria .................. | H02J 4/00 700/295 |
| 2015/0276825 A1 | 10/2015 | Curt et al. | |
| 2016/0072287 A1* | 3/2016 | Jia .......................... | H02J 3/0073 700/295 |
| 2017/0192042 A1* | 7/2017 | Micali .................... | G05B 15/02 |
| 2018/0024205 A1 | 1/2018 | Kim et al. | |
| 2019/0251641 A1 | 8/2019 | Kagan et al. | |
| 2020/0011903 A1 | 1/2020 | Menzel et al. | |
| 2020/0322703 A1* | 10/2020 | Bures ...................... | G06F 16/27 |
| 2020/0379947 A1 | 12/2020 | Kagan et al. | |
| 2021/0080514 A1 | 3/2021 | Beaudet et al. | |
| 2021/0116517 A1* | 4/2021 | Snook, II ............... | H04L 67/535 |
| 2023/0160941 A1* | 5/2023 | Sloop ................ | H02J 13/00022 324/512 |
| 2025/0013603 A1* | 1/2025 | Kagan .................... | G01D 4/004 |

FOREIGN PATENT DOCUMENTS

| | | |
|---|---|---|
| CN | 106687873 A | 5/2017 |
| EP | 2016657 B1 | 1/2009 |
| JP | 2002-534943 A | 10/2002 |
| JP | 2006-109545 A | 4/2006 |
| JP | 2019-536402 A | 12/2019 |
| WO | 2018073719 A1 | 4/2018 |

* cited by examiner

Power Outage Detection Efficiency

| Month | | |
|---|---|---|
| Nov-19 | 87% | 83% |
| Dec-19 | 90% | 87% |
| Jan-20 | 87% | 71% |
| Feb-20 | 97% | 86% |
| Mar-20 | 100% | 81% |
| Apr-20 | 97% | 93% |
| May-20 | 97% | 90% |
| Jun-20 | 97% | 93% |
| Jul-20 | 97% | 97% |
| Aug-20 | 100% | 100% |
| Sep-20 | 97% | 100% |
| Oct-20 | 95% | 100% |
| Nov-20 | 100% | 100% |
| Dec-20 | 94% | 100% |
| Jan-21 | 97% | 100% |
| Average | 95% | 92% |
| Max | 100% | 100% |
| Min | 87% | 71% |
| Overall Average | 94% | |
| Overall Max | 100% | |
| Overall Min | 71% | |

FIG. 7

EXAMPLE OF SAG JUMP EVENT

EXAMPLE OF SWELL JUMP EVENT

EXAMPLE OF HIGH FREQUENCY FILTER JUMP EVENT

EXAMPLE OF GRID FREQUENCY EVENT

*EXAMPLE OF NOMINAL VOLTAGE READINGS*

EXAMPLE OF LOOSE NEUTRAL – many large positive jumps of voltage

*EXAMPLE OF LOOSE NEUTRAL BEFORE & AFTER RESOLUTION*

EXAMPLE OF VOLTAGE REGULATOR POWER QUALITY EVENT

*EXAMPLE OF FAILING TRANSFORMER POWER QUALITY EVENT*

December 2022

| Utility | CPQI* | | All Events Index | Power Outage Index | Brownout Index | Surges Index |
|---|---|---|---|---|---|---|
| SAN DIEGO GAS & ELECTRIC CO | 0.06 | ▪ | 0.06 | 0.05 | 0.01 | 0 |
| NORTHERN STATES POWER CO - MINNESOTA | 0.08 | ▪ | 0.08 | 0.06 | 0.03 | 0 |
| NEVADA POWER CO | 0.10 | ▪ | 0.10 | 0.07 | 0.03 | 0 |
| SALT RIVER PROJECT | 0.10 | ▪ | 0.10 | 0.08 | 0.01 | 0 |
| CONSUMERS ENERGY CO | 0.12 | ▪ | 0.12 | 0.09 | 0.03 | 0 |
| ARIZONA PUBLIC SERVICE CO | 0.12 | ▪ | 0.11 | 0.08 | 0.03 | 0 |
| WISCONSIN ELECTRIC POWER CO | 0.12 | ▪ | 0.10 | 0.05 | 0.05 | 0 |

FIG. 24A

METHODS AND SYSTEMS FOR DETECTION AND NOTIFICATION OF POWER OUTAGES AND POWER QUALITY

RELATED APPLICATIONS

This application is a continuation-in-part of U.S. patent application Ser. No. 17/200,241, filed on Mar. 12, 2021, which claims priority to U.S. Provisional Patent Application No. 62/989,415, filed on Mar. 13, 2020, the entirety of each of which is incorporated herein by reference.

TECHNICAL FIELD

The subject matter of the application relates generally to methods and systems for detection and notification of power outages and power quality in electrical systems, including but not limited to estimating an originating location of a power quality event in an electrical grid.

BACKGROUND

Consumers continue to rely more heavily on the availability of uninterrupted electricity for a wide variety of activities, such as powering communications devices, computing devices, medical devices, heating and cooling appliances, refrigeration, and the like. However, according to the U.S. Energy Information Administration (EIA), the average U.S. electricity customer was without power for 250 minutes and experienced 1.3 outages of power in 2016. The amount of time a customer was without power nearly doubled in 2017 to an average of 470 minutes (7.8 hours) with an average of 1.4 outages. In 2016 the longest outages were on the order of 20 hours, while in 2017 that number increased to a little higher than 40 hours. Often, these outages are unplanned and in some cases, can go undetected by, e.g., a homeowner who is away from home. These outages can have a significant impact on almost every aspect of daily life—including health and safety—so immediate detection and notification of outages is very important.

Currently available technology for detecting power outages typically relies on the use of a backup battery and/or a generator that can temporarily provide electricity to a power outage detection device and supporting communication equipment. However, batteries have a limited lifetime and add cost to the power outage detection device. Replacement of batteries creates an ongoing maintenance burden for the user. In addition, in some cases, activation of a battery backup could result in an undesirable delay between when the outage begins and when the backup electricity supply is activated and able to provide power to power outage detection device.

Additionally, electrical generation, transmission and distribution systems are getting more complex. The transition to energy sources that produce less carbon dioxide ($CO_2$) means there will be a combination of many different generation methods including wind, solar, nuclear, battery, natural gas and coal. Homes and businesses will increasingly have on-premises methods of generating energy and all of these generation systems are superimposed on an electrical grid with various levels of aging and exposure to the environment. Switching between various generation types can cause surges and sags in voltage, and other power quality concerns. Aging and environmental exposure causes transformers and electrical inter-connections to deteriorate and fail. Surges, sags and deteriorating equipment can cause home electronics and appliances to fail as well as create very dangerous situations where electrocution and electrical fires can occur. In a residential setting, fires often begin in walls or other hidden cavities and gain significant heat and headway before they are detected by home occupants or smoke detectors, leading to significant damage. Electrical malfunctions are one of the leading causes of residential home fires. Because of the hidden nature of the ignition source, electrical fires are also a disproportionate cause of death. Electrical fires are estimated to cause 420 deaths, 1,370 injuries, and $1.4B in residential damages annually.

Current technology does not provide a homeowner with much needed information about the quality of power they receive from the utility. For example, a homeowner may be aware of lights flickering or frequent loss of sensitive electronics equipment without being alerted to very serious issues in the electrical connection to their home or within the home's electrical network. Furthermore, damage to and deterioration of the United States electric grid is increasing the hazard risk and economic liability for the grid's utility owners and their industrial, commercial, and residential customers. For example, a recent Pacific Gas & Energy (PG&E) Fire Incident Data Report shows that PG&E experienced over 2,400 grid-caused fires from 2014 through 2019. These fires resulted in excess of $13B in liability and precipitated PG&E's filing for bankruptcy. In another recent report, the Electric Power Research Institute (EPRI) highlighted the significant negative economic impact that power quality issues have on commercial and industrial enterprises—finding that the estimated total annual cost of power quality events to all U.S. business establishments may be roughly $145.17B to $230.43B. See A. Wright, "Societal Costs of Power Quality Disturbances," EPRI PQ Tech Watch, July 2022.

In another example, a Texas Wildfire Mitigation Project study found that 4,000 fires, most local and of little consequence, but also larger conflagrations, were caused by utility transmission or distribution system events taking place in a period of less than four years preceding that study. In addition to wildfires, increases in transformer fires and explosions and other catastrophic grid events are linked to deteriorating utility equipment. In one horrific example, in mid-July of 2019 firefighters were called to downtown Madison, Wisconsin, where a high-voltage transformer had exploded and caught fire. Another recent event was the American Electric Power (AEP) Texas substation transformer explosion and fire at the end of July 2019. Finally, in February 2021, the state of Texas experienced a devastating failure of its power grid due to a severe winter storm, resulting in loss of life and millions of people without electricity in below-freezing temperatures.

As noted above, utility grid-caused fires have resulted in very large economic damage, and often significant mortality, every year. Many power system components (e.g., switches, insulators, transformers) provide trouble-free service for decades, but transmission and distribution components eventually fail. Wildfires and other damage to property and life can be triggered via a number of mechanisms including downed lines, vegetation contact, conductor slap, arcing of damaged or deteriorating equipment, repetitive faults, and apparatus failures. Therefore, rapid detection and mitigation of these issues is crucial to preventing catastrophic fire events.

SUMMARY

Therefore, what is needed are methods and systems for detecting power outages and power quality issues in electrical systems in real time or near real time, and for notifying relevant users (including electrical grid operators, business owners, residential users, and/or governmental officials) of the outages and/or undesirable changes in power quality or hazardous conditions in the electrical system. The techniques described herein advantageously provide for the detection of power outages, evaluation of power quality, and identification of electrical system hazards—including originating locations in the grid for such power quality issues and hazards—based upon detected frequency of alternating current (AC) electricity received by a sensor device, and also provide for immediate notification of the power outages to remote devices—including in some embodiments, using communication equipment that is powered by the electrical system that experiences the outage right before the communication equipment goes offline due to the outage. Also, in some embodiments, the methods and systems described herein leverage a single monitoring device, or a few monitoring devices, that plug into an existing electrical outlet—instead of complicated, expensive, or dangerous installation of other power outage detection devices and/or monitoring components (such as connecting to circuit breakers or electrical panels). The technology described herein not only beneficially provides homeowners and business owners insight into power quality and potential for hazards, but with multiple homes using the methods and systems described herein, the technology provides insight to utilities about any issues and give them the ability to be proactive to fix issues before a hazard becomes dangerous.

Generally, the U.S. electrical grid and components that connect to it are designed to adhere to certain power quality standards that are developed by a range of different organizations, including but not limited to the Institute of Electrical and Electronics Engineers (IEEE), American National Standards Institute (ANSI), and Underwriters Laboratories (UL). As just one example, ANSI C84.1 establishes nominal voltage ratings and operating tolerances for 60 Hz electric power systems above 100V, including preferred voltage ratings up to and including 1,200 kV maximum system voltage. ANSI C84.1 establishes standards such as the steady state voltage delivery window of +/−5% at the point of delivery, recommends a tolerance window of +6% and −13% for end use equipment, and establishes a tolerance window for voltage unbalance of +/−3%.

Power quality events can occur when power generated, transmitted and/or delivered by the electrical grid deviates from the applicable standards and recommended practices. As described herein, the term "power quality event" describes any of a number of ongoing, recurring, or transient events or conditions occurring in the electrical grid that affect the transmission of, and/or characteristics of, the electricity being delivered through the electrical grid to various devices and systems connected to the grid (including but not limited to homes, businesses, utilities, and distributed energy resources (DERs)).

It should be appreciated that power quality events include faults and other abnormal currents, as well as changes in power quality in the grid resulting from normal operation of the grid (such as switching generation or rerouting power). In general terms, power quality can be measured and assessed through a variety of electrical characteristics, including but not limited to voltage, frequency, amplitude, harmonics, and/or waveform characteristics. A non-exhaustive list of power quality events that can be identified by the systems and methods herein include surge events, surge jump events, sag events, sag jump events, a brownout event, a swell jump event, a high frequency (HF) filter jump event, a frequency jump event, a phase angle jump event, a high voltage condition event, a low voltage condition event, an equipment failure event (e.g., a transformer overload or failure), a vegetation interference event, a conductor slap event, an electrical arcing event, a flicker event, a voltage regulator event, a recloser event, or a DER stress event. Other types of events or conditions occurring in the electrical grid can also be considered power quality events for the purposes of this disclosure, and the above should not be construed as limiting the scope of the technology described herein.

The invention, in one aspect, features a system for detection and notification of electrical power outages. The system comprises a sensor device coupled to a circuit and a server computing device. The sensor device periodically transmits a keepalive packet to the server computing device. The sensor device detects an input signal generated by electrical activity on the circuit. The sensor device generates an output signal based upon the detected input signal. The sensor device monitors the generated output signal during each of a plurality of clock cycles having a predefined duration. During each clock cycle, the sensor device determines whether a rising edge occurred in the generated output signal and transmits a fault packet to the server computing device when the rising edge occurred prior to a predetermined clock value in the clock cycle or when no rising edge occurred in the clock cycle. The sensor device initiates a new clock cycle. The server computing device receives the fault packet from the sensor device. The server computing device listens for one or more keepalive packets from the sensor device. The server computing device transmits a power outage notification to one or more remote computing devices when no keepalive packets are received from the sensor device for at least a defined time period after the fault packet is received. The server computing device transmits a power restoration notification to the one or more remote computing devices when one or more keepalive packets are subsequently received from the sensor device after the power outage notification is transmitted.

The invention, in another aspect, features a computerized method of detection and notification of electrical power outages. A sensor device coupled to a circuit periodically transmits a keepalive packet to a server computing device. The sensor device detects an input signal generated by electrical activity on the circuit. The sensor device generates an output signal based upon the detected input signal. The sensor device monitors the generated output signal during each of a plurality of clock cycles having a predefined duration. During each clock cycle, the sensor device determines whether a rising edge occurred in the generated output signal and transmits a fault packet to the server computing device when the rising edge occurred prior to a predetermined clock value in the clock cycle or when no rising edge occurred in the clock cycle. The sensor device initiates a new clock cycle. The server computing device receives the fault packet from the sensor device. The server computing device listens for one or more keepalive packets from the sensor device. The server computing device transmits a power outage notification to one or more remote computing devices when no keepalive packets are received from the sensor device for at least a defined time period after the fault packet is received. The server computing device transmits a power restoration notification to the one or more remote computing devices when one or more keepalive packets are subsequently received from the sensor device after the power outage notification is transmitted.

Any of the above aspects can include one or more of the following features. In some embodiments, the input signal comprises an alternating current (AC) voltage sine wave with a plurality of zero crossings. In some embodiments, the output signal is a voltage curve having a plurality of rising edges corresponding to the zero crossings of the input signal. In some embodiments, the keepalive packet comprises power quality data including one or more of: root mean square (RMS) voltage, frequency of the voltage sine wave, relative phase angle of the voltage sine wave, amplitude of the voltage sine wave harmonics, or any number of measures of high frequency noise amplitude. In some embodiments, each clock cycle has a predefined duration of 9 milliseconds. In some embodiments, the predetermined clock value in the clock cycle is 8.33 milliseconds.

The invention, in another aspect, features a system for detection and notification of electrical power quality. The system comprises one or more sensor devices coupled to a circuit and a server computing device. The one or more sensor devices detect an input signal generated by electrical activity on the circuit. The one or more sensor devices generate an output signal based upon the detected input signal. The one or more sensor devices transmit power quality data to the server computing device, the power quality data based upon the output signal. The server computing device receives the power quality data from the one or more sensor devices. The server computing device analyzes the power quality data in conjunction with historical power quality data received from the one or more sensor devices to detect one or more power quality events. The server computing device transmits a power quality notification to one or more remote computing devices based upon the detected power quality events.

The invention, in another aspect, features a computerized method of detection and notification of electrical power quality. A sensor device coupled to a circuit detects an input signal generated by electrical activity on the circuit. The sensor device generates an output signal based upon the detected input signal. The sensor device transmits power quality data to a server computing device, the power quality data based upon the output signal. The server computing device receives the power quality data from the sensor device. The server computing device analyzes the power quality data in conjunction with historical power quality data received from the sensor device to detect one or more power quality events. The server computing device transmits a power quality notification to one or more remote computing devices based upon the detected power quality events.

Any of the above aspects can include one or more of the following features. In some embodiments, the detected one or more power quality events comprise one or more of: surge events, surge jump events, sag events, sag jump events, brownout events, swell jump events, high frequency (HF) filter jump events, frequency jump events, recurring power quality problems, phase angle jump events, loose neutral events, or generator activation events. In some embodiments, the server computing device further correlates (i) the detected one or more power quality events with zero or more external events and/or (ii) a detected power quality event from a first sensor device with a detected power quality event from one or more other sensor devices.

In some embodiments, the server computing device detects a loose neutral event by: analyzing, for a single sensor device, a number and amplitude of surge events, surge jump events, and sag events recorded by the single sensor device within a predetermined time period which do not correlate with matching power quality events from any other sensor devices in proximity to the single sensor device; and generating a loose neutral event when an average number of the surge events is greater than a first defined number per day, or an average number of the surge jump events having a magnitude greater than a defined percentage of a nominal voltage is greater than a second defined number per day, or an average number of the sag events is greater than a third defined number per day.

In some embodiments, the output signal comprises one or more of: root mean square (RMS) voltage, frequency of the voltage sine wave, relative phase angle of the voltage sine wave, amplitude of the voltage sine wave harmonics, or any number of measures of high frequency noise amplitude. In some embodiments, the server computing device detects a surge event by: analyzing a plurality of sequential data points of RMS voltage from one or more sensor devices; and generating a surge event when the RMS voltage is greater than a predefined threshold percentage of a nominal voltage for a number of consecutive data points. In some embodiments, the predefined threshold percentage varies based upon the number of consecutive data points in which the RMS voltage is greater than a minimum threshold percentage.

In some embodiments, the server computing device detects a brownout event by: analyzing a plurality of sequential data points of RMS voltage from one or more sensor devices; and generating a brownout event when the RMS voltage is less than a predefined threshold percentage of a nominal voltage for a number of consecutive data points. In some embodiments, the predefined threshold percentage varies based upon the number of consecutive data points in which the RMS voltage is less than a minimum threshold percentage.

In some embodiments, the server computing device detects a sag jump event by: analyzing a plurality of sequential data points of RMS voltage from one or more sensor devices; and generating a sag jump event for each of one or more drops of RMS voltage that occurred in the plurality of sequential data points and that are larger than a predefined threshold percentage of a nominal voltage.

In some embodiments, the server computing device detects a swell jump event by: analyzing a plurality of sequential data points of RMS voltage from one or more sensor devices; and generating a swell jump event for each of one or more increases of RMS voltage that occurred in the plurality of sequential data points and that are larger than a predefined threshold percentage of a nominal voltage.

In some embodiments, the server computing device detects a HF Filter jump event by: analyzing a plurality of sequential data points of HF amplitude data from one or more sensor devices; calculating a mean of the HF amplitude data; and when the mean is greater than one, generating an HF Filter jump event when the HF amplitude data increases by more than a threshold multiple of the mean, or when the mean is less than one, generating an HF Filter jump event when the HF amplitude data increases above a predefined threshold.

In some embodiments, the server computing device detects a frequency jump event by: analyzing a plurality of sequential data points of frequency data from one or more sensor devices; calculating an average of the frequency data; calculating a standard deviation of the frequency data; and generating a frequency jump event when the frequency increases by more than a predefined threshold from the average, or generating a frequency jump event when (i) the standard deviation changes from less than a first frequency to greater than a second frequency or (ii) the standard deviation changes from greater than the second frequency to less than the first frequency.

In some embodiments, the server computing device detects a generator activation event by: analyzing, for a single sensor device, whether any power outage events and frequency events were detected by the single sensor device during a predetermined time period; and generating a generator activation event when the single sensor device detected a power outage event followed by a frequency standard deviation change to greater than a predefined threshold within a defined period of time of the power outage event and the frequency standard deviation change was not associated with a correlated external event.

In some embodiments, the one or more external events comprise lightning activity events, electrical grid monitoring events, and energy pricing events. In some embodiments, the detected power quality event from the first sensor device and the detected power quality event from one or more other sensor devices are of a same event type. Such power quality events that have the same event type (including but not limited to the same or similar power quality characteristics, durations, start times, stop times, geographic locations, and the like) are referred to herein as "correlated events" or "matching events."

The invention, in another aspect, features a system for estimating an originating location of a power quality event in an electrical grid. The system includes a plurality of sensor devices connected to the electrical grid, each sensor device configured to detect an input signal generated by electrical activity on the electrical grid, generate an output signal based upon the detected input signal, and transmit power quality data to a computing device via a communications network, where the power quality data is based upon the output signal. The computing device is configured to analyze the power quality data from at least a subset of the sensor devices to determine a power quality event occurring in the electrical grid, estimate an originating location of the power quality event based upon the power quality data, and transmit a notification to one or more remote computing devices based upon the estimated originating location of the power quality event.

The invention, in another aspect, features a computerized method of estimating an originating location of a power quality event in an electrical grid. Each of a plurality of sensor devices connected to the electrical grid detects an input signal generated by electrical activity on the electrical grid, generates an output signal based upon the detected input signal, and transmits power quality data to a computing device via a communications network, where the power quality data is based upon the output signal. The computing device is configured to analyze the power quality data from at least a subset of the sensor devices to determine a power quality event occurring in the electrical grid, estimate an originating location of the power quality event based upon the power quality data, and transmit a notification to one or more remote computing devices based upon the estimated originating location of the power quality event.

Any of the above aspects can include one or more of the following features. In some embodiments, analyzing the power quality data from at least a subset of the sensor devices to determine a power quality event occurring in the electrical grid comprises generating a signature based upon the power quality data received from the subset of the sensor devices, and comparing the generated signature to one or more known power quality event signatures to determine a type of the power quality event. In some embodiments, the power quality event comprises one or more of: a surge event, a surge jump event, a sag event, a sag jump event, a brownout event, a swell jump event, a high frequency (HF) filter jump event, a frequency jump event, a phase angle jump event, a high voltage condition event, a low voltage condition event, an equipment failure event, a vegetation interference event, a conductor slap event, an electrical arcing event, a flicker event, a failing transformer event, or a distributed energy resource (DER) stress event.

In some embodiments, when the power quality event is a DER stress event, the step of generating an output signal based upon the detected input signal comprises determining a harmonic component associated with a waveform detected in the input signal and including a representation of the harmonic component in the output signal. In some embodiments, the harmonic component comprises a total harmonic distortion (THD) reading associated with the waveform detected in the input signal. In some embodiments, the computing device determines that the DER stress event is occurring in the electrical grid based upon the harmonic components determined by the sensor devices. In some embodiments, the computing device estimates the originating location of the DER stress event based upon the physical locations of the sensor devices that determine the harmonic components. In some embodiments, the DER stress event is attributed to one or more of: a photovoltaic resource connected to the electrical grid, an energy storage resource connected to the electrical grid, or a wind energy generation resource connected to the electrical grid.

In some embodiments, estimating an originating location of the power quality event based upon the power quality data comprises selecting two or more sensor devices each associated with power quality data having one or more common features and estimating the originating location of the power quality event based upon the physical locations of the selected sensor devices. In some embodiments, the one or more common features comprise one or more of: relative amplitudes of the input signals detected by the two or more sensor devices, relative times of arrival of the input signals detected by the two or more sensor devices, or location coordinates of the two or more sensor devices.

In some embodiments, the computing device is further configured to determine a phase of the detected input signal based upon the power quality data. In some embodiments, when the power quality event is an equipment failure event, the server computing device is further configured to identify one or more components of the electrical grid causing the equipment failure event based upon the power quality data. In some embodiments, the components of the electrical grid comprise a plurality of devices including one or more of substations, feeder lines, capacitor banks, transformer taps, voltage regulators, or circuit breakers. In some embodiments, the computing device is further configured to generate a topology of at least a portion of the electrical grid based upon the power quality data received from at least a subset of the plurality of sensor devices. In some embodiments, the computing device is further configured to measure resiliency of the electrical grid in a geographic location based upon power quality events associated with the geographic location. In some embodiments, the computing device associates one or more power quality events with the geographic location based upon power quality data received from at least a subset of the sensor devices associated with the geographic location. In some embodiments, the computing device generates a power quality index for one or more utilities in the geographic location based upon the power quality events associated with the geographic location. In some embodiments, the computing device generates a ranking of the one or more utilities in the geographic region based upon the power quality index associated with each utility Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 7 is a diagram which shows the results of testing the detection efficiency of the sensor device.

FIG. 24A is a diagram of an exemplary power quality ranking grid generated by the server computing device from power quality data.

DETAILED DESCRIPTION

Figure 1:
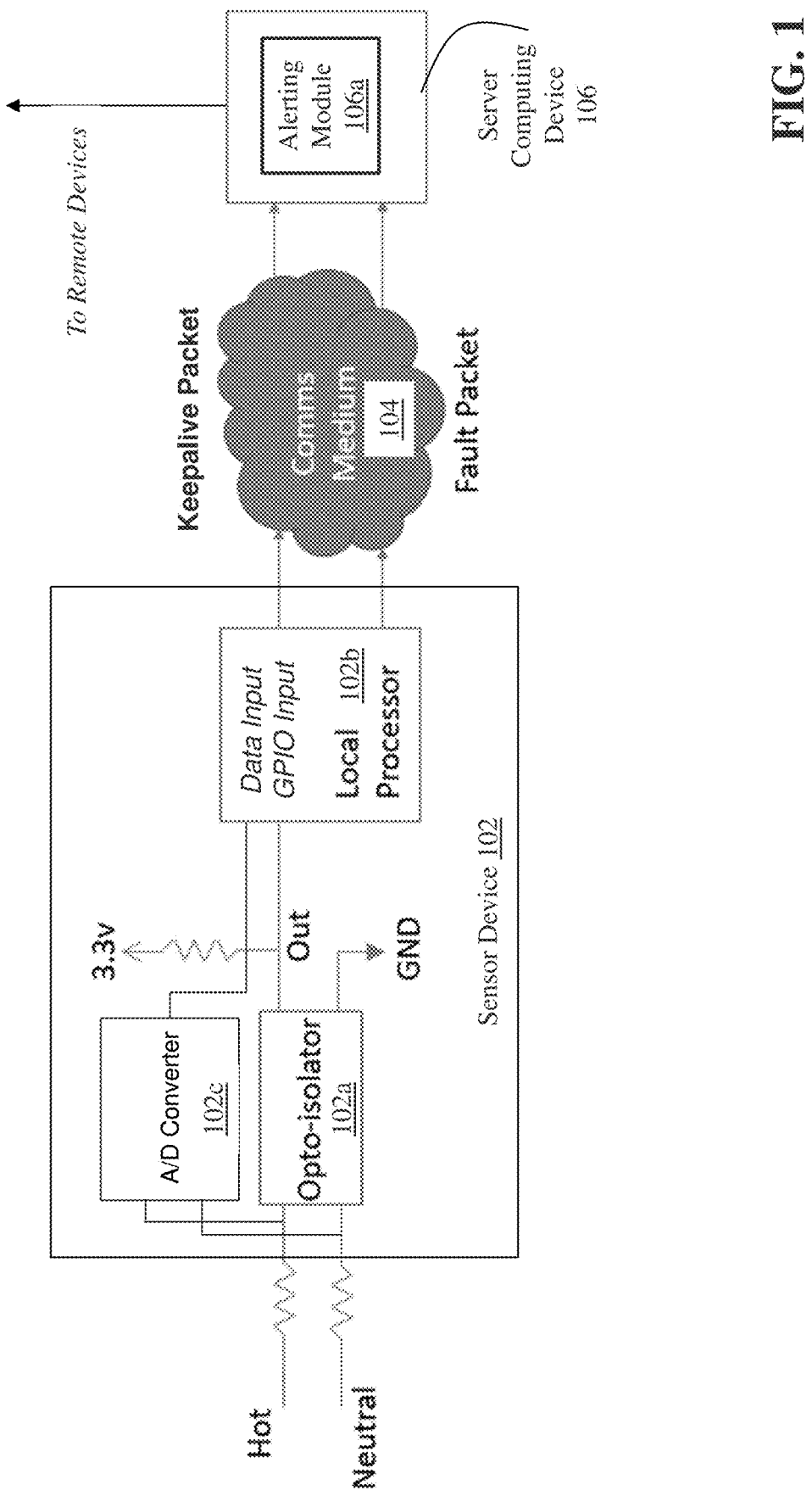
FIG. 1 is a block diagram of a system for detection and notification of electrical power outages.
Figure 3:
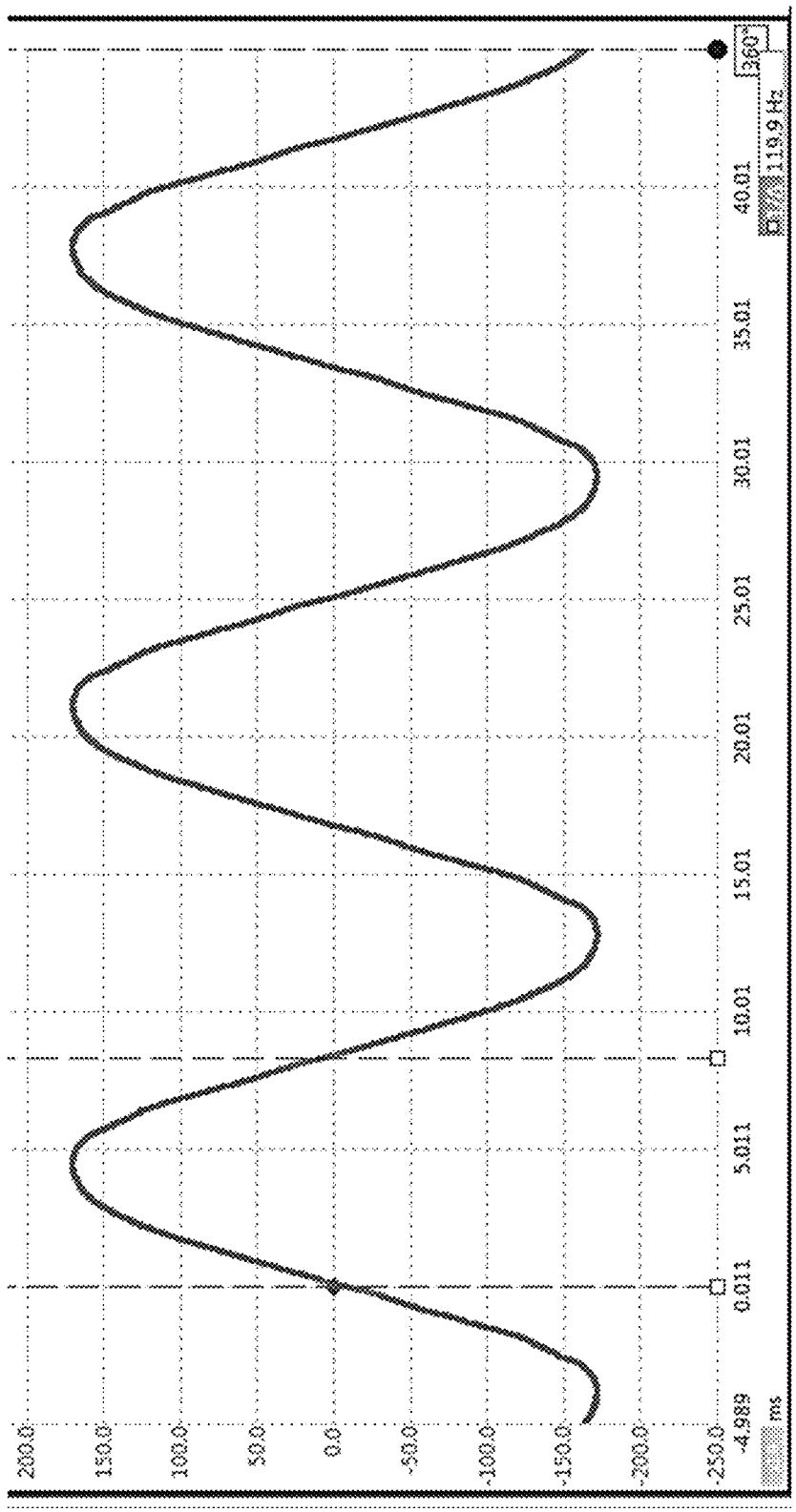
FIG. 3 is a diagram of an exemplary 60 Hz voltage signal captured by the sensor device.

FIG. 1 is a block diagram of a system 100 for detection and notification of electrical power outages. System 100 includes a sensor device 102, a communications medium 104, and a remote computing device 106. The sensor device 102 comprises an opto-isolator 102a that connects to the hot wire and neutral wire of the electrical power system in order to monitor electrical current (e.g., 120 VAC, 60 Hz) for the purposes described herein. The opto-isolator 102a is also connected to a ground (GND). An exemplary 60 Hz voltage signal captured by the sensor device is shown in FIG. 3. Opto-isolator 102a generates an output signal (Out) based upon the received electrical current that is provided to a processor 102b of the sensor device 102. The processor 102b analyzes the output signal from the opto-isolator 102a and transmits data (e.g., packet-based communication) to a server computing device 106 which, based upon the data received from the sensor device 102, can transmit outage notifications and/or power quality data to one or more remote computing devices (not shown). An exemplary power sensor device 102 is the Ting™ Sensor available from Whisker Labs, Inc. of Germantown, Maryland.

The sensor device 102 also contains an Analog-to-Digital (A/D) converter 102c which reads input signals from the hot wire and neutral wire. In some embodiments, the input signals may be filtered or transformed prior to the signals being read by the A/D converter 102c. The A/D converter 102c generates certain power quality data to transmit to the server, including but not limited to RMS Voltage, Peak Voltage, Frequency, Phase, High Frequency (HF) amplitude, total harmonic distortion (THD), and amplitudes of harmonics. It can be appreciated that other power quality measures can be calculated and this list is not meant to be exhaustive. Power quality data is transmitted regularly to the server computing device at a regular time interval and in some embodiments, the power quality data is included as part of the "keepalive packet" shown in FIG. 1 and described herein. In some embodiments, the power quality data is transmitted to the server computing device 106 independently of the keepalive packet.

The communications medium 104 enables the other components of the system 100 to communicate with each other in order to perform the process of detection and notification of electrical power outages as described herein. The medium 104 may be a local network, such as a LAN including one or more components (e.g., routers, modems) connected to the electrical wiring that is being monitored by the system 100, or a wide area network, such as the Internet and/or a cellular network. In some embodiments, the network 104 is comprised of several discrete networks and/or sub-networks (e.g., cellular to Internet) that enable the components of the system 100 to communicate with each other. The communications medium 104 can comprise wired and/or wireless components.

The server computing device 106 is a combination of hardware, including one or more special-purpose processors and one or more physical memory modules, and specialized software modules that are executed by a processor of the server computing device 106, to receive data from other components of the system 100, transmit data to other components of the system 100, and perform functions for detection and notification of electrical power outages as described herein. In some embodiments, the server computing device 106 comprises an alerting module 106a, which is a specialized set of computer software instructions programmed onto a dedicated processor in the server computing device 106 and can include specifically-designated memory locations and/or registers for executing the specialized computer software instructions. Further explanation of the specific processing performed by the alerting module 106a will be provided below.

As can be appreciated, in some cases it is beneficial to correlate other outside events (e.g., events that are external to the power grid/power system) with power quality events. For example, if a lightning strike is closely correlated with a surge power quality event, then the system 100 can issue a more urgent notification warning to the end user (e.g., a visual and audible alert message on multiple end user devices), especially if the amplitude of the surge event is at an amplitude which could cause significant damage to appliances in the home. A homeowner may be extra vigilant to monitor immediate hazards in the home if he or she knows that a very strong surge was caused by a direct hit of a lightning strike. It may also be beneficial to correlate power quality events with other grid monitoring devices such as an automatic circuit recloser device. In this way, a utility could utilize the technology described herein to correlate events from the recloser device to power quality events in a home or business. External events can be correlated with power quality events to limit the distribution or to elevate the criticality of the notification to the end users.

In some embodiments, the sensor device 102 is coupled via a 120 VAC plug to an electrical outlet of a branch circuit in a building electrical system, which in turn is connected to a utility power grid. Although FIG. 1 depicts a single sensor device 102, it should be appreciated that the system 100 can comprise two or more sensor devices positioned to sense electrical activity in a power distribution system. Multiple sensors sending data to a server computing device can provide increased sensitivity and work together to provide information on the power outages and power quality of the electrical system and/or power grid. It should be further appreciated that a single location (e.g., a home) may have multiple sensor devices installed, and also that the system 100 can be configured to receive data from a plurality of sensor devices each installed in a different location (as described below with respect to FIG. 9).

As noted above, the sensor device 102 is communicably coupled to server computing device 106 via a communication medium 104. In one embodiment, the sensor device 102 is equipped with communication components (e.g., antenna, network interface circuitry) that enable the sensor device 102 to communicate with the server computing device 106 via a short-range and/or long-range wireless connection (i.e., using wireless components such as routers and/or modems of the communication medium 104).

Figure 2A:
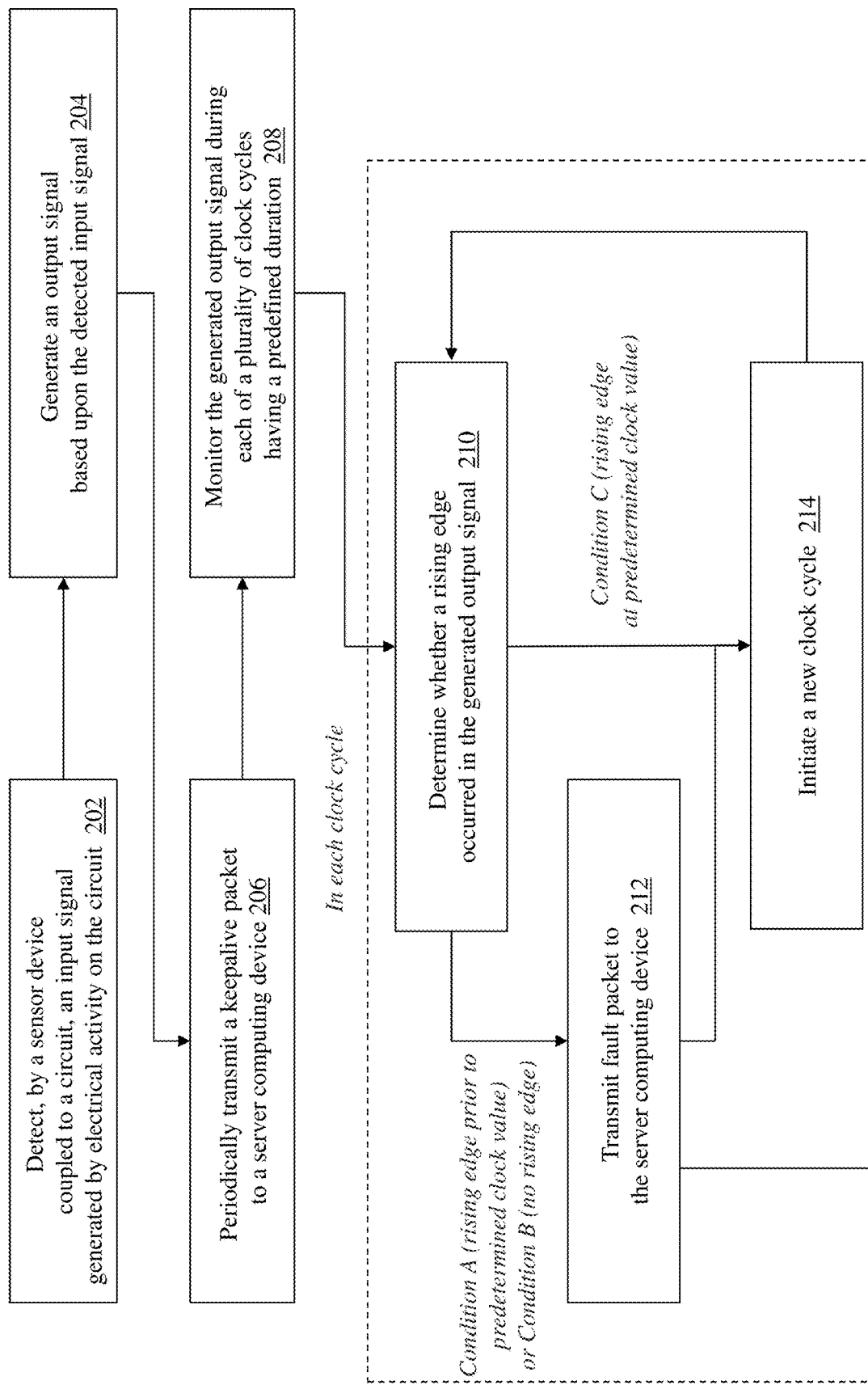
FIGS. 2A and 2B comprise a flow diagram of a computerized method of detection and notification of electrical power outages.
Figure 2B:
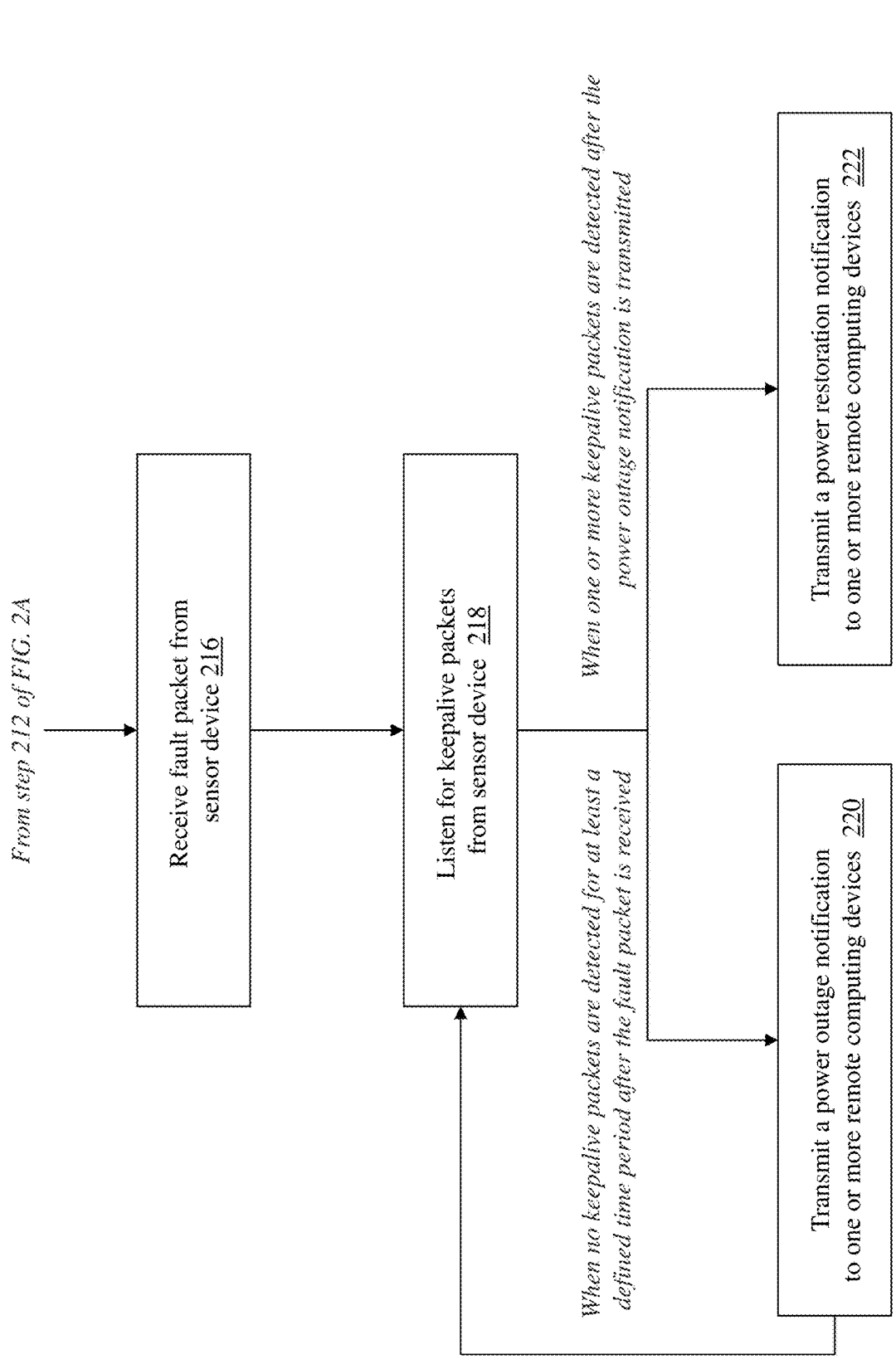
Figure 4:
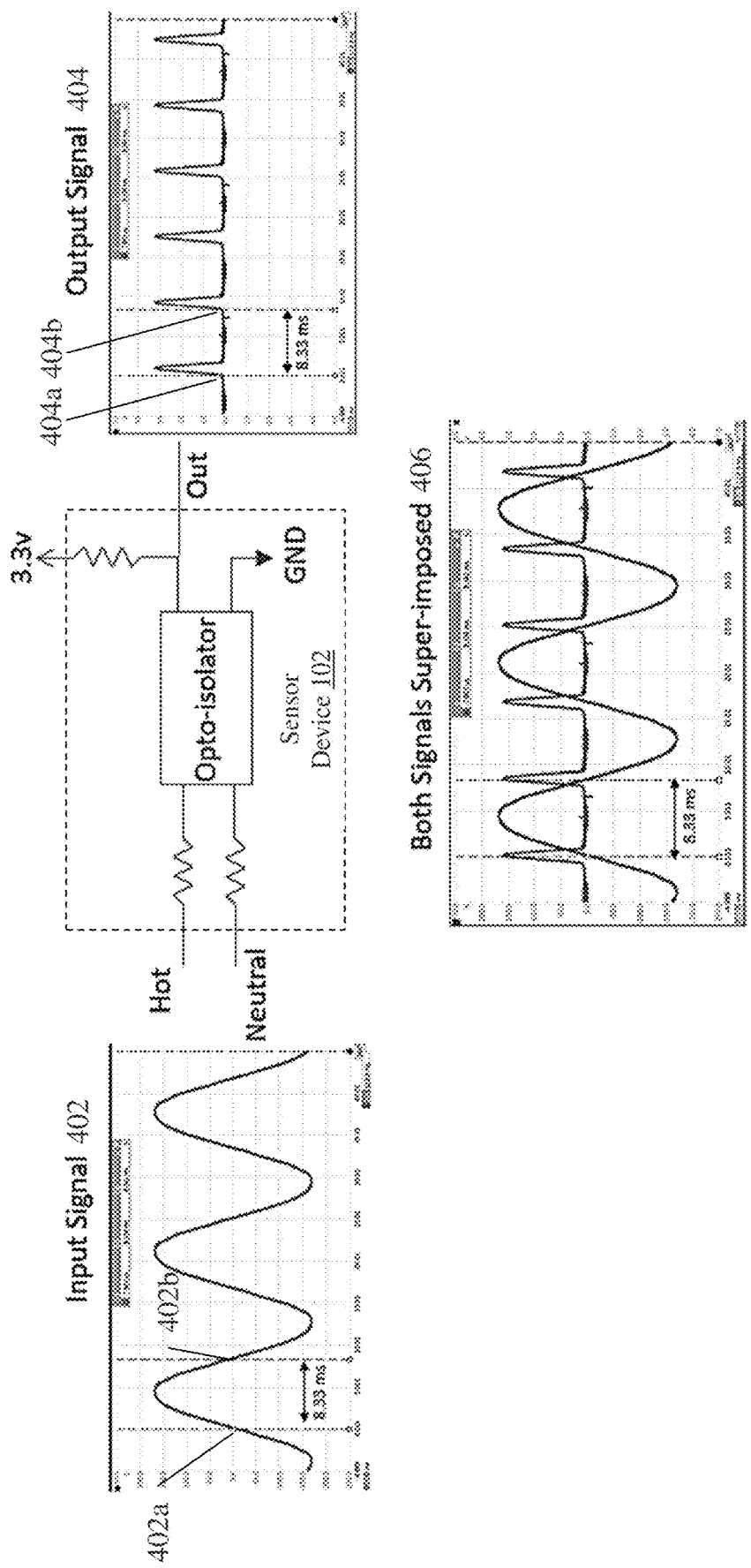
FIG. 4 is a diagram of an exemplary input signal received by the sensor device and an exemplary output signal generated by the sensor device.

FIGS. 2A and 2B comprise a flow diagram of a computerized method 200 of detection and notification of electrical power outages, using the system 100 of FIG. 1. A sensor device (e.g., sensor device 102), coupled to a branch circuit of a power distribution system, detects (202) an input signal generated by electrical activity on the branch circuit. The sensor device 102 generates (204) an output signal based upon the detected input signal. FIG. 4 is a diagram of an exemplary input signal 402 received by the sensor device 102 and an exemplary output signal 404 generated by the sensor device 102. As shown in FIG. 4, the input signal 402 comprises a typical alternating current (AC) voltage signal (such as an AC sine wave) with zero crossings (e.g., 402a, 402b) occurring approximately 8.33 milliseconds (ms) apart.

The opto-isolator 102a of sensor device 102 receives the input signal 402 via the hot and neutral connections to the power distribution system (including the electrical grid) and converts the input signal 402 into the output signal 404. As shown in FIG. 4, the output signal 404 comprises a voltage curve having a plurality of rising edges (e.g., 404a, 404b) that generally correspond to the zero crossings of the input signal 402, in that the rising edges occur approximately 8.33 ms apart. The diagram 406 in FIG. 4 depicts the input signal 402 and the output signal 404 superimposed, to show the correspondence of the signals. It should be appreciated that, depending upon the electrical system to which the sensor device 102 is coupled (including the spectrum of electronic devices that may be coupled to the electrical system), one or more different points on the plurality of rising edges in the output signal 404 can correspond to the zero crossings of the input signal 402—for example, the start of the rising edges in the output signal 404 can correspond to the zero crossings of the input signal 402, the midpoint between start and peak of the rising edges can correspond to the zero crossings, or the peak of the rising edges can correspond to the zero crossings. It should further be appreciated that the same points on each rising edge (e.g., start, midpoint, and peak) should occur approximately 8.33 ms apart. The output signal 404 is transmitted to the processor embedded in the sensor device (see FIG. 1), which monitors the output signal 404 as described below. It should be appreciated that the exact timing of the zero crossings described herein is for example purposes only and corresponds to standard timing of U.S. power systems. The algorithms and techniques described herein can be modified to automatically detect and adjust to differing timing of international power systems.

Turning back to FIG. 2A, when the sensor device 102 is powered up and connected to the server computing device 106, the sensor device 102 periodically transmits (206) a keepalive packet to the alerting module 106a of server computing device 106. The keepalive packet is used to inform the server computing device 106 that the sensor device 102 is receiving electrical power (i.e., there is no power outage at the corresponding location) and that the sensor device 102 is online. For example, the processor 102b of the sensor device 102 executes a main thread that runs continuously and sends the keepalive packet to the server computing device 106 at a regular ¼ second interval. In some embodiments, the keepalive packet can additionally contain other regularly monitored data that is generated by the A/D converter 102c as described above, such as the measured root mean square (RMS) voltage of the power distribution system, the frequency of the voltage sine wave, the relative phase angle of the sine wave, amplitude of the sine wave harmonics and any number of measures of the high frequency noise amplitude. Examples of certain, non-limiting types of power quality data that can be captured and transmitted by the sensor device 102 are described in U.S. Pat. No. 10,641,806, titled "Detection of Electric Discharges that Precede Fires in Electrical Wiring," which is incorporated herein by reference.

In addition, the main thread monitors a global power outage flag. When the power outage flag is set (e.g., to 1), the main thread sends a fault packet to the server computing device 106 (e.g., indicating a power outage) and resets the power outage flag to 0. Additional detail about the power outage flag and fault packet is described below.

The sensor device 102 monitors (208) the generated output signal during each of a plurality of clock cycles having a defined duration. For example, the processor 102b of sensor device 102 can create a timer (or timeout clock) that cyclically counts down from 9 ms (~55 Hz frequency) to zero, and then resets. When the timer reaches zero, the processor 102b calls an interrupt to the main thread (the "timeout interrupt"). In addition, the processor 102b calls an interrupt to the main thread (the "opto-isolator interrupt") when the processor detects a rising edge in the output signal (i.e., signal 404 in FIG. 4) received from the opto-isolator 102a.

When the processor 102b calls the opto-isolator interrupt, the processor 102b of sensor device 102 determines (210) whether a rising edge occurred in the generated output signal 404. For example, the processor 102b counts how many clock ticks occurred since the time of the last opto-isolator interrupt. When either (i) a rising edge occurred in the generated output signal 404 prior to a predetermined clock value in the clock cycle (for example, if the last opto-isolator interrupt occurred less than 7.6 ms ago (~65 Hz frequency) or (ii) a rising edge did not occur in the generated output signal 404 during the clock cycle (for example, the last opto-isolator interrupt occurred more than 9 ms ago—thereby triggering the timeout interrupt described above), this indicates a loss of power. As a result, the processor 102b sets the global power outage flag to 1. As described above, the main thread executed by the processor 102b is monitoring the global power outage flag and when the main thread sees the flag set to 1, the processor of output detection device 102 transmits (212) a fault packet to the alerting module 106a of server computing device 106 and initiates (214) a new clock cycle for monitoring the generated output signal 404 (e.g., by reloading or resetting the timeout clock to 9 ms).

Figure 5A:
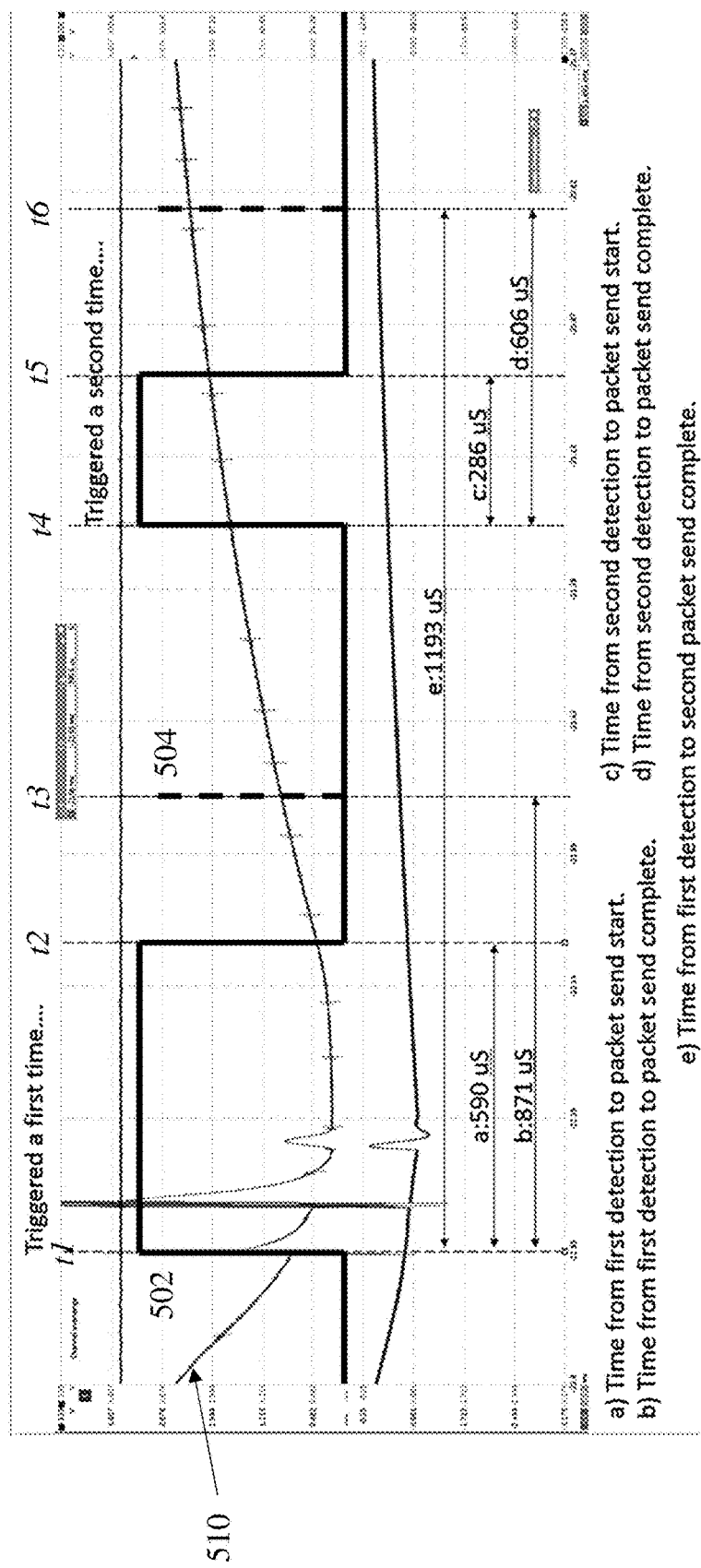
FIG. 5A is a detailed timing diagram showing the output signal generated by the sensor device and the corresponding value of the global power outage flag when power outages are detected by the sensor device.

FIG. 5A is a detailed timing diagram showing the output signal generated by the sensor device 102 and the corresponding value of the global power outage flag when power outages are detected by the sensor device 102. As shown in FIG. 5A, the trace 510 corresponds to the output signal 404 generated by the sensor device 102. The solid black line 502 indicates the value of the global power outage flag in the main thread of the processor 102b, and the dotted black line 504 indicates when the main thread finishes sending a fault packet to the server computing device 106. For example, the processor 102*b* detects a power outage at time t1 and sets the global power outage flag to 1. Then, at time t2, the main thread of processor 102*b* reads the global power outage flag as 1 and starts transmitting a fault packet to server computing device 106. At time t3, the main thread finishes sending the fault packet to server computing device 106. The processor 102*b* detects a second power outage at time t4 (which could correspond to the same overall power outage) and begins transmitting a second fault packet to server computing device at time t5. Then, at time t6, the processor 102*b* finishes sending the second fault packet.

Alternatively, when a rising edge occurred in the generated output signal 404 at a predetermined clock value in the clock cycle (i.e., at approximately 8.33 ms), the optoisolator interrupt process does not set the global power outage flag to 1 (and the timeout interrupt does not trigger). As a result, the processor 102*b* of output detection device 102 merely initiates (214) a new clock cycle for monitoring the generated output signal 404 (e.g., by reloading or resetting the timeout clock to 9 ms).

Figure 5B:
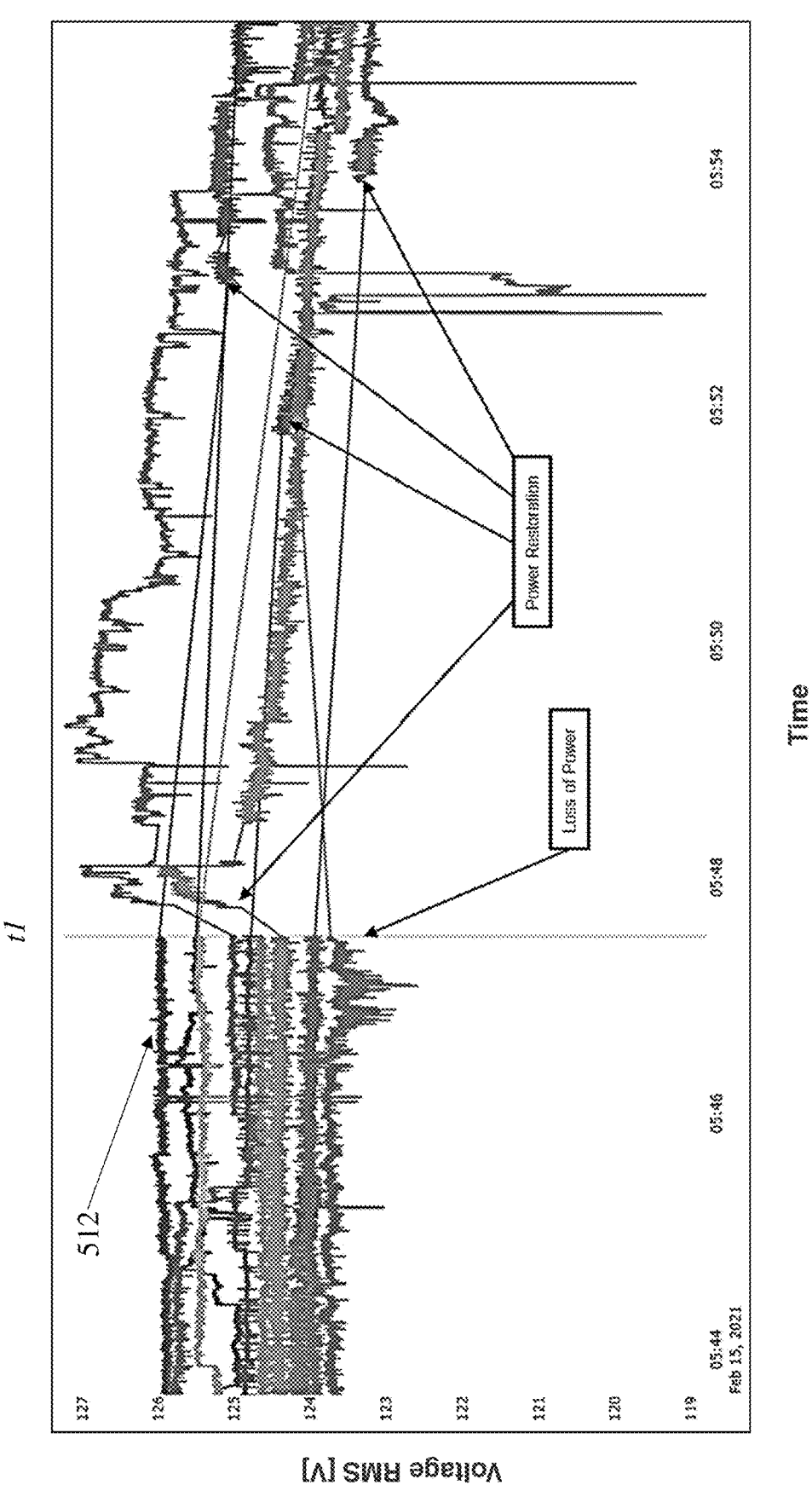
FIG. 5B is a graph of output signals from a plurality of different sensor devices when a power outage has occurred.

FIG. 5B is a graph of output signals from a plurality of different sensor devices when a power outage has occurred. As shown in FIG. 5B, each line (e.g., line 512) corresponds to voltage readings from an output signal of a different sensor device. Shortly before 05:48, a power outage occurred—which is reflected in the graph at line t1 where the readings from each device suddenly stop. In the following few minutes, power is restored at different times to each of the sensor devices—indicated by the arrows labeled 'power restoration.'

Turning to FIG. 2B, in the event that the sensor device 102 transmits a fault packet to the server computing device 106, the alerting module 106*a* receives (216) the fault packet and listens (218) for keepalive packets from the sensor device 102. As described previously, the main thread of the processor 102*b* of sensor device 102 is configured to transmit a keepalive packet to the server computing device 106 every ¼ second. When the alerting module 106*a* receives a fault packet and does not subsequently detect any keepalive packets for at least a defined time period (e.g., 5 seconds) after the fault packet is received, the alerting module 106*a* transmits (220) a power outage notification to one or more remote computing devices.

Figure 6B:
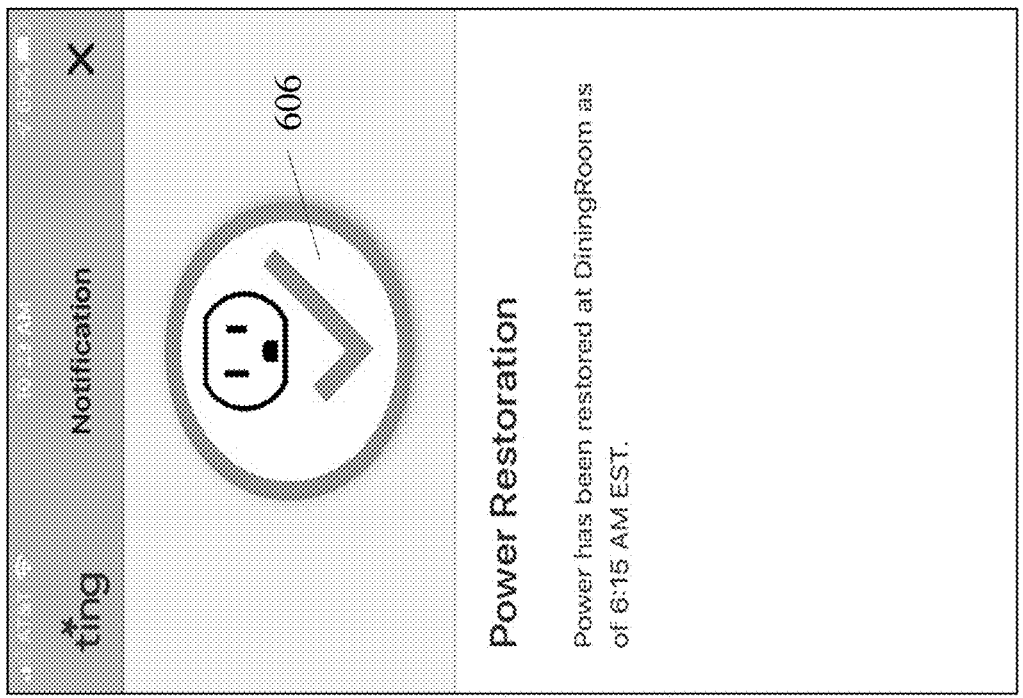
FIG. 6B is an exemplary user interface of a remote computing device that depicts a power restoration notification received from the server computing device
Figure 6A:
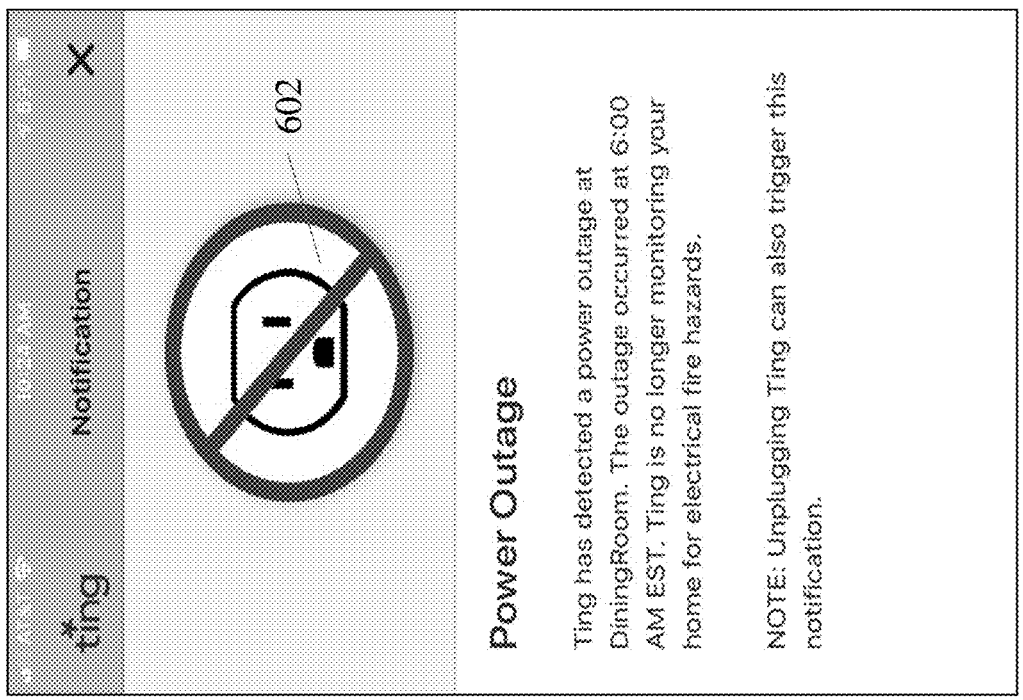
FIG. 6A is an exemplary user interface of a remote computing device that depicts a power outage notification received from the server computing device.

In some embodiments, the alerting module 106*a* can transmit the power outage notifications via one or more communications channels and/or communication protocols—such as email, text (e.g., SMS), and/or automated phone call—to remote computing devices like mobile phones, smart watches, smart devices, tablets, laptops, etc. In some embodiments, the alerting module 106*a* can transmit the power outage notifications to computing devices associated with different organizations via, e.g., webhook API callbacks, or by utilizing services from cloud computing providers such as Amazon Web Services (AWS) Simple Notification Service. In one example, the remote computing device can comprise a mobile application (app) that is configured to receive push notifications from the alerting module 106*a* that, when received, automatically activate functionality of the mobile app to alert a user of the remote computing device (e.g., pop-up message, audible alert, and/or haptic alert (vibration)) that a power outage is occurring at the corresponding location of the sensor device 102. FIG. 6A is an exemplary user interface of a remote computing device (e.g., a smart phone) that depicts a power outage notification received from the alerting module 106*a*. As shown in FIG. 6A, the power outage notification includes a visual symbol 602 indicating a power outage event and a detailed description 604 including a time and location of the power outage.

After transmitting the power outage notification, the alerting module 106*a* returns to listening for keepalive packets from the sensor device 102. When the alerting module 106*a* subsequently detects one or more keepalive packets (either within the defined time period or after the defined time period has elapsed) after the power outage notification is transmitted, the alerting module 106*a* transmits (222) a power restoration notification to the one or more remote computing devices. As described above with respect to the power outage notification, the remote computing devices can receive the power restoration notification from the alerting module 106*a* and activate functionality of the remote computing device to alert a user of the device that power has been restored. FIG. 6B is an exemplary user interface of a remote computing device that depicts a power restoration notification received from the alerting module 106*a*. As shown in FIG. 6B, the power restoration notification includes a visual symbol 606 indicating a power restoration event and a detailed description 608 including a time and location of the power restoration.

It should be appreciated that reliability of the power outage detection methodology described herein can depend upon the connectivity between the sensor device 102 and the server computing device 106, as well as depending upon the availability of intermediate equipment which supports that connectivity. For example, the power sensor device 102 may be connected to a local Wi-Fi router (e.g., installed in a home or business), which in turn is connected to an Internet modem or router, which in turn is connected to other components within a corresponding Internet provider's network before the connection finally reaches the server computing device 106 that detects the power outage event. As a result, the fault packets must be sent by the sensor device 102 and traverse each segment of the communication medium 104 (e.g., network) which may or may not be powered by the same power distribution system and power lines before one or more of these devices loses power and can no longer transmit, re-transmit, and/or relay the fault packets to the next link in the overall connection. It should be appreciated that if the fault packets do not reach the server computing device 106, then the server computing device 106 cannot distinguish if the keepalive packets stopped because of loss of communication connectivity (e.g., an Internet outage) or instead due to a power outage at the location of the sensor device 102. Therefore, rapid detection of power outages and transmission of fault packets is essential to the advantages provided by the methods and systems described herein.

In order to determine the effectiveness of detecting power outages using this method, tests were performed using two sensor devices set up in two different locations. Each sensor device was placed on a programmable switch so that power could be turned off automatically once per day over several months. FIG. 7 is a diagram which shows the results of the testing. As shown in FIG. 7, the sensor devices 102 successfully detected power outages 95% of the time on average, with a maximum of 100% detection efficiency and a minimum of 71% detection efficiency.

Also, it should be appreciated that another advantage provided by the techniques described herein is the improved power outage detection and notification efficiency with scale of installation of the sensor devices in proximity to each other and/or geographically dispersed but connected to a common electrical grid infrastructure. For example, when multiple sensor devices are in proximity to each other and/or connected to a common electrical grid component, for example on the same voltage transformer which powers multiple homes, the efficiency of detecting power outages increases. If a sensor device 102 installed in at least one of the homes on the same electrical network is able to communicate a fault packet to the server computing device 106, and the keepalive packets stop arriving at the same time, then a power outage notification can be sent to remote devices associated with each customer on the network. The same approach can be used for a wider area electrical grid outage: if dozens of homes are powered by the same substation, then in the event of a power outage at that substation, only one sensor device 102 installed at a single home of the dozens of homes serviced by the substation needs to successfully transmit a fault packet to the server computing device 106 in order to generate a power outage notification to a remote device associated with customers in each of the dozens of homes. Conversely, if a dozen homes are powered by the same substation and the sensor device(s) 102 installed at each of the homes does not transmit a fault packet prior to loss of communications of the keepalive packets, then it can be safely assumed that the outage was the result of another non-power related occurrence (e.g., an Internet Service Provider (ISP) outage), and not the result of loss of power.

Another important feature of the methods and systems described herein is the capability to monitor the power quality of the electrical power received by the sensor device 102 of the system 100 and provide information relating to the power monitoring to both customers (e.g., the owner of the home where the sensor device 102 is installed) and utility providers. As mentioned previously, the sensor device 102 can capture additional data about the electrical power during its regular monitoring for power outages (such as, e.g., measured root mean square (RMS) voltage of the power distribution system, the frequency of the voltage sine wave, the relative phase angle of the sine wave, amplitude of the sine wave harmonics and any number of measures of the high frequency noise amplitude), and the sensor device 102 can transmit the data to the server computing device 106 (e.g., as part of the transmission of keepalive packets to the server computing device). As can be appreciated, the methods and systems described herein can capture power quality data from a plurality of sensor devices that are connected to a common electrical grid infrastructure and analyze the captured power quality data in aggregate to perform many useful tasks including but not limited to: detecting specific power quality events affecting a portion of the electrical grid, estimating an originating location associated with the power quality events (including identification of one or more components of the electrical grid infrastructure that may be causing a power quality event), and generating a topology of part or all of the electrical grid infrastructure.

Figure 8:
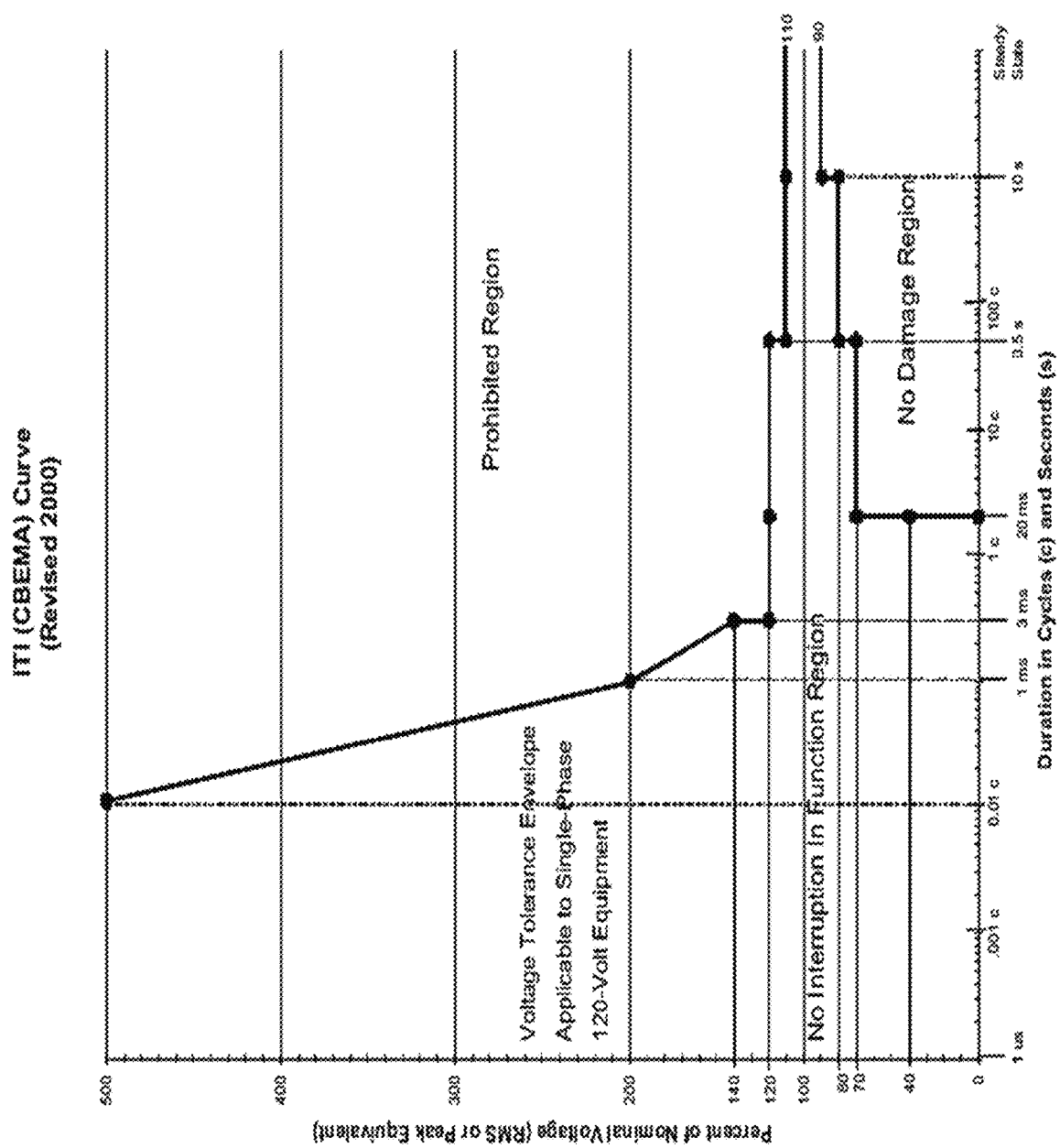
FIG. 8 is a graph of the ITI (CBEMA) curve.

As will be described in greater detail below, the sensor device 102 can send 5 Vrms samples of the voltage to the server computing device 106 each ¼ second (or 20 Vrms readings per second). This enables the server computing device 106 to monitor for surges and sags in the voltage, which can cause damage to appliances or sensitive electronics devices that are also coupled to the power distribution system. FIG. 8 is a graph known as the ITI (CBEMA) curve. The graph shows the acceptable voltage levels within an envelope of voltage amplitude over a time duration. For example, a very short duration (~16 milliseconds) with a large voltage amplitude (300 volts) generally does not impact a device being powered on a circuit, but if the voltage amplitude remains at 300 volts for more than five seconds, it could cause damage to any devices on the electrical network.

For example, if the amplitude and duration of voltage data streaming to the alerting module 106a exceed the bounds of the CBEMA curve above nominal voltage levels, the alerting module 106a sends a "Power Surge" notification message to the device of the end user. If the amplitude and duration of voltage data streaming to the alerting module 106a exceed the bounds of the CBEMA curve below nominal voltage levels, the alerting module 106a sends a "Power Brownout" notification to the end user's device.

In some embodiments, other information gathered from the voltage signal can also indicate power quality problems. For example, a measurement of the voltage sine wave frequency which has a very high variance might signal that the home is no longer using utility power but has switched over to a generator backup. A large jump change in sine wave frequency might be an indicator that something has changed on the grid, such as a power producing plant has gone offline. This typically results in a large drop in frequency. Or this event may indicate that a new power-producing plant has come online which can result in a large jump up in frequency. The system 100 can utilize algorithms to detect that a generator has been turned on in a home, such as measuring the frequency variance over the previous five seconds, and if the variance exceeds a threshold, after a power outage has been detected, the system 100 can send a notification to the end user's device and/or a utility monitoring device that the home is now on generator power. When the frequency variance falls back to a normal variance, then system 100 can send a notification that the home has been restored to utility power.

While large deviations of RMS voltage outside of the limits of the CBEMA curve are most damaging to equipment in the home, smaller changes in RMS voltage can be indicators of activity within the home which can also alert a homeowner to faults with devices or to hazardous conditions. One such hazardous condition is known as a loose neutral. A loose neutral occurs when the neutral line which normally holds the voltage level within the home to "ground" becomes disconnected. The result of a loose neutral is that the voltage on a single leg is much less stable and includes a much higher occurrence of jumps in the positive direction (increases in voltage). This is due to the imbalance of impedances on each leg which occurs when independent devices on each leg turn on and off. Large devices which run off of 220V do not create any noticeable difference in voltage jumps.

Additionally, when multiple power outage or surge and sag events occur over many days for a single location, it is recommended that the customer reach out to their electric utility. Recurring power quality problems can cause damage to appliances and sensitive electronics and may indicate more severe problems with electrical power lines coming to the residence which could cause electrical fires. A recurring power quality problem may be limited to a single home, in which case, it is likely a loose neutral, or it may occur regularly with homes on the same transformer or substation, or which may be on the same phase of power. In these cases, the recurring power quality problem may indicate a failure on a particular feeder line or circuit, at a common transformer, or at the substation.

Figure 9:
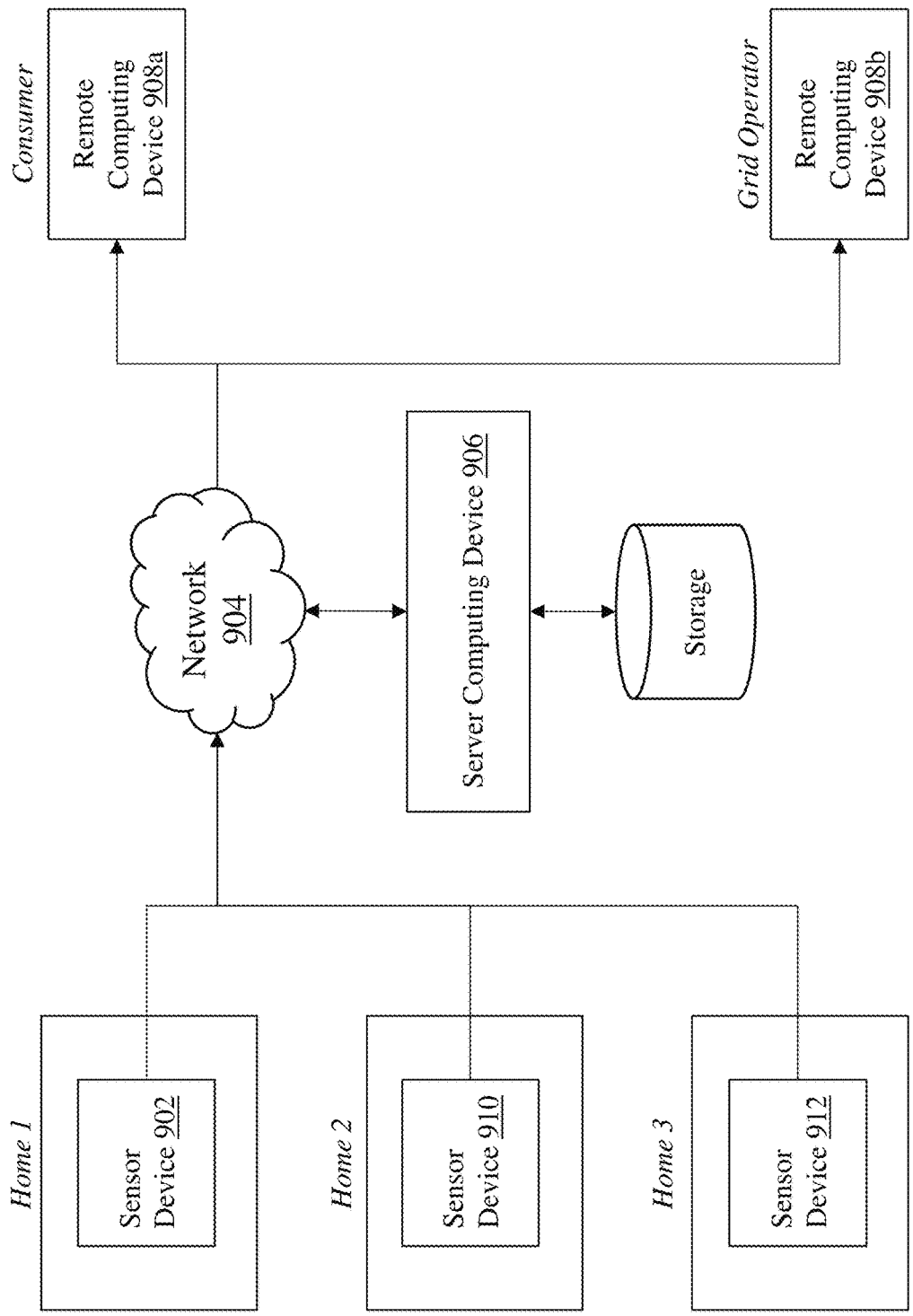
FIG. 9 is a block diagram of a networked system for power quality detection and notification.

FIG. 9 is a block diagram of a networked power quality detection and notification system 900. The system 900 of FIG. 9 uses many of the same devices as described above with respect to FIG. 1, so those descriptions will not be repeated here. As shown in FIG. 9, system 900 comprises a plurality of sensor devices 902, 910, 912 installed at different locations (e.g., homes, businesses) in a geographic area. These sensor devices 902, 910, 912 provide power quality data as described above to a server computing device 906 via a communications network 904. The server computing device 906 analyzes the power quality data received from the plurality of sensor devices 902, 910, 912 utilizing one or more power quality analysis algorithms (as will be described below) to detect power quality events and generate event notification messages that are distributed to one or more remote computing devices 908a, 908b controlled by end users (e.g., homeowners, business owners, utilities, etc.). It should be appreciated that a sensor device (e.g., device 902) can be located at the same location as a remote computing device (e.g., device 908a)—for example, a homeowner can install the sensor device 902 at his or her home and view notification messages at any of several different computing devices associated with the homeowner, such as computing devices located at the home or mobile devices that the user takes with them.

As should also be understood, one or more of the sensor devices 902, 910, 912 may be on the same phase of power—for example, several homes on the same street that are all connected to a circuit on a single phase may have an installed sensor device. Alternatively, the sensor devices 902, 910, 912 may be on one or more different phases of power. As will be described later in the specification, the power quality data captured by a sensor device can indicate which phase of power the device is receiving and this information can be analyzed and combined with other data elements to provide key insights into the estimation of power quality event origination locations, backmapping the electrical grid to understand its topology, and other applications.

Figure 10:
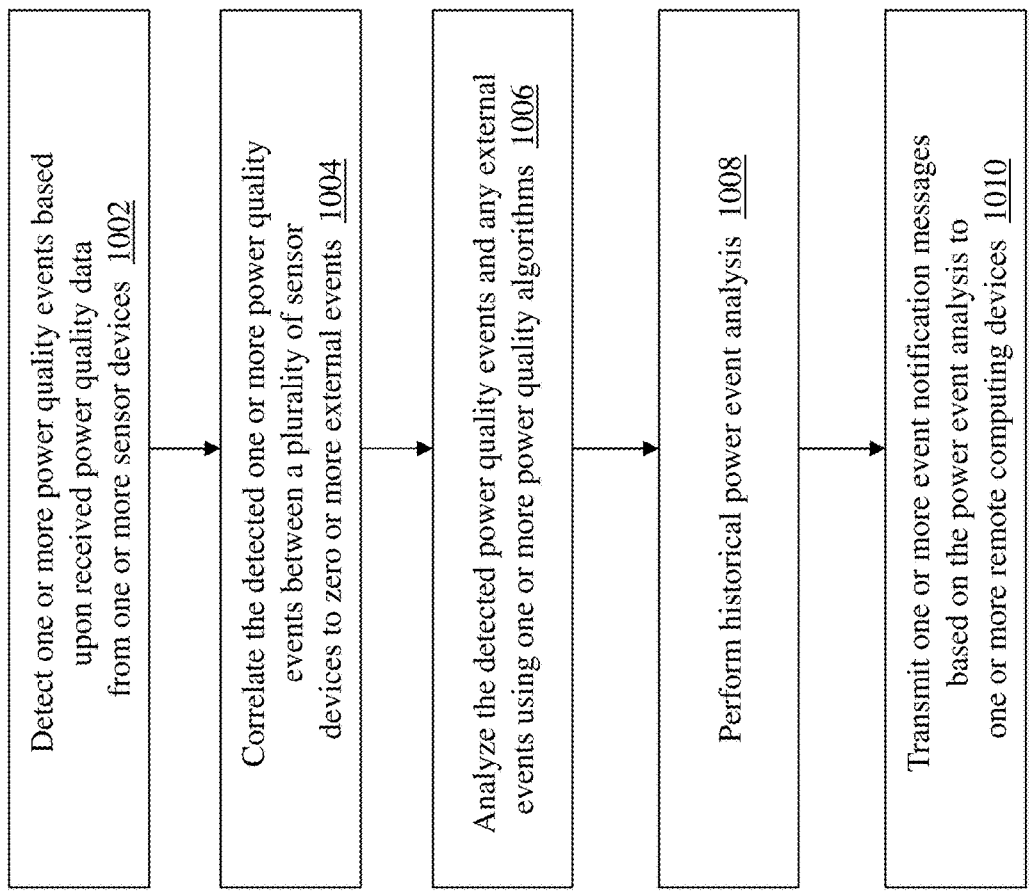
FIG. 10 is a flow diagram of a computerized method of analyzing power quality data.

FIG. 10 is a flow diagram of a computerized method of analyzing power quality data using the system 900 of FIG. 9. Upon receiving the power quality data, the server computing device 906 detects (1002) one or more power quality events occurring based upon the received power quality data. The server computing device 906 can store the captured power quality data as historical data for future reference as described herein. In some instances, it can be appreciated that no power quality events occurred in the power quality data received by the server computing device 906, so no further action is taken. In some embodiments, the server computing device 906 analyzes power quality data from at least a subset of the sensor devices connected to the network.

When one or more power quality events are detected, the server computing device 906 correlates (1004) the detected one or more power quality events to one or more external events that may have contributed to or influenced the power quality events. For example, lightning strikes or other weather activity may have occurred in the same geographic area as the homes or businesses being monitored by the sensor devices 902, 910, 912. In another example, the electrical grid equipment may have executed an automatic reclosure event, in which a circuit recloser on the grid sensed a fault condition and temporarily shut off power to a portion of the grid that services homes and businesses with the sensor devices 902, 910, 912 installed. In yet another example, changes to electricity demand on certain portions of the grid (e.g., energy pricing events) may occur that affects the power quality to homes and businesses utilizing the sensor devices 902, 910, 912. It should be appreciated that, in some embodiments, the correlation to external events is optional and the server computing device 106 can proceed to analyze the power quality events identified in the power quality data (e.g., by comparing data from multiple sensor devices) without correlation to external events.

Once the correlation step is complete, the server computing device 906 analyzes (1006) the power quality events and, optionally, external events using one or more power quality algorithms as described herein. It should be appreciated that the power quality algorithms are exemplary, and other types of algorithms can be utilized with the methods and systems described herein. Further, it should be appreciated that, in some embodiments, the sensor device 902, 910, 912 installed at each location can perform some or all of the power quality analysis described herein as being performed by the server computing device 906 (e.g., to provide real-time customized power quality analysis for a particular location).

After analyzing the power quality events and, optionally, external events, the server computing device 906 performs (1008) historical power event analysis for, e.g., the particular location, geographic area, and/or any number of sensor devices 902, 910, 912. As described below, the system can leverage historical event data in order to detect recurrent power quality issues (e.g., sags, surges, etc.) that may be indicative of structural deficiencies with the grid and/or the home wiring system (such as a loose neutral) and which can only be detected by analyzing power quality data over a longer period of time, such as several days, weeks, or months. Finally, the server computing device 906 transmits (1010) one or more event notification messages (e.g., alert messages) based upon the above power event analysis that are then distributed to one or more remote computing device 908a, 908b as will be described in detail below.

In some embodiments, the historical event data can comprise one or more signatures of power quality events that were previously detected by one or more sensor devices in the same location or in one or more different locations. As can be appreciated, specific power quality events can exhibit certain characteristics (e.g., voltage levels or changes, harmonic distortion features, patterns of waveforms, etc.) irrespective of the specific location in which they occur or the sensor device that detects them. Advantageously, the server computing device 906 can identify such patterns or common features and associate them with a known power quality event. These patterns or common features can be stored as signatures and used by the server computing device 906 as reference points for comparison when analyzing subsequent power quality data. This enables the server computing device 906 to quickly identify power quality issues in incoming power quality data, particularly recurring power quality issues for a given geographic area or subset of sensor devices.

The general structure of a power quality algorithm executed by the server computing device 906 is as follows:
1. The server computing device 906 captures and queues a plurality of seconds of incoming power quality data.
2. The server computing device 906 detects power quality events in the incoming power quality data based on pre-defined data types and pre-defined rules (e.g., as determined from a historical data queue), including executing one or more specific power quality algorithms on the incoming data. The server computing device 906 labels the detected power quality events with certain data points, such as: time of the event, location of the event, and various detected or calculated quantities relative to the event (e.g., measured root mean square (RMS) voltage of the power distribution system, the frequency of the voltage sine wave, the relative phase angle of the sine wave, amplitude of the sine wave harmonics and any number of measures of the high frequency noise amplitude).

3. The server computing device 906 adds the detected power quality events to an event correlation queue to detect correlated events (i.e., other events detected by one or more other sensor devices and/or external events). For example, the external event data can be obtained from one or more remote computing devices—in the case of lightning strikes, the server computing device 906 can, e.g., communicate with a server in a lightning detection network to identify lightning events. As can be appreciated, correlated events typically occur within a time delta of the above-detected power quality events, within a location delta of the locations of the sensor devices 902, 910, 912, and are generally the same type of events (including but not limited to the same or similar power quality characteristics, durations, start times, stop times, geographic locations, and the like). In some embodiments, a minimum number of sensor devices may be required to agree before a correlated event is detected in order to minimize false detections.

4. The server computing device 906 stores the detected power quality events and correlated events to, e.g., long-term storage such as a NoSQL database, cloud storage, or other type of archival storage.

5. The server computing device 906 transmits power quality notification messages to one or more remote computing devices 908a, 908b based on the detected power quality events, correlated events, and in some embodiments, historical events (e.g., generated by tracking the power quality data for a particular sensor device 902, 910, 912 and/or geographical area over a period of time).

The following are examples of algorithms that can be used by the server computing device 906 to detect specific power quality conditions and events.

Surge Event

Generally, a surge event occurs when conditions on the electrical grid result in excess voltage being delivered to the home. In order to detect a surge event, the server computing device 906 can analyze the incoming power quality data as below.

1. The server computing device 906 captures and queues a defined amount (e.g., six seconds) of incoming RMS voltage data.

2. If the server computing device 906 determines that the RMS voltage exceeds a predefined threshold percentage (e.g., 120%) of a nominal voltage for a number of consecutive data points (or is otherwise outside of the upper part of the CBEMA curve), the server computing device 906 adds a "surge" event to an event queue with, e.g., the UTC time of the event, the location (e.g., location data such as GPS, latitude/longitude, cellular-based data, etc.) associated with the point of installation for the sensor device that captured the incoming data), and the maximum value of RMS voltage. It should be appreciated that, in some embodiments, the predefined threshold percentage can vary based upon the number of consecutive data points in which the RMS voltage is greater than a minimum threshold percentage.

3. The server computing device 906 adds the detected surge event to be evaluated along with other surge events in a correlation event queue. The correlation event queue is evaluated to produce correlated events, which as an example includes "grid surge events" that are within a defined time period (e.g., 400 milliseconds) and a defined proximity (e.g., ten kilometers) of the detected surge event and, in some embodiments, may require a minimum number of events to agree.

4. The server computing device 906 stores the detected surge event and correlated grid surge events to, e.g., long-term storage.

5. The server computing device 906 transmits alert notification messages relating to the detected surge event and correlated events to remote computing device 908a (such as mobile phones, smart devices, wearables, etc.) associated with individual homeowners where the surge event has been detected and/or transmit notification messages relating to the detected surge event and correlated events (including external events, if detected) to remote computing device 908b of the related utilities or other grid operators.

Figure 11:
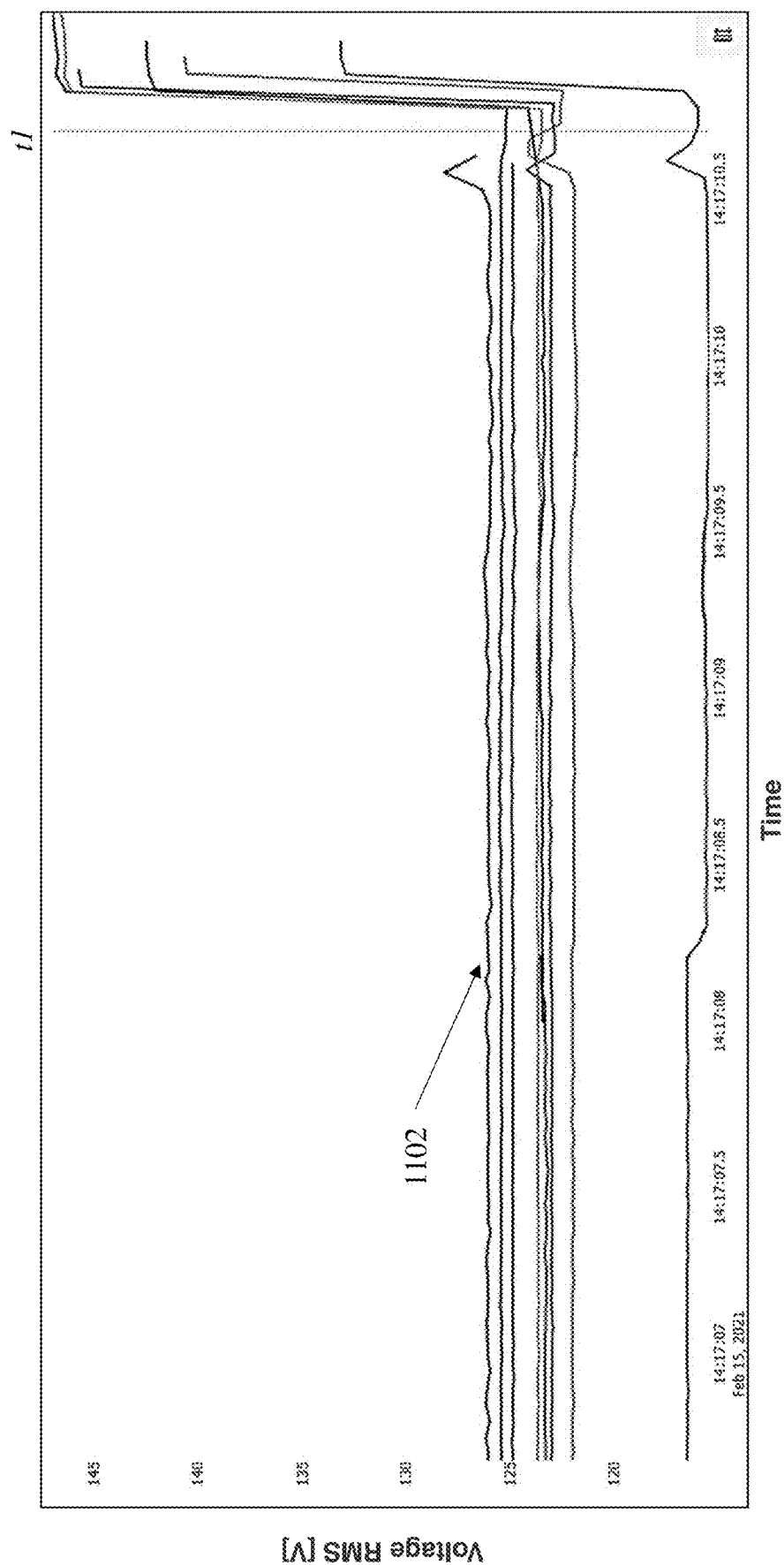
FIG. 11 is a graph showing the output signal generated by a plurality of different sensor devices during a grid surge event.

FIG. 11 is a graph showing the output signal generated by a plurality of different sensor devices during a grid surge event. As shown in FIG. 11, each line in the graph (e.g., line 1102) represents the output signal from a different sensor device. Around 14:17:10 (time t1), a surge event occurred, resulting in a power outage. The RMS voltage signals received by the server computing device 906 from each of the sensor devices increased significantly from their prior levels—indicating a surge of voltage was received by the sensor devices.

Brownout Event

Generally, a brownout event occurs when conditions on the electrical grid result in an extended drop in the voltage being delivered to the home. In order to detect a brownout event, the server computing device 906 can analyze the incoming power quality data as below.

1. The server computing device 906 captures and queues a defined amount (e.g., six seconds) of RMS voltage data.

2. If the server computing device 906 determines that the RMS voltage is less than a predefined threshold percentage (e.g., 70%) of a nominal voltage for a number of consecutive data points (or is otherwise below the CBEMA curve), the server computing device 906 adds a "brownout" event to the event queue with, e.g., the UTC time of the event, the location, and the minimum value of RMS voltage. It should be appreciated that, in some embodiments, the predefined threshold percentage can vary based upon the number of consecutive data points in which the RMS voltage is less than a minimum threshold percentage.

3. The server computing device 906 adds the detected brownout event to be evaluated along with other brownout events in a correlation event queue. The correlation event queue is evaluated to produce correlated events, which as an example includes "grid brownout events" that are within a defined time period (e.g., 400 milliseconds) and a defined proximity (e.g., ten kilometers) of the detected brownout event and, in some embodiments, may require a minimum number of events to agree.

4. The server computing device 906 stores the detected brownout event and correlated grid brownout events to, e.g., long-term storage.

5. The server computing device 906 transmits alert notification messages relating to the detected brownout event and correlated events to remote computing device 908a associated with individual homeowners where the brownout event has been detected and/or transmit notification messages relating to the detected brownout event and correlated events to remote computing device 908*b* of the related utilities or other grid operators.

Figure 12:
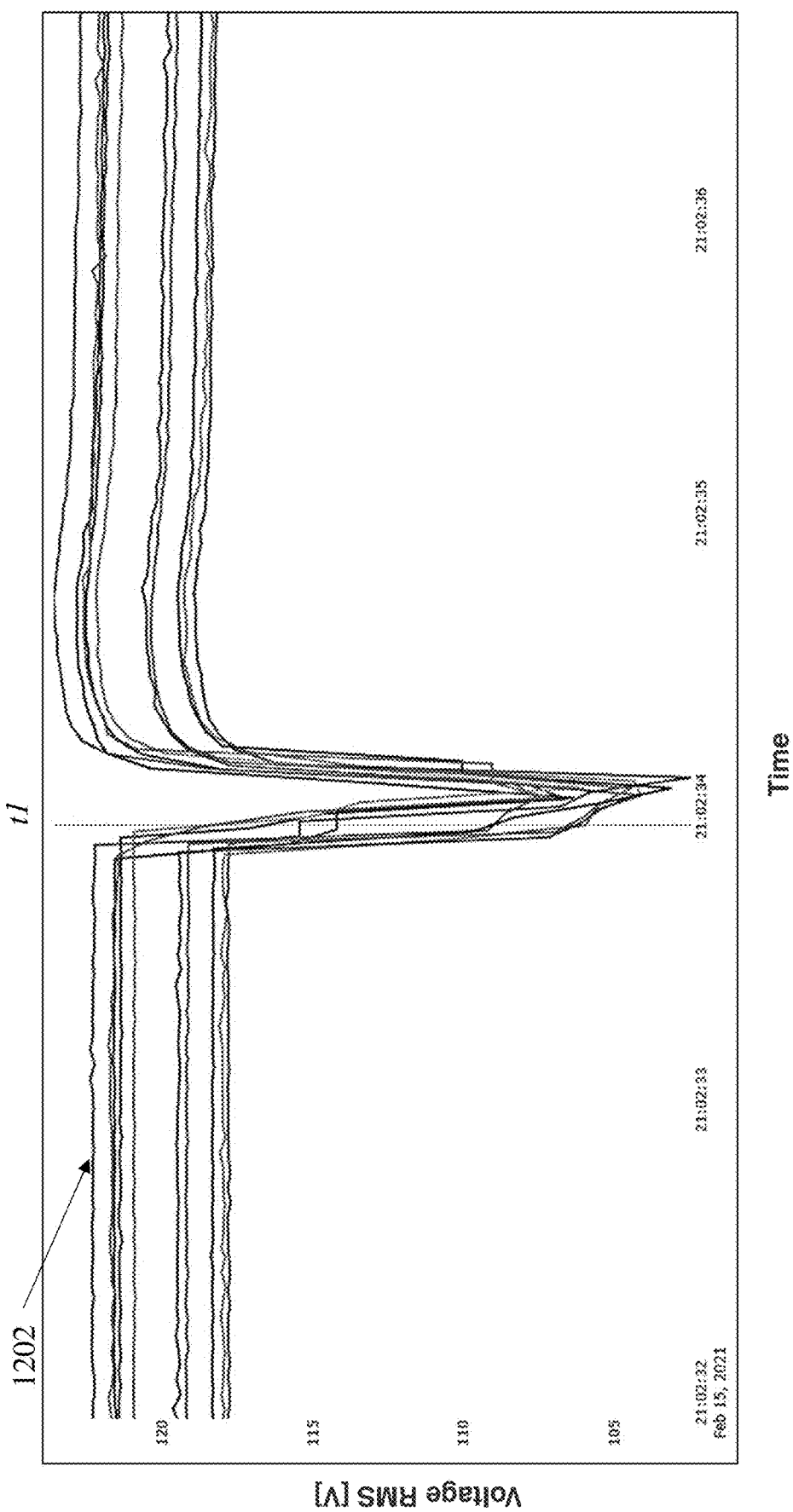
FIG. 12 is a graph showing the output signal generated by a plurality of different sensor devices during a brownout event.

FIG. 12 is a graph showing the output signal generated by a plurality of different sensor devices during a brownout event. As shown in FIG. 12, each line in the graph (e.g., line 1202) represents the output signal from a different sensor device. Around 21:02:34 (time t1), a brownout event occurred. The voltage RMS signals received by the server computing device 906 from each of the sensor devices dropped significantly over a few cycles and then returned to approximately the same voltage levels—indicating a brownout event was captured at the sensor devices.

Sag Jump Event

Generally, a sag jump event occurs when conditions on the electrical grid result in a brief drop in the voltage being delivered to the home. In order to detect a sag jump event, the server computing device 906 can analyze the incoming power quality data as below.

1. The server computing device 906 captures and queues a defined amount (e.g., six seconds) of RMS voltage data.
2. The server computing device 906 determines whether one or more RMS voltage drops occurred that are larger than a predefined threshold percentage (e.g., 2.5%) of a nominal voltage, and the server computing device 906 generates a "sag jump" event for each detected voltage drop.
3. The server computing device 906 adds the detected sag jump event(s) (including, e.g., the UTC time of the event, the location, and the maximum value of RMS voltage drop) to a correlation event queue.
4. The server computing device 906 evaluates all sag jump events in the correlation event queue to identify sag jump events that occurred within a defined time period (e.g., 400 milliseconds) and a defined proximity (e.g., ten kilometers) of each other. In some embodiments, a minimum number of events may be required to identify correlated events.
5. The server computing device 906 stores the identified sag jump event(s) and correlated events to, e.g., long-term storage.
5. The server computing device 906 transmits alert notification messages relating to the detected sag jump event(s) and correlated events to remote computing device 908*a* associated with individual homeowners where the sag jump event(s) have been detected and/or transmit notification messages relating to the sag jump event(s) and correlated events to remote computing device 908*b* of the related utilities or other grid operators.

Figure 13:
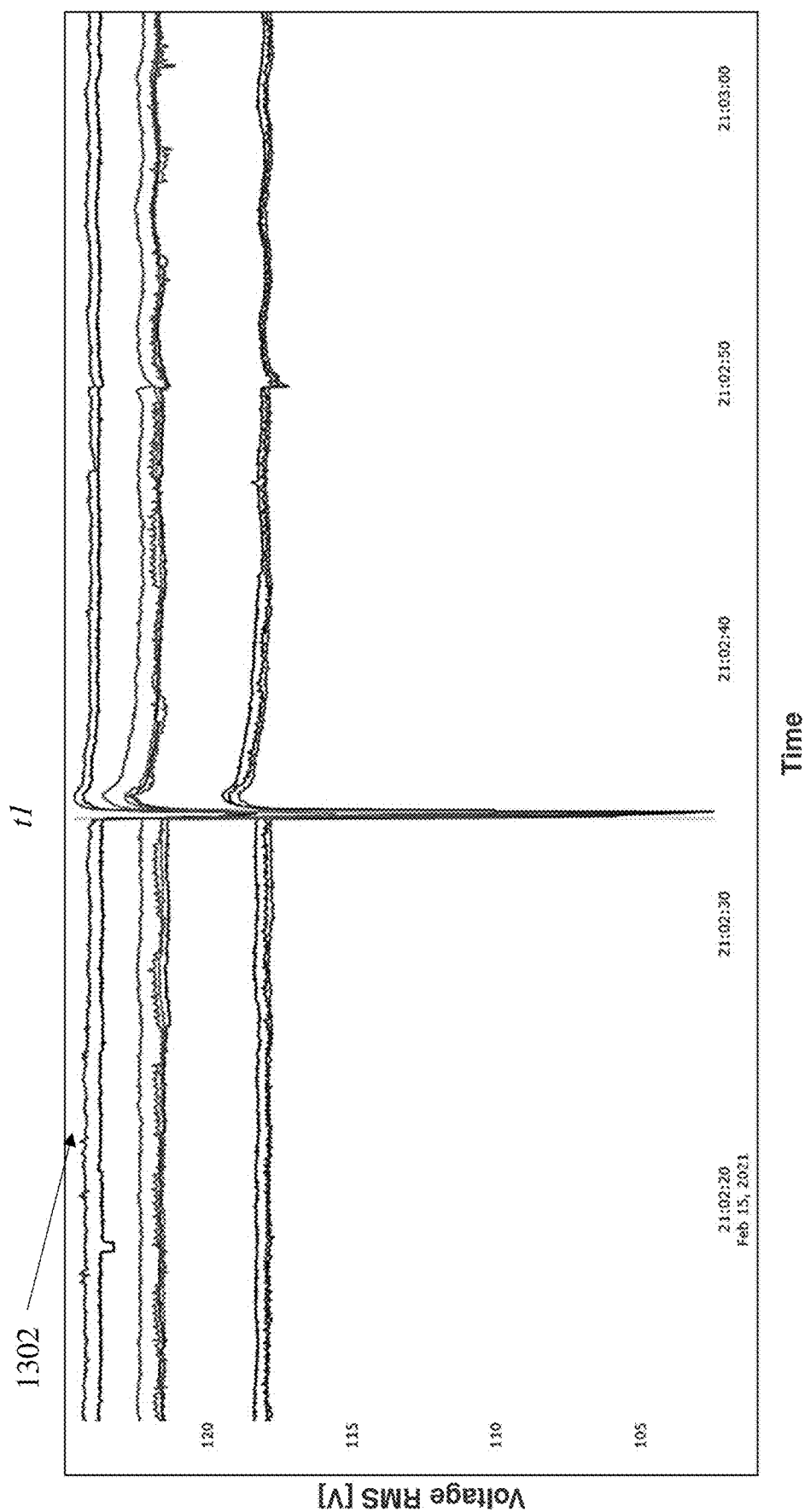
FIG. 13 is a graph showing the output signal generated by a plurality of different sensor devices during a sag jump event.

FIG. 13 is a graph showing the output signal generated by a plurality of different sensor devices during a sag jump event. As shown in FIG. 13, each line in the graph (e.g., line 1302) represents the output signal from a different sensor device. Around 21:02:35 (time t1), a sag jump event occurred. The RMS voltage signals received by the server computing device 906 from each of the sensor devices dropped significantly and then almost immediately returned to approximately the same voltage levels—indicating a sag jump event was captured at the sensor devices.

Swell Jump Event

Generally, a swell jump event occurs when conditions on the electrical grid result in an increase in the voltage being delivered to the home. In some cases, a swell jump event can occur when a heavy load turns off in the electrical system. In order to detect a swell jump event, the server computing device 906 can analyze the incoming power quality data as below.

1. The server computing device 906 captures and queues a defined amount (e.g., six seconds) of RMS voltage data.
2. The server computing device 906 determines whether one or more RMS voltage increases occurred that are larger than a predefined threshold percentage (e.g., 2.5%) of a nominal voltage, and the server computing device 906 generates a "swell jump" event for each detected voltage increase.
3. The server computing device 906 adds the detected swell jump event(s) (including, e.g., the UTC time of the event, the location, and the maximum value of RMS voltage increase) to a correlation event queue.
4. The server computing device 906 evaluates all swell jump events in the correlation event queue to identify swell jump events that occurred within a defined time period (e.g., 400 milliseconds) and a defined proximity (e.g., ten kilometers) of each other. In some embodiments, a minimum number of events may be required to identify correlated events.
5. The server computing device 906 stores the identified swell jump event(s) and correlated events to, e.g., long-term storage.
6. The server computing device 906 transmits alert notification messages relating to the detected swell jump event(s) and correlated events to remote computing device 908*a* associated with individual homeowners where the swell jump event(s) have been detected and/or transmit notification messages relating to the swell jump event(s) and correlated events to remote computing device 908*b* of the related utilities or other grid operators.

Figure 14:
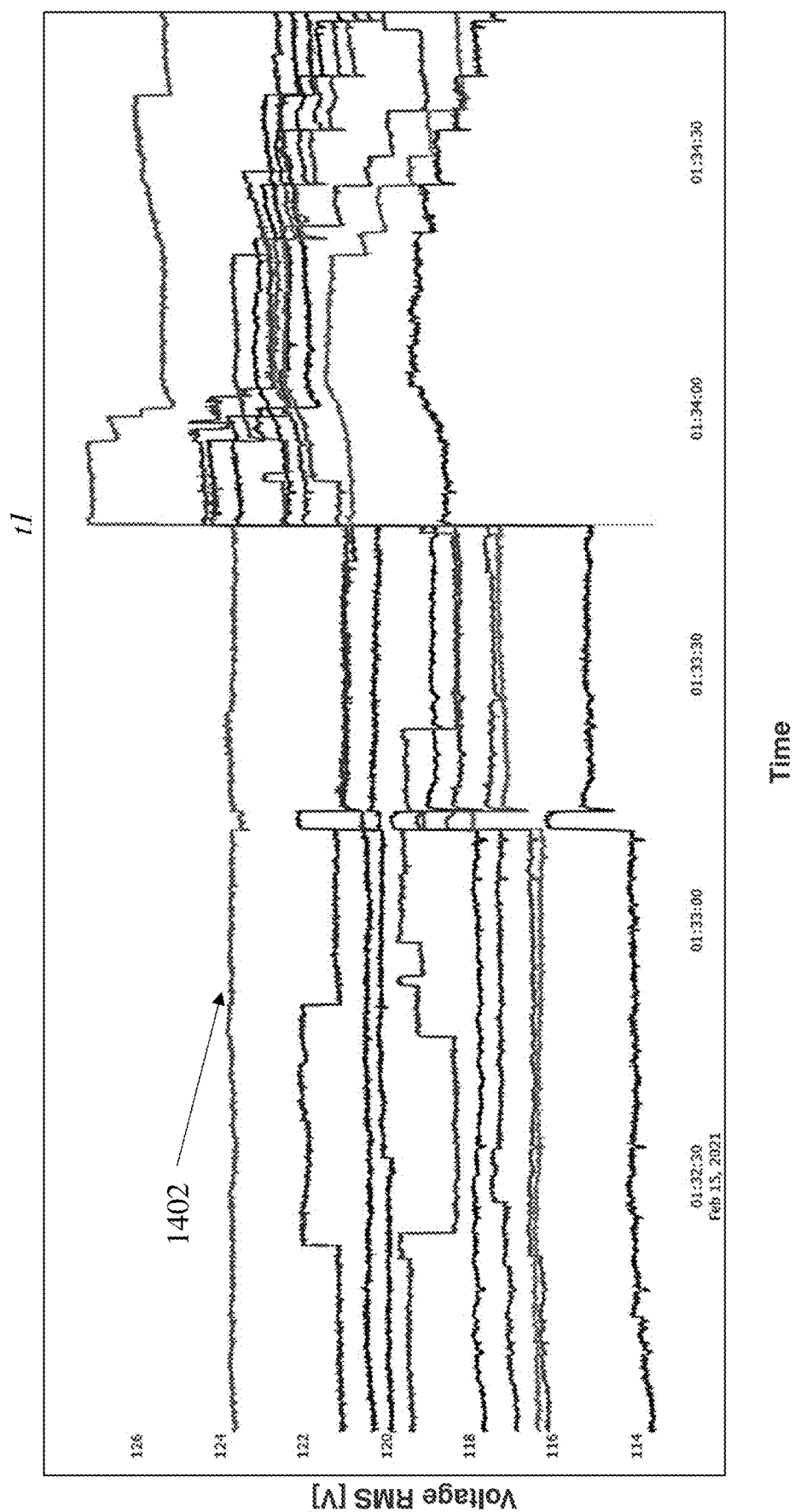
FIG. 14 is a graph showing the output signal generated by a plurality of different sensor devices during a swell jump event.

FIG. 14 is a graph showing the output signal generated by a plurality of different sensor devices during a swell jump event. As shown in FIG. 14, each line in the graph (e.g., line 1402) represents the output signal from a different sensor device. Around 01:33:50 (time t1), a swell jump event occurred. The voltage RMS signals received by the server computing device 906 from each of the sensor devices almost immediately increase to higher voltage levels—indicating a swell jump event was captured at the sensor devices.

High Frequency (HF) Filter Event

As mentioned above, the sensor device 902, 910, 912 can monitor certain power quality data including high frequency amplitude of power coming into the home, which can cause damage to wiring and appliances in the home. In order to detect a high frequency filter event, the server computing device 906 can analyze the incoming power quality data as below.

1. The server computing device 906 captures and queues a defined amount (e.g., six seconds) of High Frequency (HF) amplitude data.
2. The server computing device 906 calculates a sliding mean of the High Frequency (HF) amplitude data. If the mean is greater than one, then the server computing device 906 generates a HF Filter event when the HF amplitude data jumps by more than a predefined multiple (e.g., five) of the mean. If the mean is less than one, then the server computing device 906 generates an event when the HF amplitude data jumps above a predefined threshold (e.g., five). It can be appreciated that, in some embodiments, the selected jump thresholds for identifying HF Filter events may vary based on different signal to noise thresholds or other features of the HF data.

3. The server computing device 906 adds the HF Filter event(s) (including, e.g., the UTC time of the event, the location, and the magnitude of the HF amplitude jump) to a correlation event queue.
4. The server computing device 906 evaluates all HF Filter jump events in the correlation event queue to identify HF Filter events that occurred within a defined time period (e.g., 400 milliseconds) and a defined proximity (e.g., ten kilometers) of each other. In some embodiments, a minimum number of events may be required to identify correlated events.
5. The server computing device 906 stores the identified HF Filter event(s) and correlated events to, e.g., long-term storage.
6. The server computing device 906 transmits alert notification messages relating to the detected HF Filter event(s) and correlated events to remote computing device 908a associated with individual homeowners where the HF Filter event(s) have been detected and/or transmit notification messages relating to the HF Filter event(s) and correlated events to remote computing device 908b of the related utilities or other grid operators.

Figure 15:
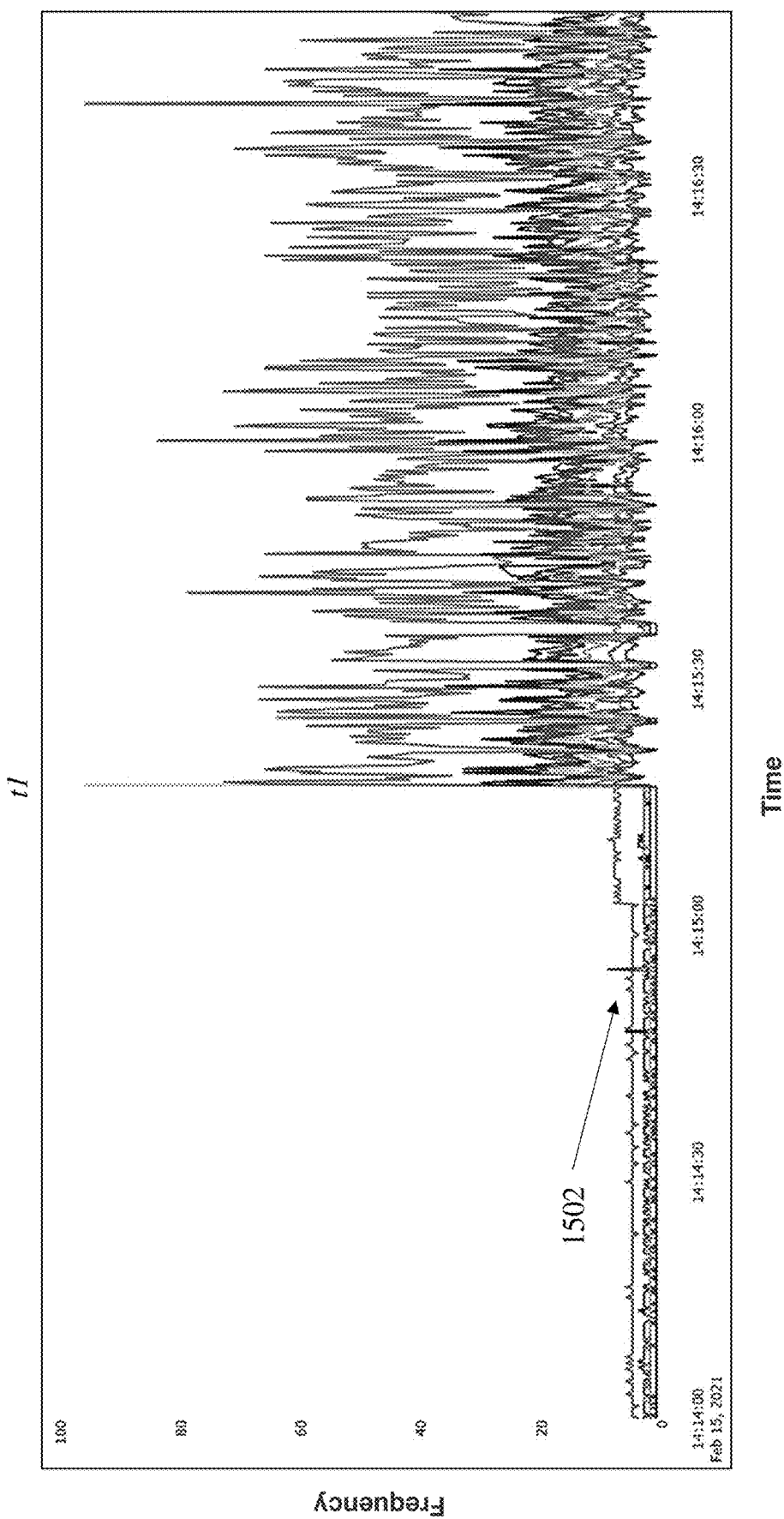
FIG. 15 is a graph showing the output signal generated by a plurality of different sensor devices during an HF Filter jump event.

FIG. 15 is a graph showing the output signal generated by a plurality of different sensor devices during a HF Filter jump event. As shown in FIG. 15, each line in the graph (e.g., line 1502) represents the output signal from a different sensor device. Around 14:15:20 (time t1), an HF Filter jump event occurred. The frequency signals received by the server computing device 906 from each of the sensor devices almost immediately increase to higher levels and are much noisier with wide variation of frequencies in each signal—indicating an HF Filter jump event was captured at the sensor devices.

It should be appreciated that the system can be further configured to detect incipient arcing events on the electrical grid. For example, when the system detects multiple HF Filter events over time without any changes in voltage or frequency of phase angle, the system can determine that the HF Filter events correspond to an incipient arcing event—thereby detecting a dangerous condition at a very early stage. The system can then alert the grid operator and/or utility provider that the arcing condition exists as well as a possible geographic area or location of the condition, so that the operator can quickly assess and remedy the problem.

Frequency Event

As mentioned above, the sensor device 902, 910, 912 can monitor certain power quality data including frequency of power coming into the home, which under certain conditions—including sudden increases or decreases—can cause damage to wiring and appliances in the home. In order to detect a frequency event, the server computing device 906 can analyze the incoming power quality data as below.

1. The server computing device 906 captures and queues a defined amount (e.g., six seconds) of frequency data.
2. The server computing device 906 calculates a sliding average of the frequency data. If the frequency jumps by more than a predefined threshold (e.g., 0.05 Hz) from the average, then the server computing device 906 generates a frequency event. The server computing device 906 also calculates the standard deviation of the frequency and generates a frequency event if (i) standard deviation changes from less than a lower threshold (e.g., 0.025 Hz) to greater than a higher threshold (e.g., 0.05 Hz) or (ii) if the standard deviation changes from greater than the higher threshold (e.g., 0.05 Hz) to less than the lower threshold (e.g., 0.025 Hz).
3. The server computing device 906 adds the frequency event (including, e.g., the UTC time of the event, the location, the maximum value of the frequency jump and the standard deviation of the frequency) to a correlation event queue.
4. The server computing device 906 evaluates all frequency events in the correlation event queue to identify frequency events that occurred within a defined time period (e.g., 400 milliseconds) and a defined proximity (e.g., ten kilometers) of each other. In some embodiments, a minimum number of events may be required to identify correlated events.
5. The server computing device 906 stores the identified frequency event and correlated events to, e.g., long-term storage.
6. The server computing device 906 transmits alert notification messages relating to the detected frequency event and correlated events to remote computing device 908a associated with individual homeowners where the frequency event have been detected and/or transmit notification messages relating to the frequency event and correlated events to remote computing devices 908 of the related utilities or other grid operators.

Figure 16:
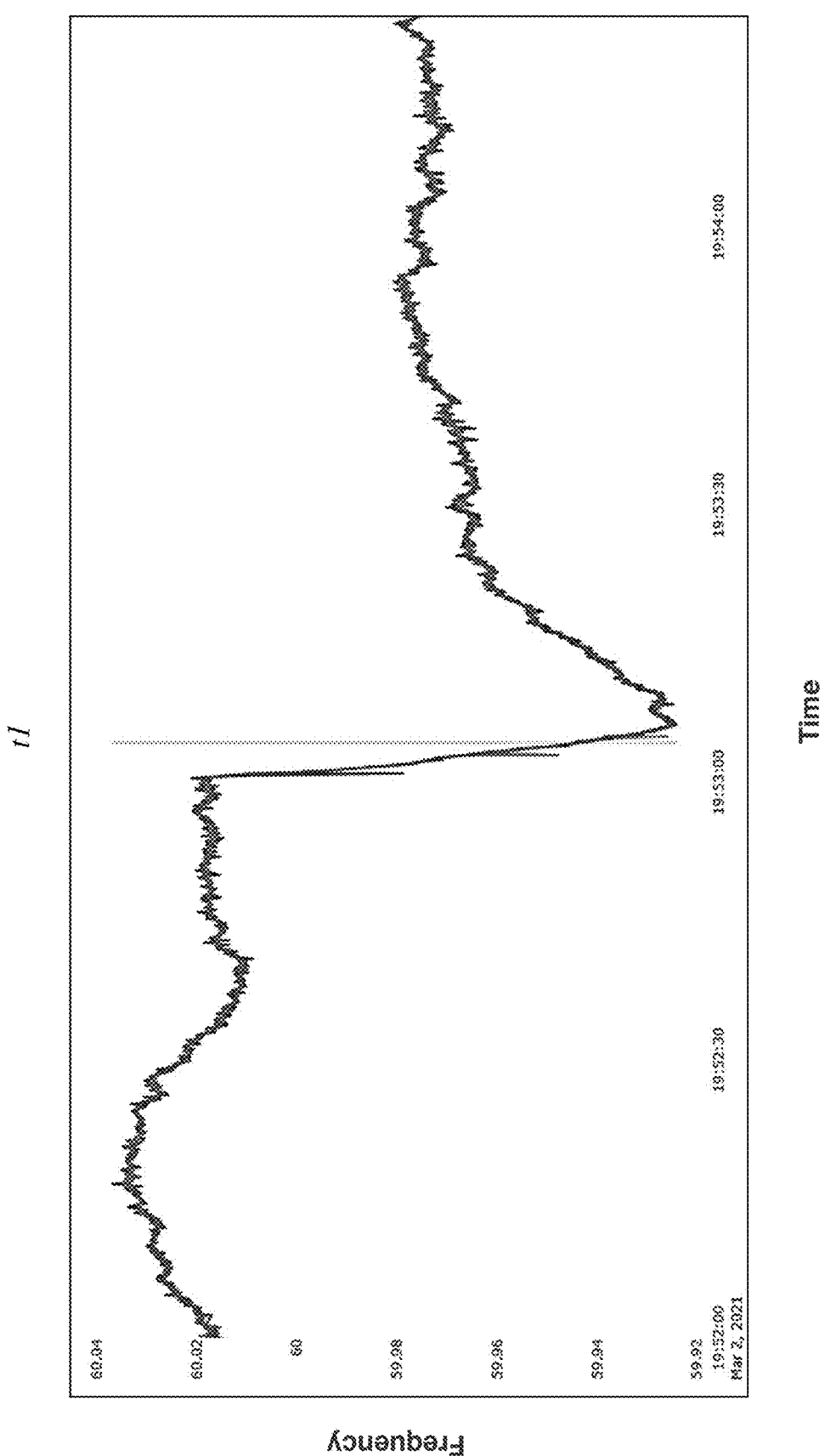
FIG. 16 is a graph showing the output signal generated by a plurality of different sensor devices during a frequency jump event.

FIG. 16 is a graph showing the output signal generated by a plurality of different sensor devices during a frequency jump event. As shown in FIG. 16, each line in the graph represents the output signal from a different sensor device. Note that in this graph, the output signals for each of the sensor devices are very close together, giving the graph an appearance of having a single line. Around 19:53:00 (time t1), a frequency event occurred. The frequency signals received by the server computing device 906 from each of the sensor devices drop to lower frequencies and then begin to rise—indicating a frequency event was captured at the sensor devices.

Loose Neutral Event

As mentioned above, a loose neutral is a very dangerous condition that can exist in the wiring of a home. Typically, a loose neutral wire becomes disconnected from its point of connection which can cause abnormally high or low voltage conditions at outlets within a home. In some cases, the current will flow to ground through other devices in a home, for example through a television set to the cable TV connection. Because large currents may flow through cable TV cables or other conductors which or not designed to handle such large currents, this can result in arcing, or situations where the conductor becomes very hot, burning its insulation off and even causing damage to its surroundings—potentially leading to an electrical fire. In some instances, a neutral wire can be resistive. The neutral's resistance is low enough to conduct some electricity, but too high to conduct as well as it should. In these cases, the neutral can become very hot at the location where the resistance is higher than normal, which may also cause a fire. In order to detect a loose neutral event, the server computing device 906 can analyze the incoming power quality data as below.

1. The server computing device 906 retrieves historical power quality event data and historical correlated event data for the particular sensor device 902, 910, 912 from, e.g., long-term storage. For example, as noted above, the system can capture and record power quality data from a sensor device in a particular home over time and store the data in long-term storage, in order to establish a historical record of power quality events associated with the home.

2. The server computing device 906 evaluates, for a single sensor device 902, the number and amplitude of surge events, surge jump events, sag events that were recorded for that sensor device 902 within a predetermined time period (such as within the last seven days) and which are not correlated with other events.

3. If the average number of surge events is greater than a predefined threshold (e.g., one) per day, or the average number of surge jump events with magnitude greater than a predefined threshold percentage (e.g., 10%) of a nominal voltage is greater than a predefined threshold (e.g., ten) per day, or the average number of sag events is greater than a predefined threshold (e.g., ten) per day (as exemplary conditions), the server computing device 906 generates a loose neutral event and can store the loose neutral event data in, e.g., long-term storage.

4. The server computing device 906 transmits a notification message relating to the loose neutral event to, e.g., a remote computing device 908a associated with the user. In some embodiments, the notification message can be also sent to, e.g., a remote computing device 908b associated with a utility provider servicing the home so that they can determine potential repairs to ameliorate the loose neutral condition.

Figure 17A:
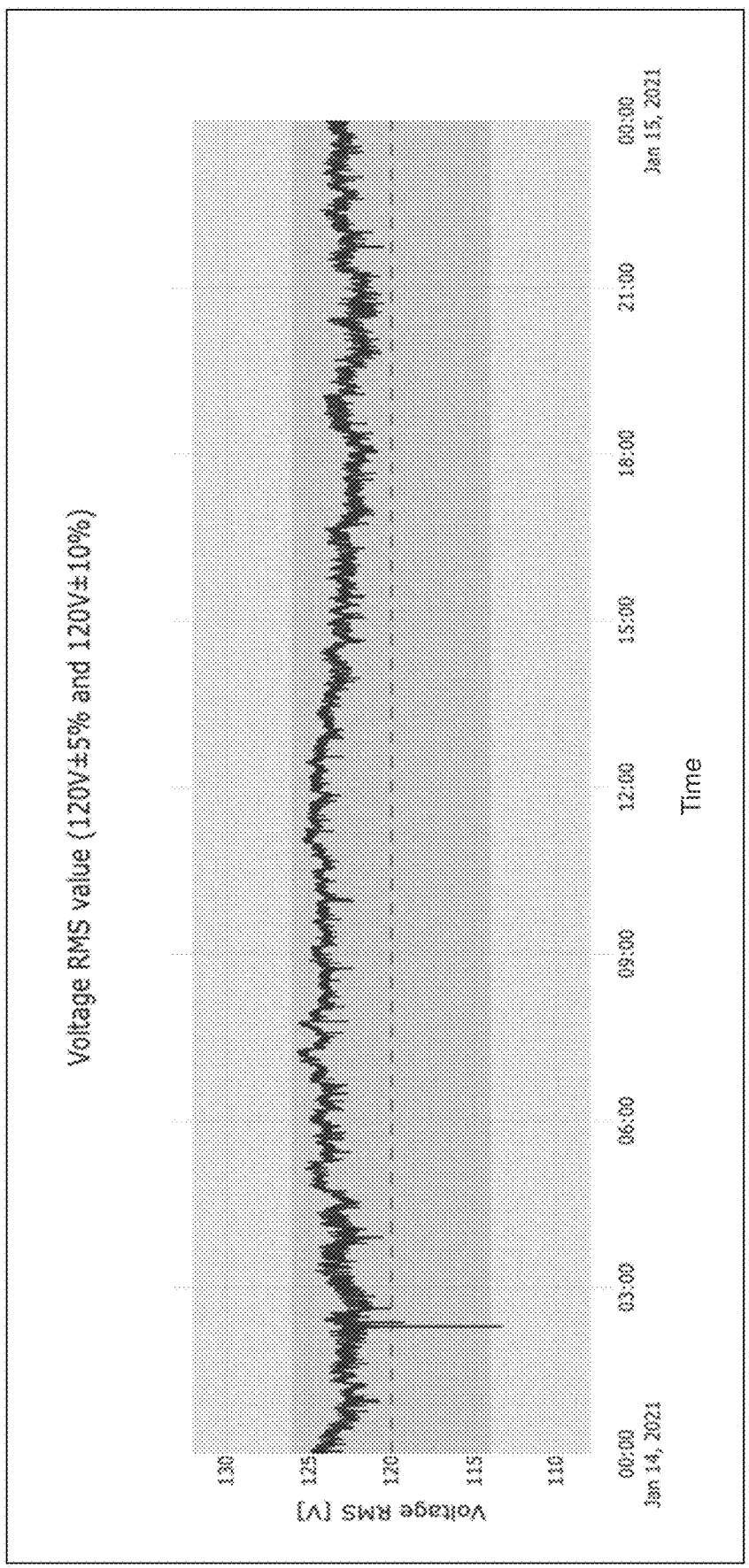
FIG. 17A is a graph of nominal Voltage Root Mean Square (RMS) readings captured by a sensor device.
Figure 17B:
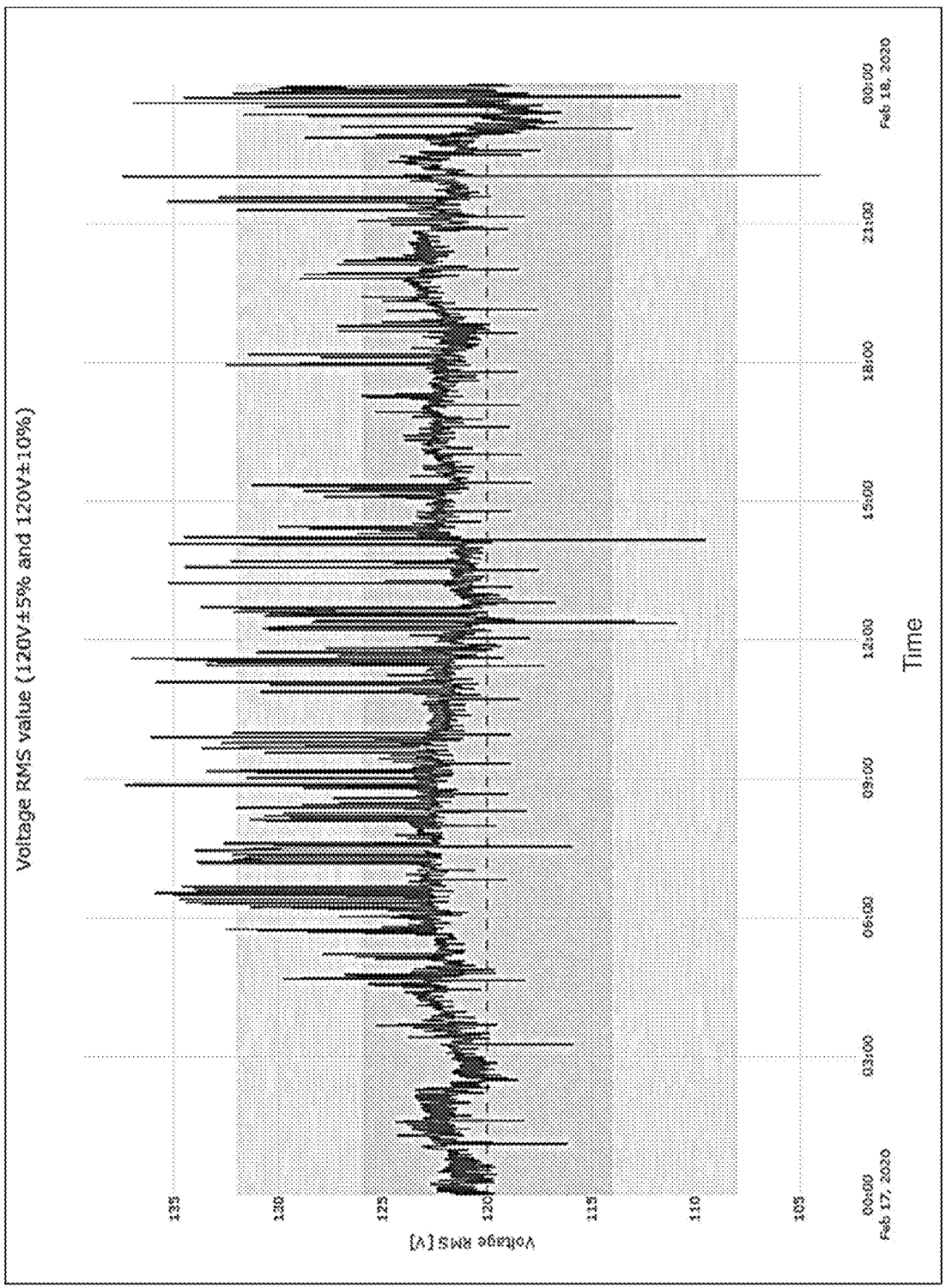
FIG. 17B is a graph of Voltage RMS readings captured by a sensor device showing an example loose neutral connection.
Figure 17C:
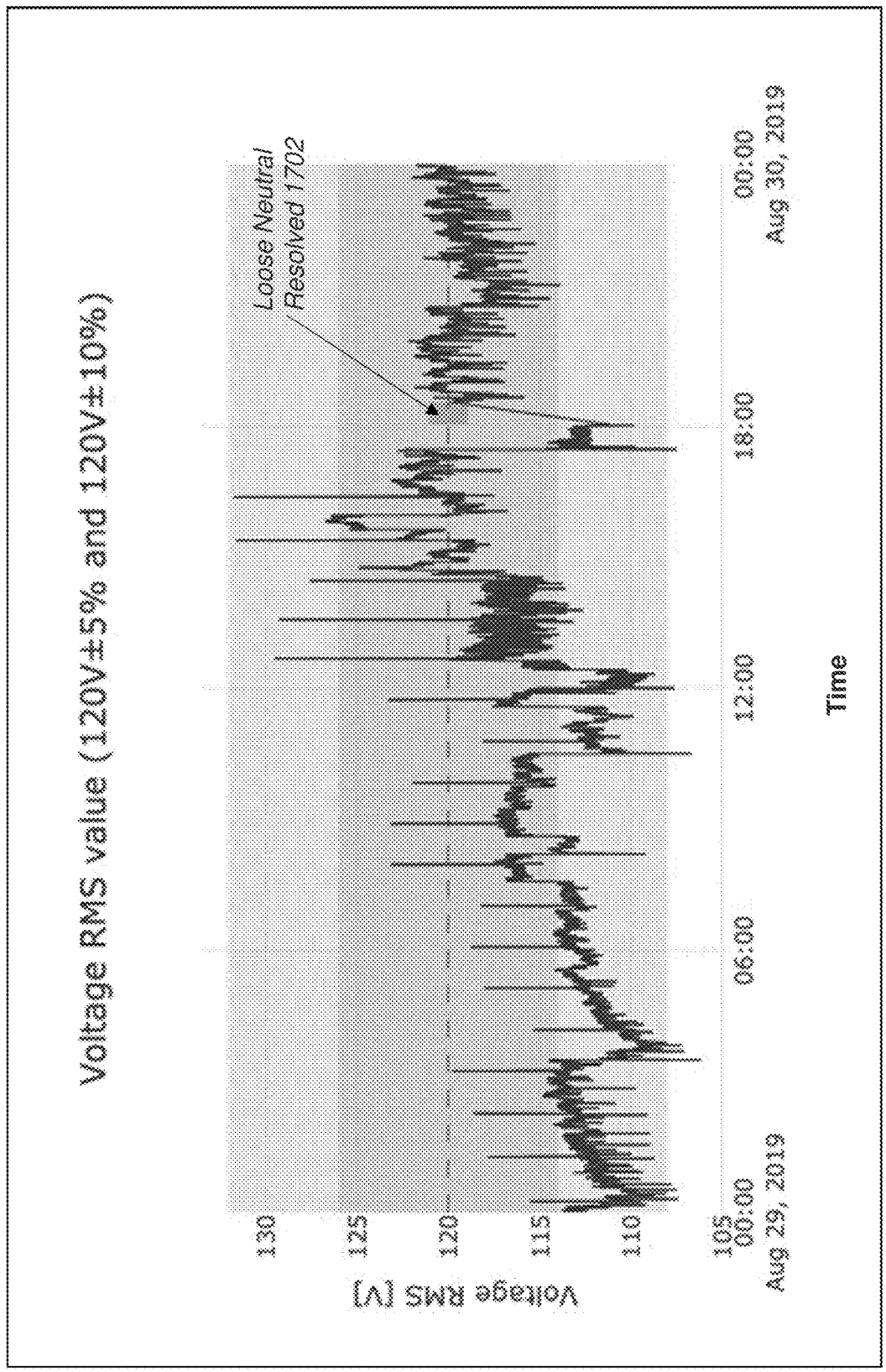
FIG. 17C is a graph of Voltage RMS readings captured by a sensor device before and after resolution of a loose neutral connection.

As an example, FIGS. 17A-17C are graphs generated from power quality data captured by a sensor device 902 relating to a loose neutral event. FIG. 17A depicts a graph of nominal Voltage RMS readings captured by a sensor device—as shown in FIG. 17A, the Voltage RMS value is relatively constant over time. But, when a loose neutral exists, the sensor device 902 captures many large positive jumps (e.g., >+10% of the nominal value) of the Voltage RMS value—as shown in the graph of FIG. 17B. Similarly, FIG. 17C is a graph that shows the Voltage RMS readings captured by a sensor device 902 before and after resolution of a loose neutral. As shown in FIG. 17C, the Voltage RMS readings contain many large jumps prior to the resolution point 1702, then the Voltage RMS readings return to the range of nominal values without the large jumps.

Below is a table detailing the number of loose neutral connections detected by sensor devices in a real world deployment of the system described herein:

| Month | # of Loose Neutrals Detected |
|---|---|
| January 2020 | 1 |
| February 2020 | 1 |
| March 2020 | 4 |
| April 2020 | 1 |
| May 2020 | 2 |
| June 2020 | 1 |
| July 2020 | 1 |
| August 2020 | 5 |
| September 2020 | 3 |
| October 2020 | 5 |
| November 2020 | 11 |
| December 2020 | 32 |
| January 2021 | 24 |
| February 2021 | 19 |

As shown above, in each case the system detected one or more loose neutral events associated with a particular sensor device and generated an alert notification to the associated end user devices, so the homeowner was made aware of the existence of the loose neutral. In each case, the loose neutral was subsequently verified and fixed by the utility provider. There are an additional 49 cases currently open and in the process of being resolved. The above data shows the significant benefit provided by the systems and methods described herein from the perspective of quickly and accurately detecting power quality problems in the home before any potential loss of property or loss of life occurs.

Recurring Power Quality Problem Event

Other types of recurring problems with power quality (e.g., frequent surges, sags, etc.) can occur when delivering electricity to a home. In order to detect these problems, the server computing device 906 can analyze the incoming power quality data as below.

1. The server computing device 906 retrieves historical power event data and historical correlated event data for the particular sensor device 902, 910, 912 from, e.g., long-term storage.

2. The server computing device 906 evaluates, for a single sensor device 902, the number and amplitude of surge events and sag events that were recorded for that sensor device 902 within a predetermined time period (such as within the last thirty days).

3. If more than a predefined number (e.g., four) of surge events or more than a predefined number (e.g., ten) of sag events occurred (as exemplary conditions), the server computing device 906 generates a recurring power quality problem event and can store the recurring power quality problem event data in, e.g., long-term storage.

4. The server computing device 906 transmits a notification message relating to the recurring power quality problem event to, e.g., a remote computing device 908a associated with the user. In some embodiments, the notification message can be also sent to, e.g., a remote computing device 908b of a utility provider servicing the home so that they can determine potential repairs to ameliorate the recurring power quality problem.

Generator On/Off Event

The methods and systems described herein can also be used to detect scenarios when alternative power generation systems (such as generators installed in homes) are activated in response to a power outage. In order to detect these situations, the server computing device 906 can analyze the incoming power quality data as below.

1. The server computing device 906 retrieves historical power event data and historical correlated event data for the particular sensor device 902, 910, 912 from, e.g., long-term storage.

2. The server computing device 906 evaluates, for a single sensor device 902, whether any power outage events and frequency events occurred.

3. If the single sensor device 902 records a power outage event, followed by a frequency standard deviation change to greater than a predefined threshold (e.g., 0.05 Hz) within a predefined period of time (e.g., sixty seconds) of the power outage event and the frequency standard deviation change was not associated with a correlated external event, then the server computing device 906 generates a "Generator On" event and can transmit a corresponding notification message to, e.g., a remote computing device 908a associated with the user of the sensor device 902.

4. If a single sensor device 902 which has previously met the conditions for a "Generator On" event records a subsequent frequency event for standard deviation of frequency change to less than 0.025 Hz, then the server computing device 906 generates a "Generator Off"

event and can transmit a corresponding notification message to, e.g., a remote computing device 908a associated with the user of the sensor device 902.

Distributed Energy Resource (DER) Stress Event

The emergence of distributed energy resources (DERs) connected to the electrical grid has caused the occurrence of power quality irregularities and fluctuations to increase. DERs typically comprise small-scale electricity supply or demand resources, usually located close to load centers. DERs can include a variety of physical embodiments, such as diesel or natural gas generators, microturbines, microgrids, photovoltaics (e.g., solar panels and solar arrays), small wind farms, battery energy storage systems, demand response systems, electric vehicle (EV) charging apparatuses, and more. In some instances, a collection of physical DERs can be aggregated together (as in individual solar arrays in a solar farm) and connected to the electrical grid as a virtual DER. From a utility's point of view, these physical DERs can appear as a single resource.

Whether connected individually or in aggregate, DERs can produce undesirable changes to the power quality of the electrical grid, most often localized to the portion of the grid to which the DER is connected. For example, DERs can introduce harmonic distortion effects on voltage and current waveforms—resulting in damage to and errors in the distribution network, such as overstressing of capacitor banks, abnormalities in protection system coordination, thermal effects in electric machines, control system malfunctions, transformer overheating, degradation and premature aging, and neutral conductor overloading. Therefore, it is crucial to detect characteristics of DER stress (i.e., harmonic distortion) in order to address infrastructure concerns and develop mitigation strategies.

In order to detect a DER stress power quality event, the server computing device 906 can analyze the incoming power quality data as below.

1. The server computing device 906 captures and queues a defined amount (e.g., six seconds) of amplitude of the voltage sine wave harmonics data from one or more of the sensor devices 902, 910, 912.
2. The server computing device 906 measures one or more characteristics of the harmonic distortion (such as total harmonic distortion (THD)) in each sample of voltage sine wave harmonics data.
3. In some embodiments, the server computing device 906 retrieves historical power event data and historical correlated event data for the particular sensor devices 902, 910, 912 from, e.g., long-term storage and compares one or more characteristics of the harmonic distortion in the historical power event data with the harmonic distortion detected in the sampled data.
4. The server computing device 906 determines whether the harmonic distortion data can be attributed to one or more DERs, e.g., based on a particular type of harmonic distortion signature associated with the DERs.
5. If the server computing device 906 identifies from the harmonic distortion data that either (i) a DER stress power quality event is present (e.g., through comparison of the sample data with historical data) or (ii) the THD meets certain characteristics, the server computing device 906 generates a DER stress power quality event and can store the DER stress power quality event data in, e.g., long-term storage.
6. The server computing device 906 transmits a notification message relating to the DER stress power quality event to, e.g., a remote computing device 908b of a utility provider servicing one or more of the homes so that they can determine potential strategies and/or repairs to address the DER stress power quality event.

Voltage Regulator Event

Most electrical distribution systems incorporate voltage regulators which create and maintain a fixed output voltage, irrespective of changes to the input voltage or load conditions. These voltage regulators are able to add or subtract voltage to provide consistent voltage levels. Generally, a voltage regulator senses system voltage and when voltage changes are needed, a load tap changer operates to adjust the voltage. It is useful for many reasons that utilities and energy providers can quickly detect when a voltage regulator is activated. For example, a voltage regulator may malfunction (e.g., step the voltage up or down to result in voltage that is outside a required or recommended range) or a voltage regulator may be addressing a sudden change in the voltage levels of the system that are caused by another power quality event. The systems and methods described herein can detect such changes to voltage caused by voltage regulators and notify appropriate personnel of both the regulator event and the approximate location of the voltage regulator that is active so that they can efficiently diagnose and remediate the problem.

In order to detect a voltage regulator event, the server computing device 906 can analyze the incoming power quality data as below.

1. The server computing device 906 captures and queues a defined amount (e.g., six seconds) of RMS Voltage amplitude data from one or more of the sensor devices 902, 910, 912.
2. The server computing device 906 measures one or more characteristics of the RMS Voltage amplitude data (e.g., voltage level, voltage changes) from one or more of the samples.
3. In some embodiments, the server computing device 906 retrieves historical power event data and historical correlated event data for the particular sensor devices 902, 910, 912 from, e.g., long-term storage and compares one or more characteristics of the voltage changes and/or voltage levels in the historical power event data with the voltage characteristics detected in the sampled data.
4. If the server computing device 906 identifies that a voltage regulator event has occurred, the server computing device 906 generates a voltage regulator power quality event and can store the voltage regulator power quality event data in, e.g., long-term storage.
5. The server computing device 906 transmits a notification message relating to the voltage regulator power quality event to, e.g., a remote computing device 908b of a utility provider servicing one or more of the homes so that they can identify which particular voltage regulator is active and take steps to address any issues as necessary.

Figure 18A:
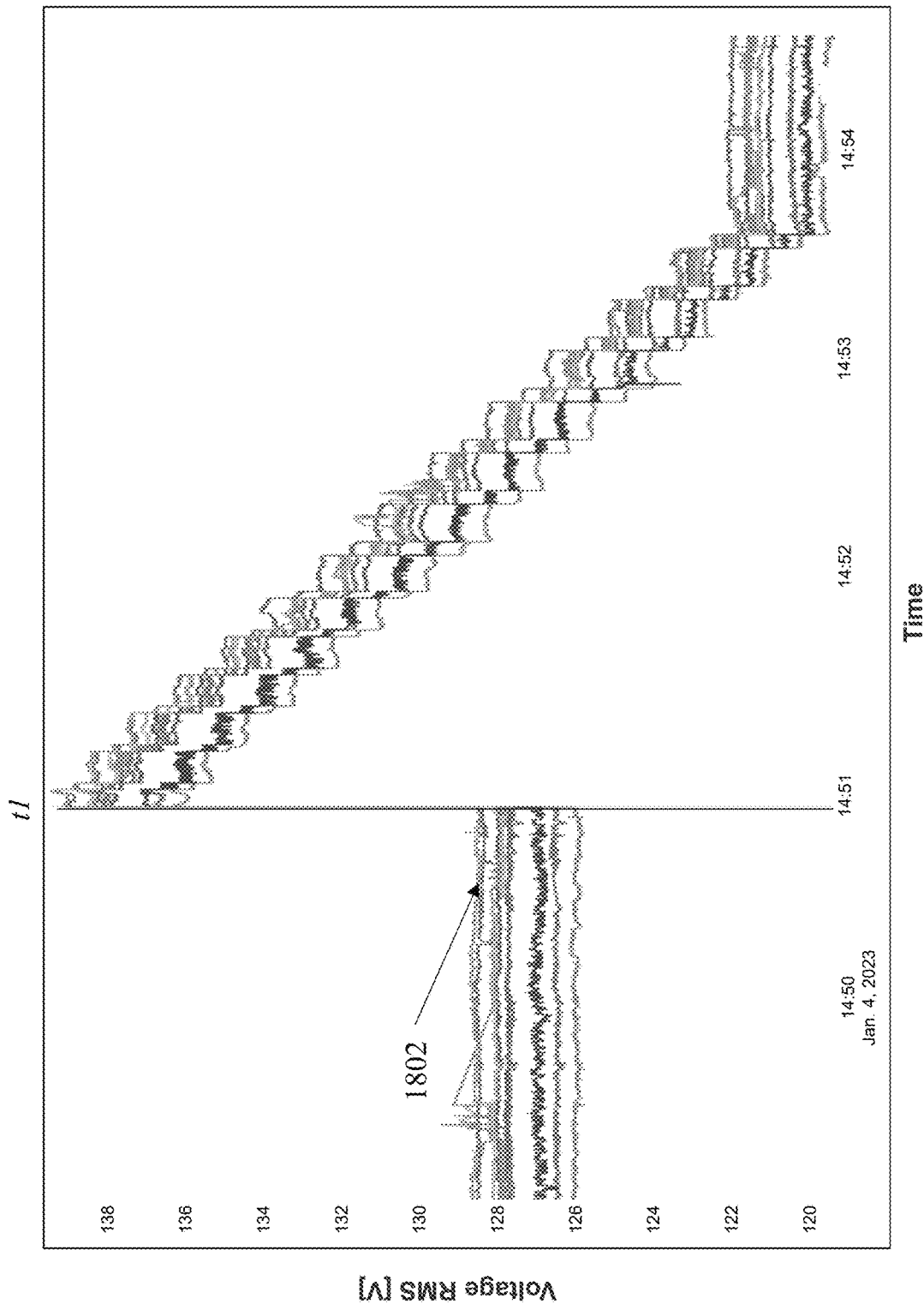
FIG. 18A is a graph showing the output signal generated by a plurality of different sensor devices during a voltage regulator power quality event.

FIG. 18A is a graph showing the output signal generated by a plurality of different sensor devices during a voltage regulator power quality event. As shown in FIG. 18A, each line in the graph (e.g., line 1802) represents the output signal from a different sensor device. Just before 14:51 (time t1), there is a sudden spike in voltage level, from approximately 126-128V to 136-138V, caused by a voltage regulator erroneously increasing voltage, and this creating a power surge event (high voltage which can damage equipment, appliances and devices that receive such voltage). The voltage regulator then gradually steps the voltage level down to between 120V-122V from 14:51 to 14:54 (as indicated by the stair-like pattern in the graph). As can be appreciated, the server computing device 106 can detect this voltage pattern quickly when it happens and automatically determine that it is attributable to a voltage regulator power quality event.

Figure 18B:
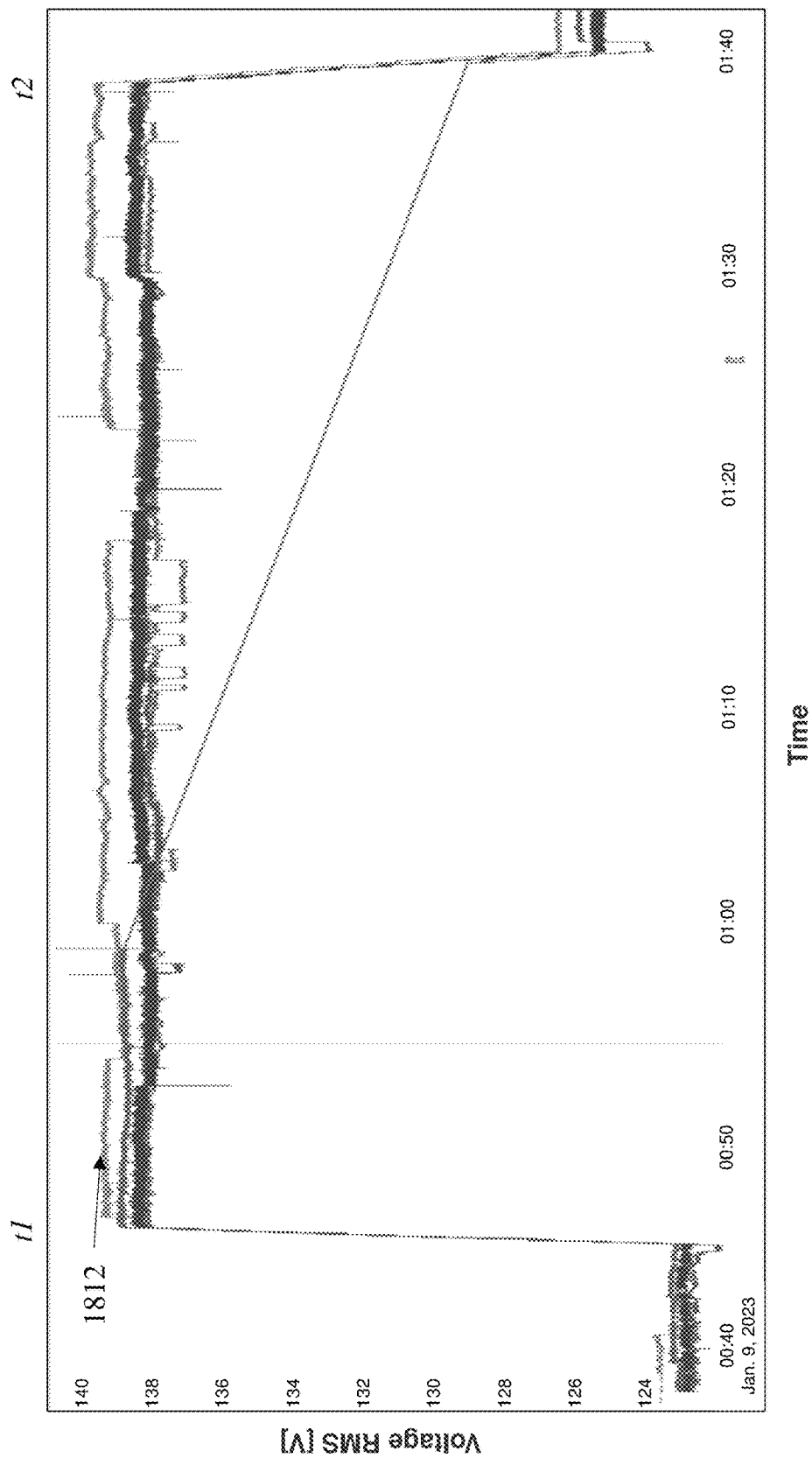
FIG. 18B is a graph showing the output signal generated by a plurality of different sensor devices during a voltage regulator power quality event.

FIG. 18B is a graph showing the output signal generated by a plurality of different sensor devices during another voltage regulator power quality event. As shown in FIG. 18B, each line in the graph (e.g., line 1812) represents the output signal from a different sensor device. Between time 00:40 and 00:50 (time t1), there is a sudden spike in voltage level, from approximately 122-124V to 138-140V, caused by a voltage regulator erroneously increasing voltage, and this creating a power surge event (high voltage which can damage equipment, appliances and devices that receive such voltage). The voltage regulator maintains this high voltage level for approximately one hour, until 01:40 (time t2). Then, the voltage regulator steps down the voltage level back to around the original levels, roughly 124-126B. As can be appreciated, the server computing device 106 can detect this voltage pattern as a signature for a voltage regulator malfunction and automatically assign it as a voltage regulator power quality event.

Failing/Overloaded Transformer Event

Transformers are equipment in the electrical grid that change the voltage of electricity up or down. Often, transformers are deployed in substations, where they transform electricity supplied by upstream generator facilities (e.g., power plants) into a voltage suitable for downstream consumers (e.g., homes). Thus, it can be appreciated that well-performing transformers are essential to normal operation of the grid. Over time, transformers are susceptible to aging (e.g., insulation degradation, overloading, overheating, leaking, moisture absorption) that can impair their ability to perform optimally and eventually lead to failure. It is crucial to identity whether a transformer is overloaded, weakening, or beginning to fail as soon as possible so maintenance and, if necessary, replacement of the transformer can be performed to avoid interruption of service and damage to downstream entities.

In order to detect a failing transformer/overloaded transformer event, the server computing device 906 can analyze the incoming power quality data as below.

1. The server computing device 906 captures and queues a defined amount (e.g., six seconds) of RMS Voltage amplitude data from one or more of the sensor devices 902, 910, 912.
2. The server computing device 906 measures one or more characteristics of the RMS Voltage amplitude data (e.g., voltage level, voltage changes) from one or more of the samples.
3. In some embodiments, the server computing device 906 retrieves historical power event data and historical correlated event data for the particular sensor devices 902, 910, 912 from, e.g., long-term storage and compares one or more characteristics of the voltage changes and/or voltage levels in the historical power event data with the voltage characteristics detected in the sampled data.
4. If the server computing device 906 identifies that a failing transformer/overloaded transformer event has occurred, the server computing device 906 generates a failing transformer power quality event and can store the failing transformer power quality event data in, e.g., long-term storage.
5. The server computing device 906 transmits a notification message relating to the failing transformer power quality event to, e.g., a remote computing device 908*b* of a utility provider servicing one or more of the homes so that they can identify which particular transformer is affected and take steps to address any issues as necessary.

Figure 19:
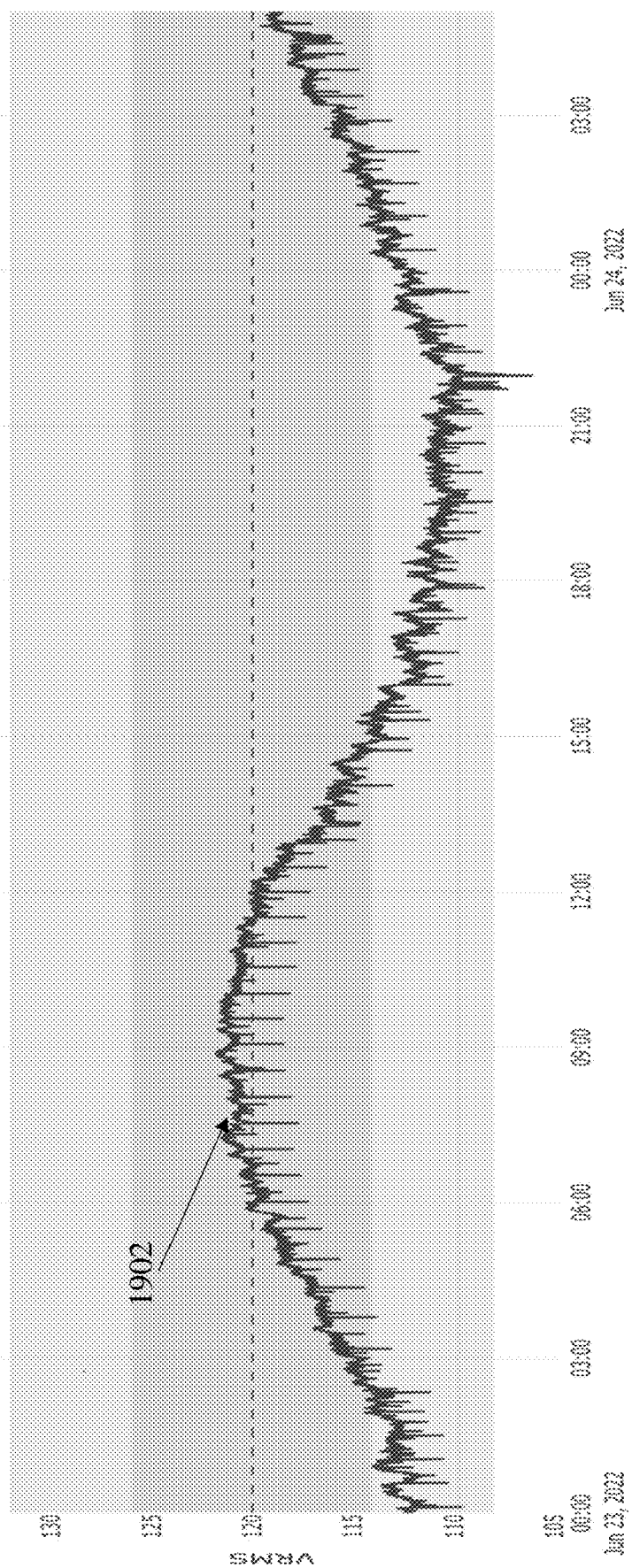
FIG. 19 is a graph showing the output signal generated by a sensor device during a failing transformer power quality event.

FIG. 19 is a graph showing the output signal generated by one or more sensor devices during a failing transformer power quality event. As shown in FIG. 19, line 1902 represents the output signal from a sensor device that is receiving power from a failing or overloaded transformer. Over the course of a defined time period (e.g., 24 hours), the RMS Voltage data exhibits a clear sinusoidal pattern which indicates a transformer is overloaded or struggling to provide power. As can be appreciated, the server computing device 106 can detect this voltage pattern quickly when it happens and automatically determine that it is attributable to a transformer in the gird that is providing power to the home.

Recloser Event

As mentioned previously, some energy providers and utilities deploy automatic circuit reclosers in their distribution systems. A recloser is a circuit breaker with integrated current and voltage sensors and a protection relay. These reclosers are generally designed to use on overhead lines to detect and interrupt transient faults resulting from a variety of different circumstances, including lightning strikes, surges, or objects coming into contact with the lines. Generally, a recloser is designed to execute an open-close duty cycle, where the recloser trips (i.e., opens the circuit) upon detecting a transient fault and then automatically attempts to re-close the circuit after a brief period of time.

However, this operation can be problematic in certain areas, particularly in areas where there is a high risk of wildfires such as portions of the western United States. For example, multiple cycles of a recloser event in a dry, high vegetation area may generate sparks which could lead to ignition of a devastating wildfire. As a result, rapid identification of recloser events, including estimation of their location in the grid, is essential to prevent significant damage from spontaneous and uncontrolled fires.

1. The server computing device 906 captures and queues a defined amount (e.g., six seconds) of RMS Voltage amplitude data from one or more of the sensor devices 902, 910, 912.
2. The server computing device 906 measures one or more characteristics (e.g., spikes or changes) in each sample of RMS Voltage amplitude data.
3. In some embodiments, the server computing device 906 retrieves historical power event data and historical correlated event data for the particular sensor devices 902, 910, 912 from, e.g., long-term storage and compares one or more characteristics of the activity in the historical power event data with the activity detected in the sampled data.
4. The server computing device 906 determines whether the activity detected in the sample data can be attributed to a recloser event, e.g., based on a particular type or pattern of activity known to be associated with a recloser event.
5. If the server computing device 906 identifies that a recloser event is occurring, the server computing device 906 generates a recloser event and can store the recloser event data in, e.g., long-term storage.
6. The server computing device 906 transmits a notification message relating to the recloser event to, e.g., a remote computing device 908*b* of a utility provider servicing one or more of the homes so that they can quickly disable the specific recloser before it leads to a hazard.

Figure 20:
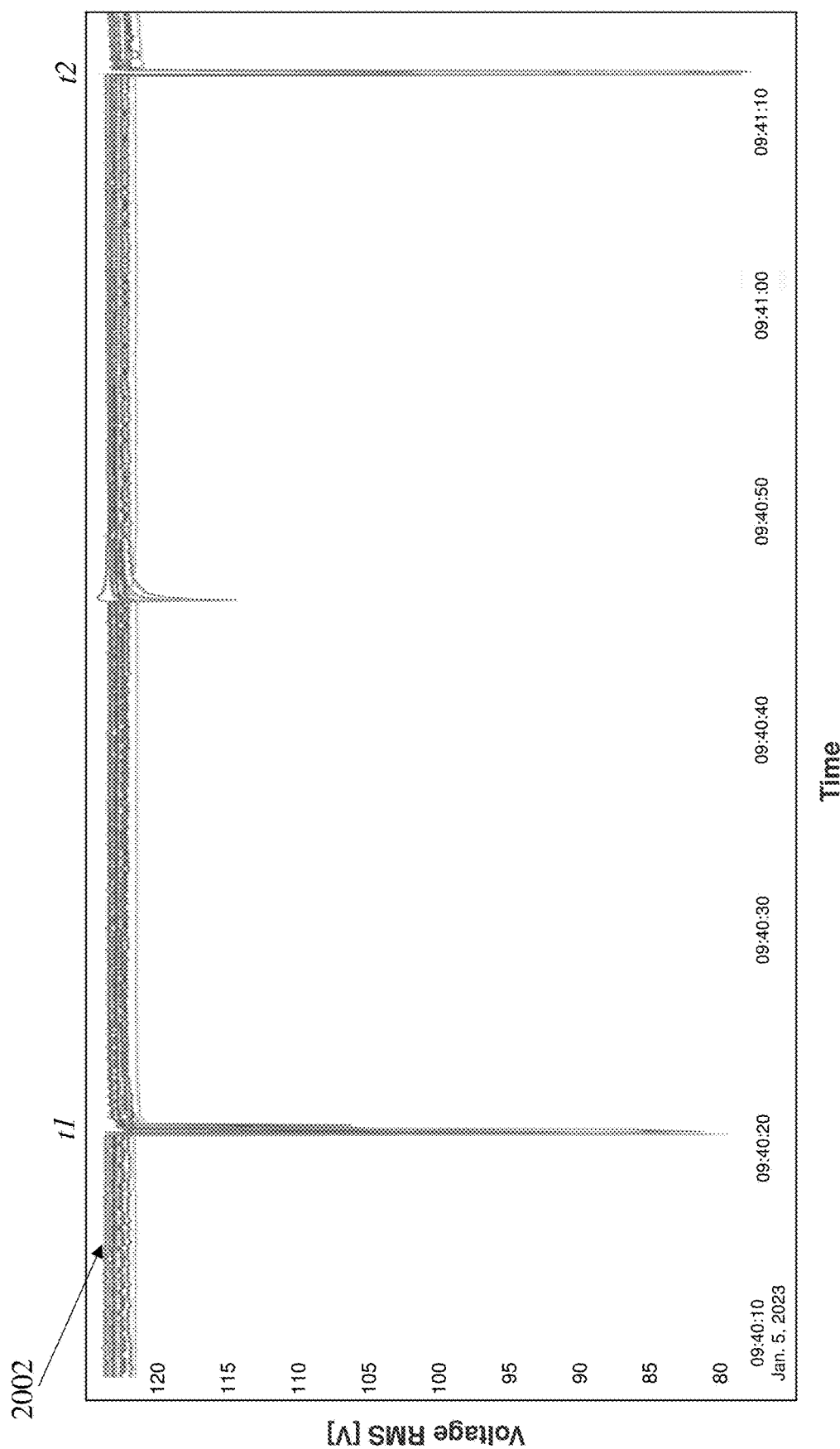
FIG. 20 is a graph showing the output signal generated by a plurality of different sensor devices during a recloser power quality event.

FIG. 20 is a graph showing the output signal generated by a plurality of different sensor devices during a recloser power quality event. As shown in FIG. 20, each line in the graph (e.g., line 2002) represents the output signal from a different sensor device. Just after 09:40:20 (time t1), there is a sudden transient drop in voltage, from approximately 120V to 80V. This activity relates to a recloser device tripping due to a fault event (e.g., a tree hits a distribution line), thereby de-energizing the circuit. After a period of time, the recloser attempts to reset itself but trips again around 09:41:12 (time t2), causing another transient drop in voltage from approximately 120V to 80V. As can be appreciated, the server computing device 106 can detect this voltage pattern quickly when it happens and automatically determine that it is attributable to operation of a recloser in a particular location, then notify the appropriate utility personnel to disable the recloser if necessary.

Location Estimation and Grid Topology Discovery

As can be appreciated, another key facet of the methods and systems described herein is the ability to capture, analyze, and cross-correlate power quality data from a plurality of sensor devices to estimate an originating location of one or more power quality events so that appropriate individuals, businesses, and residential homes can be notified. In this context, the term "location" includes any indicia that provides information about the actual or potential originating location of the power quality event, including but not limited to: geographical coordinates (latitude/longitude) of the sensor device(s), physical address information associated with the sensor device(s) (e.g., street number, street name, city/state, zip code), identity of the utility provider(s) servicing the home, identification of specific components of the electrical grid (such as feeder lines, capacitor banks, transformer taps, voltage regulators, circuit breakers, DERs) to which the sensor device(s) are connected, localization of an area where damage has occurred to one or more components of the grid (e.g., a tree limb contacting an overhead line, a downed utility pole), determination of electrical phase on which the sensor device(s) receive power, location data associated with other types of grid faults or malfunctioning, or any combination thereof. In addition, the power quality data analysis performed by the system can be used advantageously to generate a topology of the electrical grid (via, e.g., backmapping power quality data detected by a plurality of distributed sensor devices to identify common upstream components and infrastructure of the electrical grid).

Figure 21:
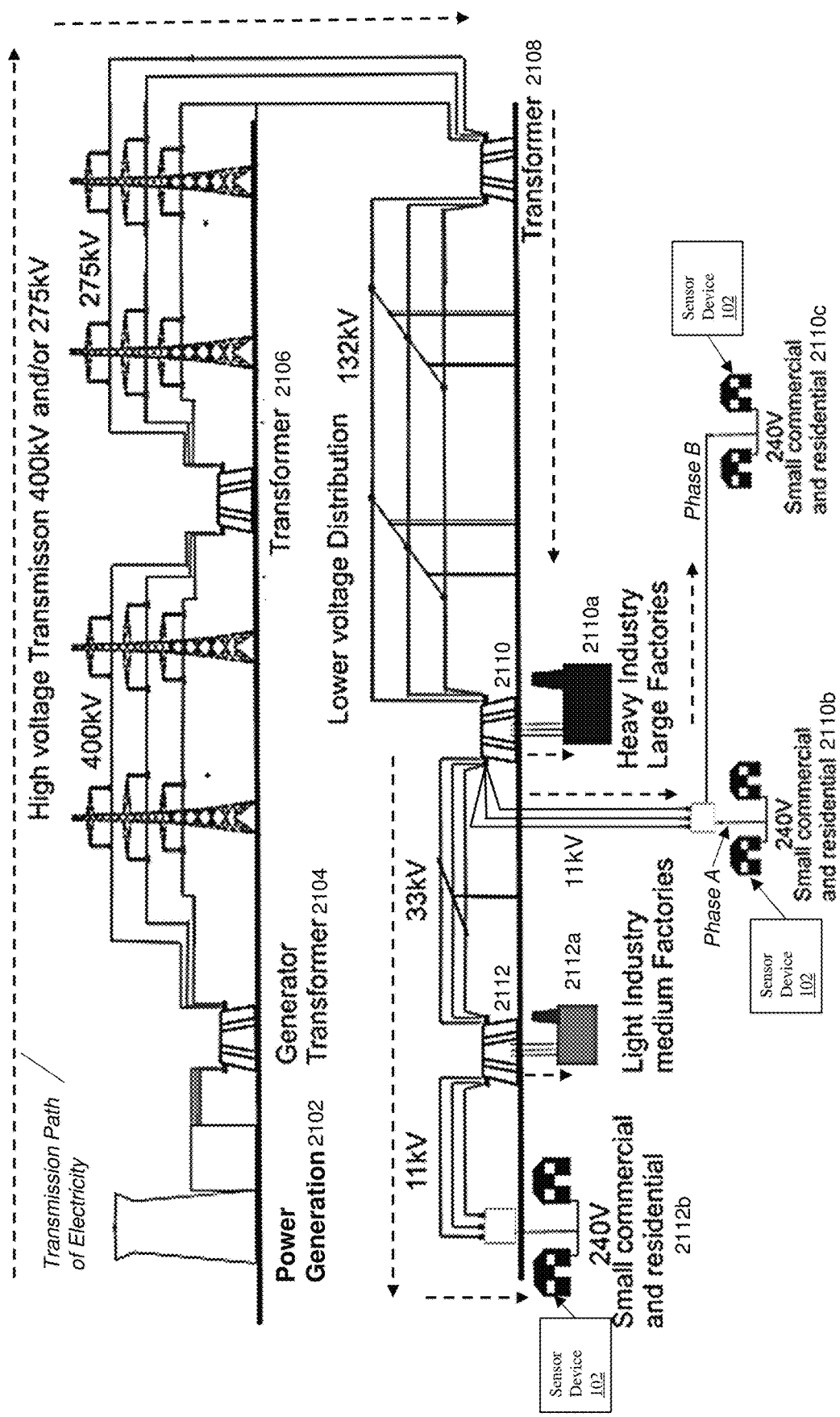
FIG. 21 is a diagram of an exemplary electrical grid infrastructure.

FIG. 21 is a diagram of an exemplary electrical grid infrastructure 2100. As shown in FIG. 21, the infrastructure includes a power generation site 2102 that provides electricity to each of the other components in the grid in a logical transmission path (as indicated by the dashed arrows in FIG. 21) until reaching the end of the transmission path (e.g., at the homes/buildings in the small commercial and residential nodes 2110c, 2112b, at the light industry node 2112a, at the heavy industry node 2110a). Thus, a component that receives electricity directly or indirectly from one or more other component(s) can be considered 'downstream' of those other components. Likewise, a component that delivers electricity directly or indirectly to one or more other component(s) can be considered 'upstream' from those other components.

A sensor device can be installed in one or more of the endpoints in the electrical grid (i.e., homes in nodes 2110b, 2110c, and 2112b) for the purpose of capturing power quality data as described herein. Each of the sensor devices captures power quality data and transmits the power quality data to, e.g., the server computing device 106, which can advantageously analyze and cross-correlate the power quality data received from individual sensor devices, in conjunction with other data known about the location where the sensor device is installed, in order to estimate a location of a grid area or component that may be causing a particular power quality event.

In this context, cross-correlation of the power quality data received from one or more individual sensor devices can be performed by the server computing device 106 using any of a number of different techniques. In some embodiments, the server computing device 106 compares one or more characteristics of the power quality data received from each of the sensor devices to determine whether the devices detected the same power quality event. For example, the server computing device 106 can identify a pattern of voltage or amplitude values/changes, harmonic distortion values, or other attributes (i.e., a 'signature') occurring in each power quality data sample received from the sensor devices at approximately the same time. When two or more sensor devices capture power quality data exhibiting the same pattern or highly similar patterns, the server computing device 106 can determine that the devices experienced the same power quality event. Based upon other information known about the respective devices (e.g., geographic coordinates, installation address, utility provider, etc.), the server computing device 106 can rapidly localize the power quality event.

The server computing device 106 can perform localization of the power quality event in the grid using a number of different techniques:

1) Geographical Centroid: the simplest approach is to calculate a geographical centroid based upon the locations of each of the sensor devices that measured the identified power quality event. In one example, the server computing device 106 calculates the geographical centroid using only the latitude and longitude associated with the locations of each of the sensor devices. An exemplary calculation based upon three sensor devices is provided below:

$$\text{Coordinates of First Device} = (x1, y1)$$

$$\text{Coordinates of Second Device} = (x2, y2)$$

$$\text{Coordinates of Third Device} = (x3, y3)$$

$$\text{Coordinates of Geographical Centroid} = \left(\frac{x1 + x2 + x3}{3}, \frac{y1 + y2 + y3}{3}\right)$$

Weighted Centroid: another approach is to calculate a weighted geographical centroid based upon the locations of each of the sensor devices that measured the identified power quality event and the relative amplitudes of the power measured by each device. As can be appreciated, the magnitude of the signal associated with a power quality event diminishes as one gets further from the source of the event. In one example, server computing device 106 calculates the weighted centroid using the latitude and longitude associated with the locations of each of the sensor devices weighted by the relative amplitude detected by the corresponding device. An exemplary calculation based upon three sensor devices is provided below:

Coordinates of First Device = $(x1, y1)$;

Amplitude Detected = 150 V; Weight = $w1$

Coordinates of Second Device = $(x2, y2)$;

Amplitude Detected = 140 V; Weight = $w2$

Coordinates of Third Device = $(x3, y3)$;

Amplitude Detected = 130 V; Weight = $w3$

Coordinates of Geographical Centroid =

$$\left( \frac{(x1*w1)+(x2*w2)+(x3*w3)}{3}, \frac{(y1*w1)+(y2*w2)+(y3*w3)}{3} \right)$$

Time of Arrival (TOA): the server computing device can also estimate a location of the power quality event based upon relative times of arrival associated with detection of the power quality event by the corresponding sensor devices. In most circumstances, sensor devices that are situated closer to a power quality event will detect the event before sensor devices situated further away from the event. As a result, the relative difference in TOA between the power quality data captured by each device can be used along with the locations of each of the sensor devices to estimate the location of the power quality event. An exemplary calculation based upon three sensor devices is provided below:

Coordinates of First Device = $(x1, y1)$;

Event Captured at time $t1$; Weight = $w1$

Coordinates of Second Device = $(x2, y2)$;

Event Captured at time $t1+10$; Weight = $w2$

Coordinates of Third Device = $(x3, y3)$;

Event Captured at time $t1+20$; Weight = $w3$

Coordinates of Power Quality Event =

$$\left( \frac{(x1*w1)+(x2*w2)+(x3*w3)}{3}, \frac{(y1*w1)+(y2*w2)+(y3*w3)}{3} \right)$$

Figure 22:
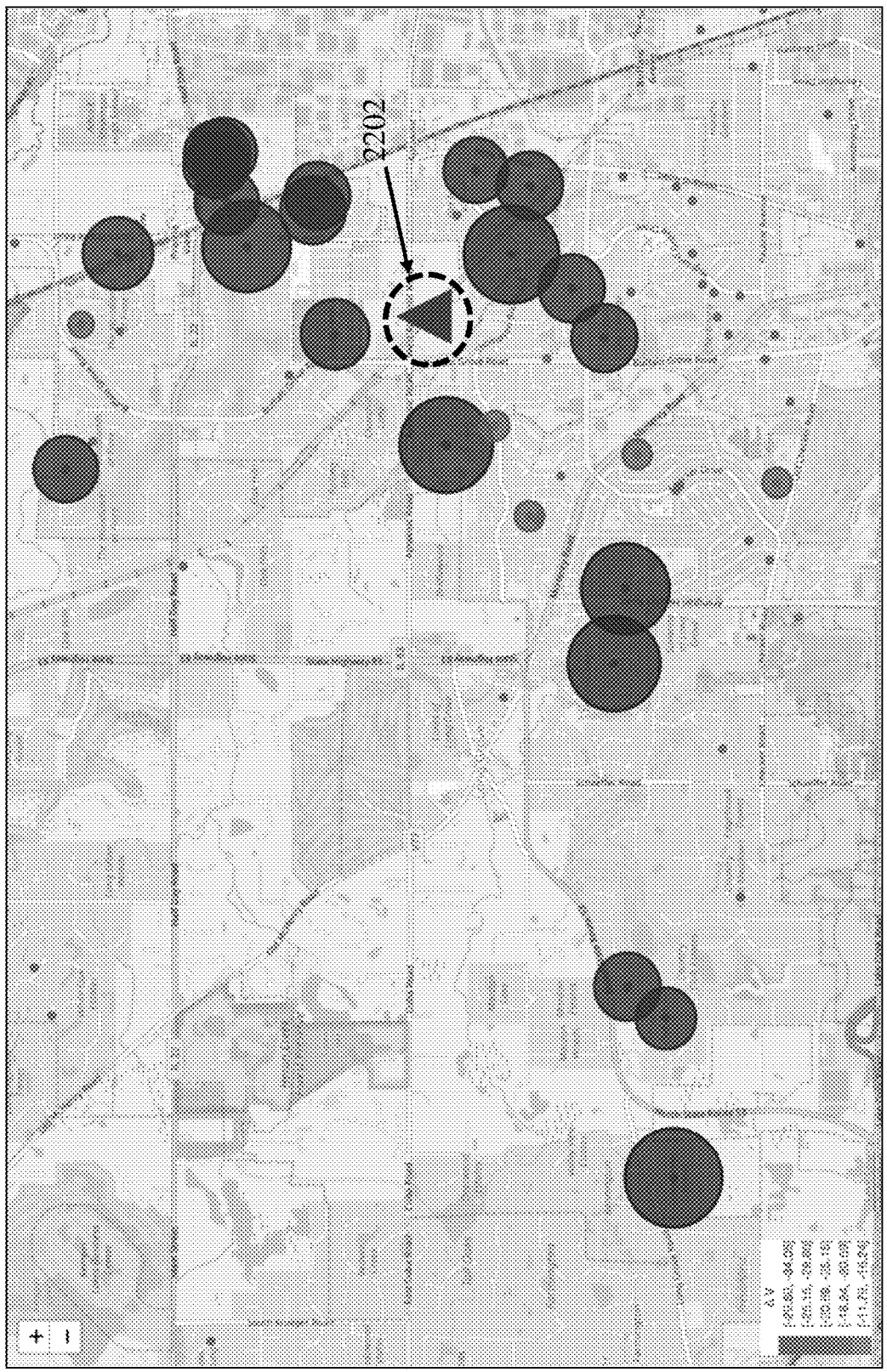
FIG. 22 is a diagram of a geographic map generated by the server computing device that depicts locations of sensor devices that have detected a power quality event and provides an estimated originating location of the power quality event based upon a weighted centroid calculation.

FIG. 22 is a diagram of a geographic map generated by the server computing device 106 that depicts locations of sensor devices that have detected a power quality event and provides an estimated location of the power quality event based upon a weighted centroid calculation. As shown in FIG. 22, each circle positioned on the map corresponds to the location of an sensor device that measured a power quality event (in this case, a drop in voltage). The size of the circle corresponds to the measured change in voltage, where larger circles indicate measurement of a relatively larger voltage drop and smaller circles indicate measurement of a relatively smaller voltage drop. Using this information, the server computing device 106 generates a weighted centroid 2202 that approximates the location of one or more grid components that caused the voltage drop. As can be appreciated, the weighted centroid 2202 is near a majority of the sensor devices that measured the voltage drop and roughly in the center of those sensor devices that detected the largest voltage drop. The server computing device 106 transmits the map and/or other information relating to the estimated location of the voltage drop to, e.g., a remote computing device associated with one or more utility provider(s) that service the buildings where the relevant sensor devices are installed. In this case, a substation is located in the middle of weighted centroid 2202. The utility can quickly identify this substation as the likely cause of the voltage drop and send technicians to the site to assess the equipment and determine any needed repairs.

Figure 23:
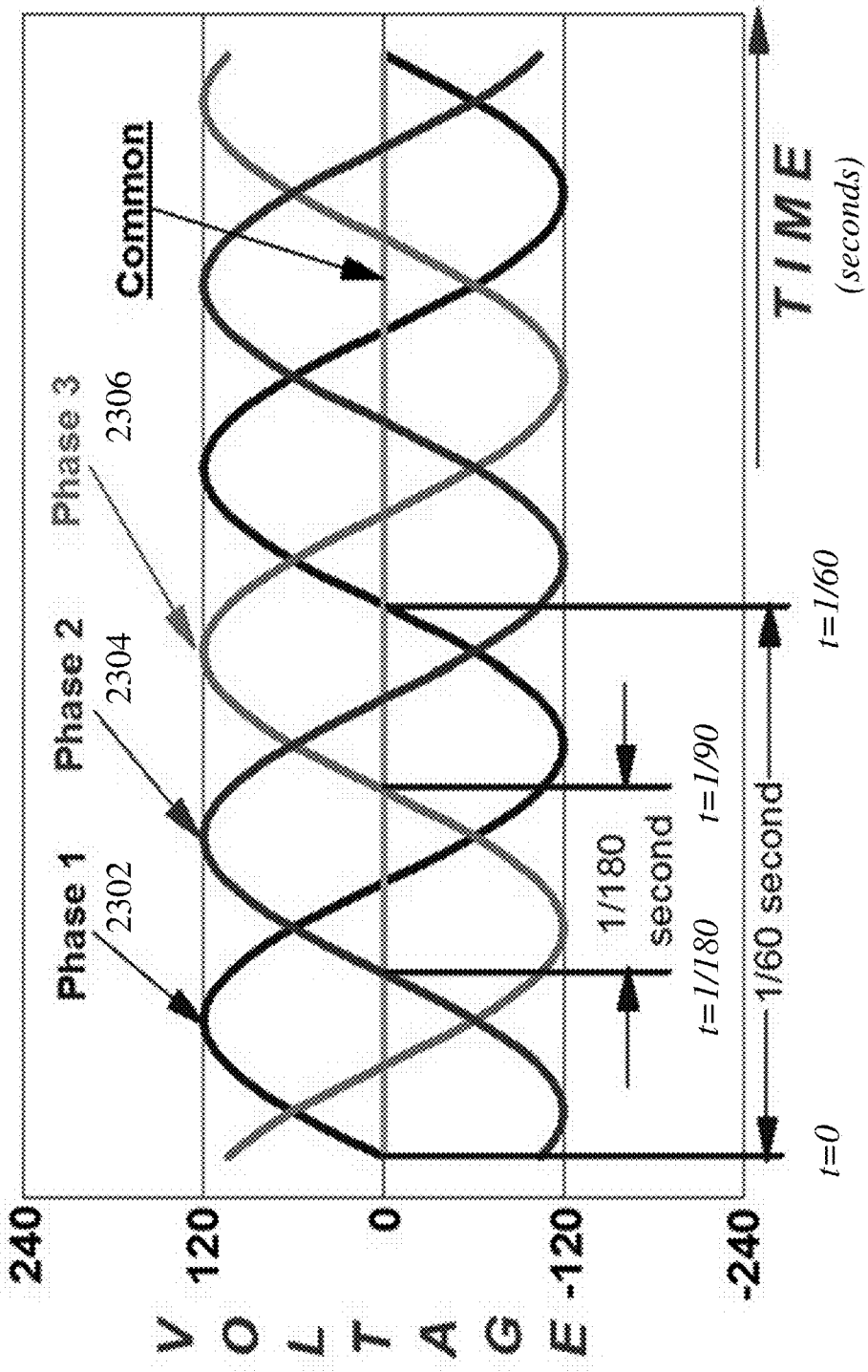
FIG. 23 is a diagram of an exemplary voltage curve graph showing the three different phases of power.

The server computing device 106 can also identify a specific phase on which each sensor device receives power and use that information to generate or refine the localization of a power quality event. Generally, most electrical distribution systems in the United States are configured to transmit electric power using a network of three wires or lines (with a fourth wire being a neutral return), each line carrying electrical current that is 120 degrees (or ⅓ of a cycle) out of phase with the other two lines. FIG. 23 is a diagram of an exemplary voltage curve graph showing the three different phases of power. As shown in FIG. 23, the phase 1 signal 2302 begins a cycle at time t=0 and completes the cycle ¹⁄₆₀ second later at time t=¹⁄₆₀. The phase 2 signal 2304 begins a cycle at time t=¹⁄₁₈₀, and the phase 3 signal 2306 begins a cycle at time t=¹⁄₉₀. Because residential homes in the U.S. are connected to only one of the three lines and thus receive a single phase of power, the server computing device 106 can advantageously incorporate this information into the location estimation process. When one or more sensor devices in proximity to each other measure a power quality event, the server computing device 106 can utilize the relative phase information to distinguish between potential locations where the power quality event may be occurring. For example, Sensor Device A is installed in a first home that receives power on phase 1. Sensor Device B is installed in a second home in proximity to the first home (e.g., a couple of streets over) and receives power on phase 2. The server computing device 106 determines that Device A detected a power quality event at time t. The server computing device 106 determines that Device B did not detect the same power quality event at time t. Because the server can determine that the two homes are on different phases, the server computing device 106 can estimate that the power quality event was likely caused by devices or equipment in the electrical grid that are very close to the first home (e.g., a phase 1 line that transmits power to the first home). In another scenario, the server computing device 106 determines that both Device A and Device B detected the same power quality event at time t. Again, because the server can determine that the two homes are on different phases, the server computing device 106 can estimate that the power quality event was likely caused by devices or equipment in the electrical grid that are further upstream from and transmit power to both of the two homes (e.g., a transformer or substation).

Through estimation of originating locations of power quality events and knowledge of the locations of the installed sensor devices, the server computing device 106 can also generate a topology of one or more portions of the electrical grid servicing a given geographical area through back-mapping. In this context, back-mapping relates to identifying the approximate locations of any of a number of upstream components of the electrical grid that service, directly or indirectly, the locations of one or more sensor devices. As an example, the server computing device 106 can determine that each of a plurality of sensor devices (Group A) in a defined geographical area detected the same power quality event. The server computing device 106 can also determine that one or more other sensor devices (Group B) in the defined geographical area did not detect the same power quality event. Based upon this differential, the server computing device 106 can trace the connectivity of the respective groups of sensor devices back to an upstream location, line and/or piece of equipment in the grid that, e.g., either services both groups of sensor devices or is immediately downstream of the location, line and/or piece of equipment that services both groups of sensor devices. Beneficially, this back-mapping technique does not require any specialized equipment installed in upstream locations in the electrical grid.

Power Quality Index Generation

Figure 24B:
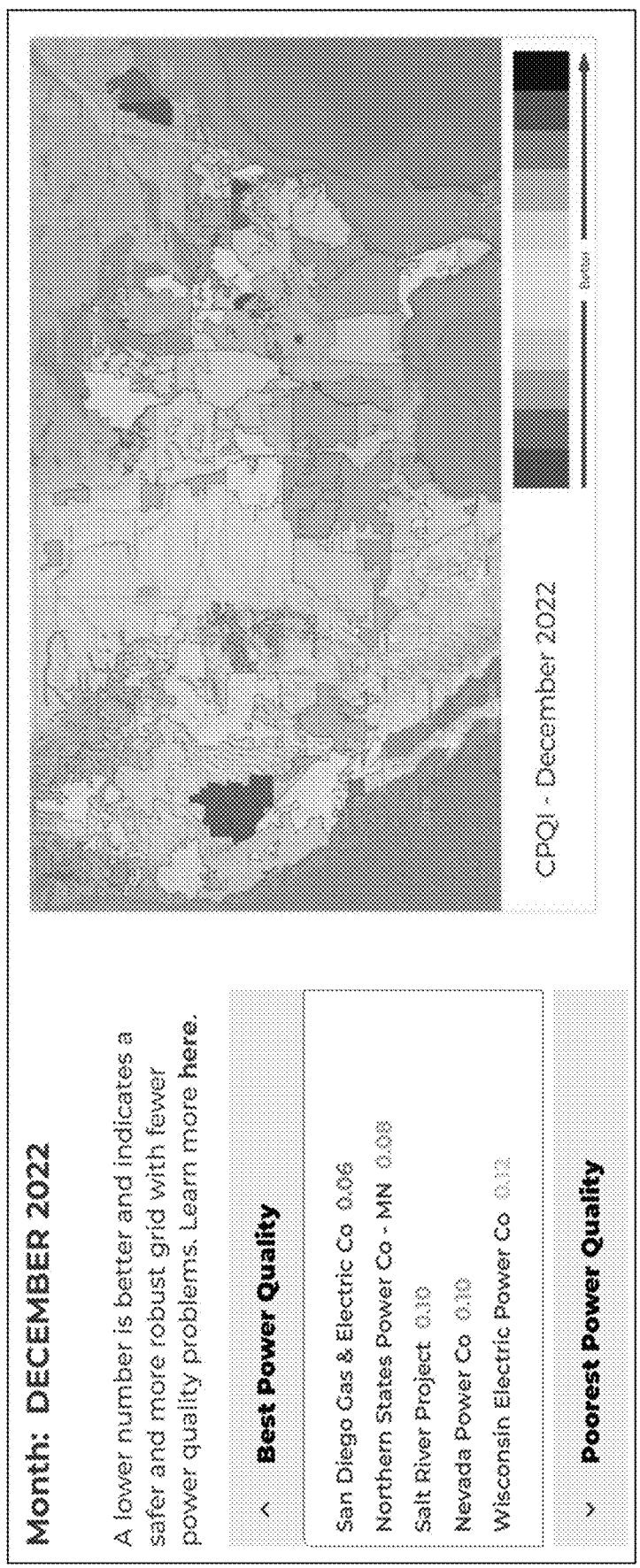
FIG. 24B is a diagram of an exemplary power quality geographic heat map generated by the server computing device from power quality data.

In addition to originating location estimation and back-mapping, the power quality data and associated power quality event determination can be used to measure and rate the power quality, resiliency, and reliability of the power delivered by a given utility provider and/or grid area. In some embodiments, the server computing device 106 calculates a consumer power quality index (CPQI) for a particular provider or grid area over the course of a given period (e.g., one month). The CPQI can factor in power outages/interruptions, brownouts, surges, and other types of power quality events as detected by the network of sensor devices installed in a given area (e.g., city, county, state) and generate a rating or score for each utility provider that services the area. These ratings can be compared with each other to create a ranking of utility providers for consumption by customers, businesses, and government officials via, e.g., graphical representations, maps, charts and other diagrams presented in a computer user interface. FIG. 24A is a diagram of an exemplary power quality ranking grid generated by the server computing device 106 from power quality data and FIG. 24B is a diagram of an exemplary power quality geographic heat map generated by the server computing device 106 from power quality data. Additional details regarding generation and implementation of the CPQI can be found at tingfire.com/grid-safety/cpqi.

Alerting Functionality

Figure 25:
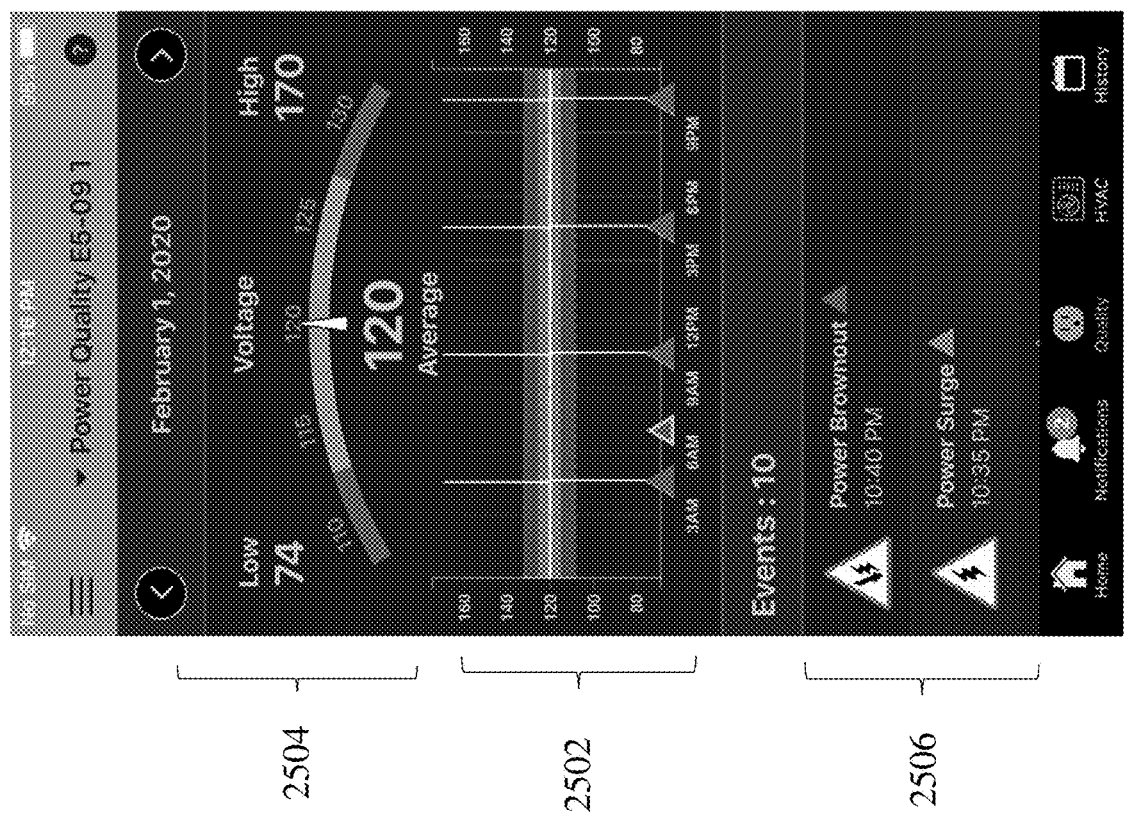
FIG. 25 is a diagram of a user interface displayed on a remote computing device that shows historical Voltage RMS readings detected by a sensor device.
Figure 26:
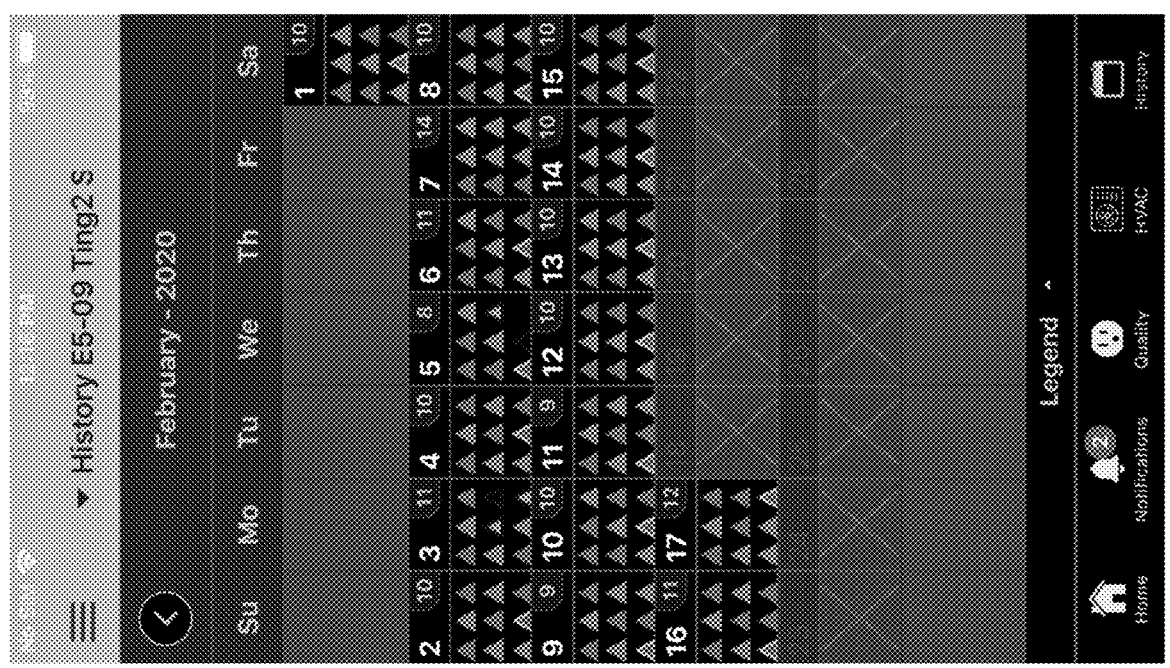
FIG. 26 is a diagram of a user interface displayed on a remote computing device that shows a month's worth of power quality events detected by a sensor device.

As mentioned above, the server computing device 106 and/or the sensor device 102 can be configured to generate alert notifications, reports, maps, charts, and the like for display to users on related remote computing devices. FIG. 25 is a diagram of a user interface displayed on a remote computing device (e.g., a mobile phone) that shows historical RMS voltage (Vrms) readings captured by a sensor device (e.g., sensor device 102). As shown in FIG. 25, the graph 2502 shows the Vrms readings captured by the sensor device 102 over the course of a single day, and the meter 2504 shows the low, high, and average Vrms readings. This user interface provides an easy-to-understand depiction of the power quality for a particular location. The user interface can also include a list 2506 of related power quality events—such as brownouts or power surges. For example, the user interface shows a power brownout occurred at 10:40 pm, designated by a yellow triangle on the graph 2502. The server computing device 106 can also generate a historical calendar view of the power quality events that occurred for a power sensor device 102—as shown in FIG. 26, a user can view a month's worth of power quality events (e.g., brownouts, surges, outages) to get a comprehensive picture of the general power quality of the electrical network that services his or her home.

Figure 27B:
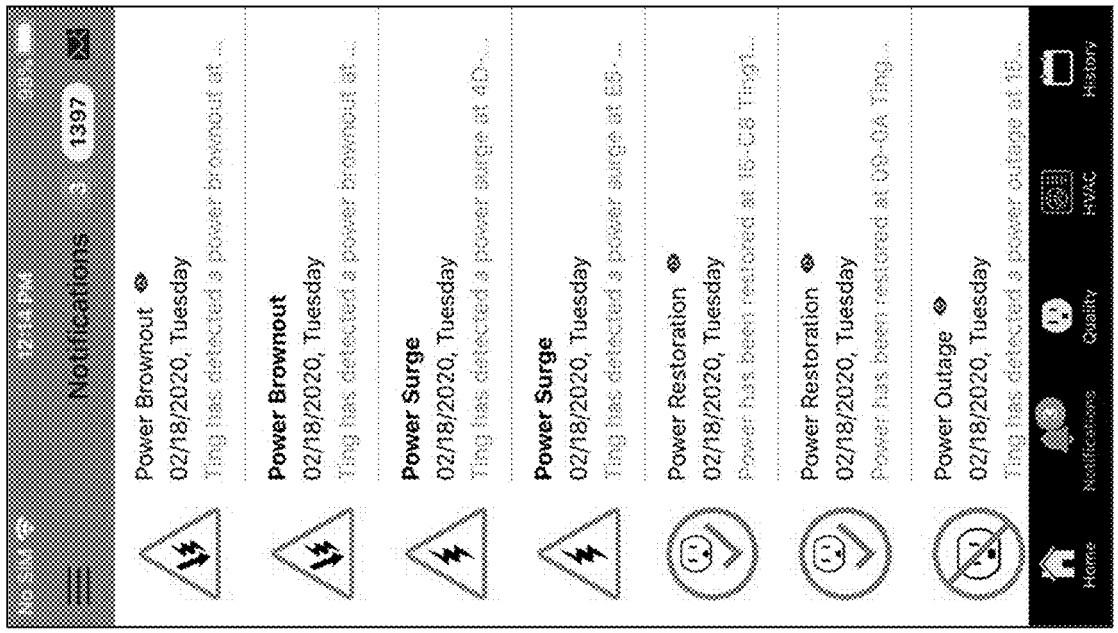
FIG. 27B is a diagram of a user interface that shows a list of power quality notifications relating to a sensor device.
Figure 27A:
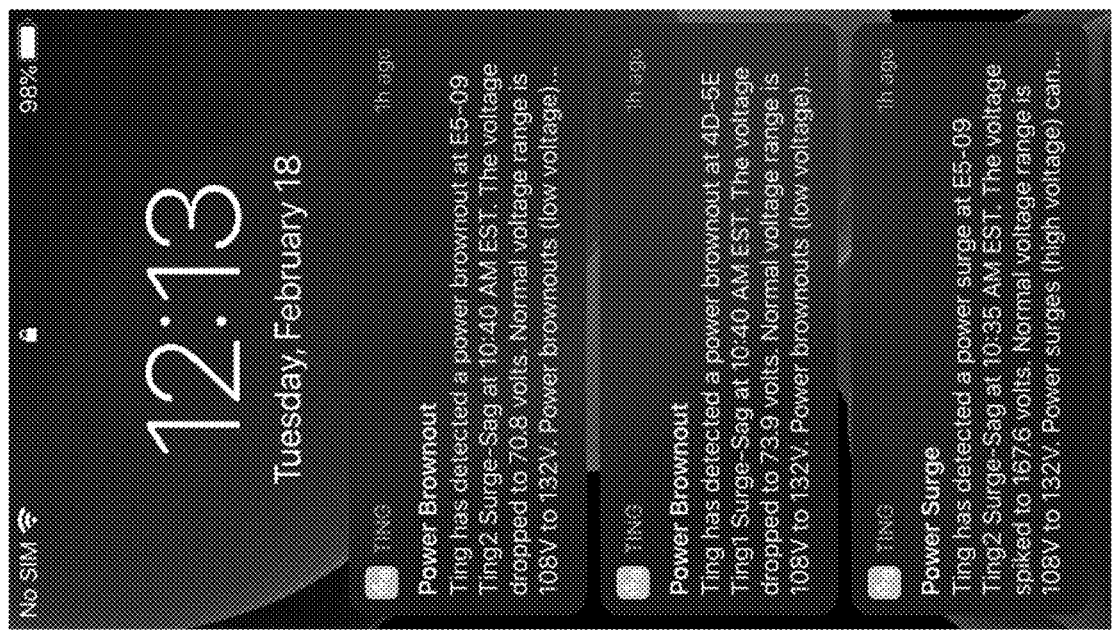
FIG. 27A is a diagram of a user interface that shows push notification alerts sent by the server computing device to a remote computing device for display.
Figure 27D:
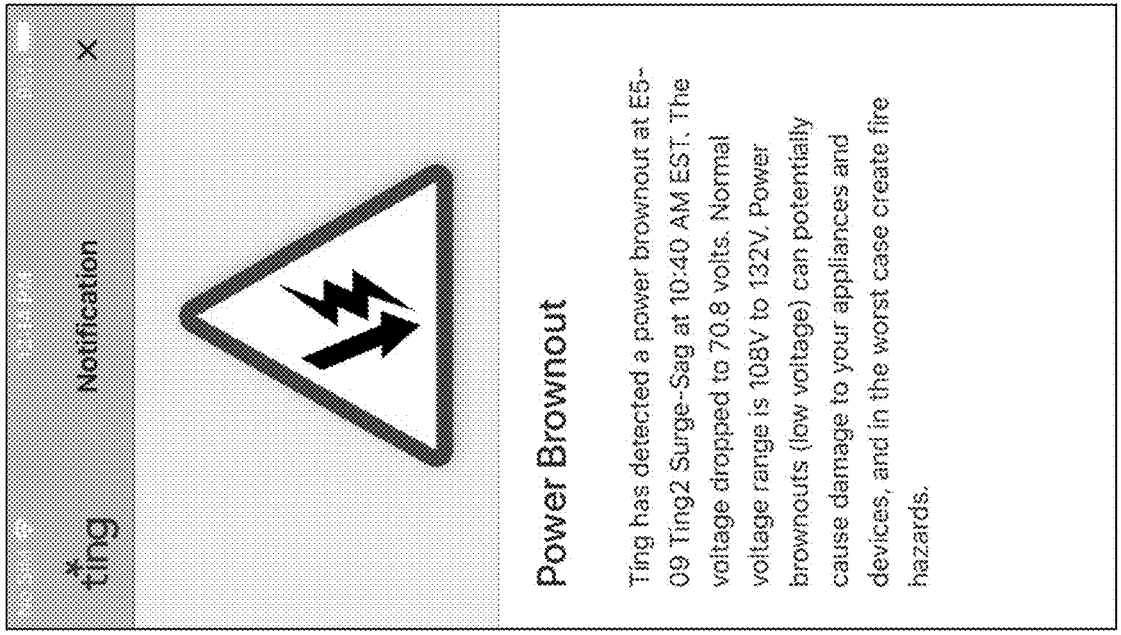
FIG. 27D is a diagram of a user interface that shows a detailed power brownout event alert notification sent by the server computing device to a remote computing device for display.
Figure 27C:
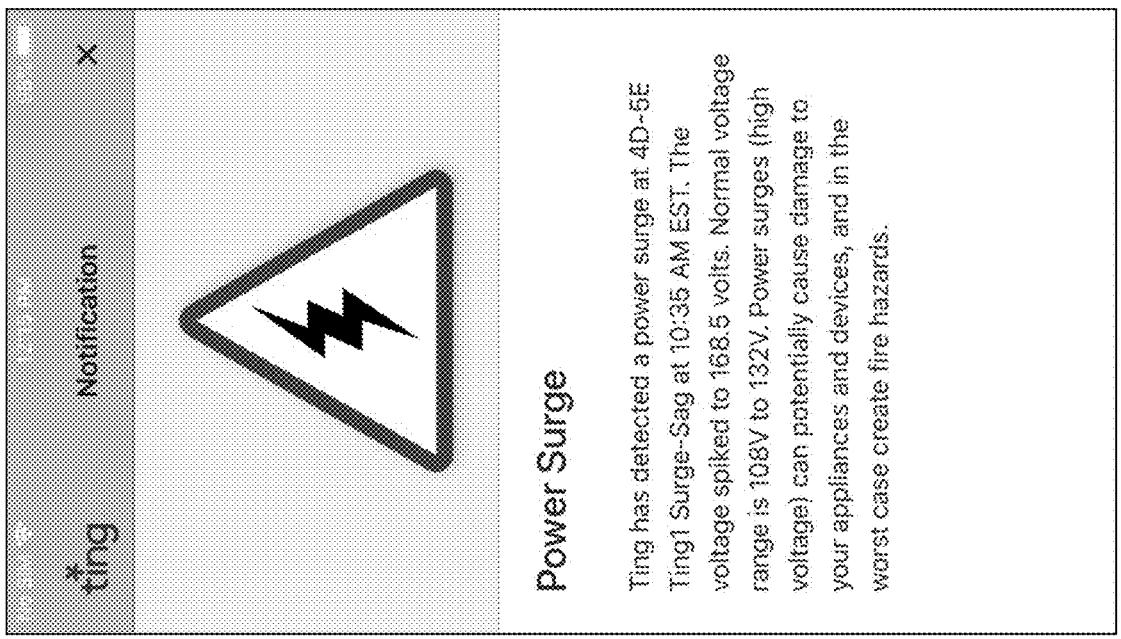
FIG. 27C is a diagram of a user interface that shows a detailed power surge event alert notification sent by the server computing device to a remote computing device for display.
Figure 27E:
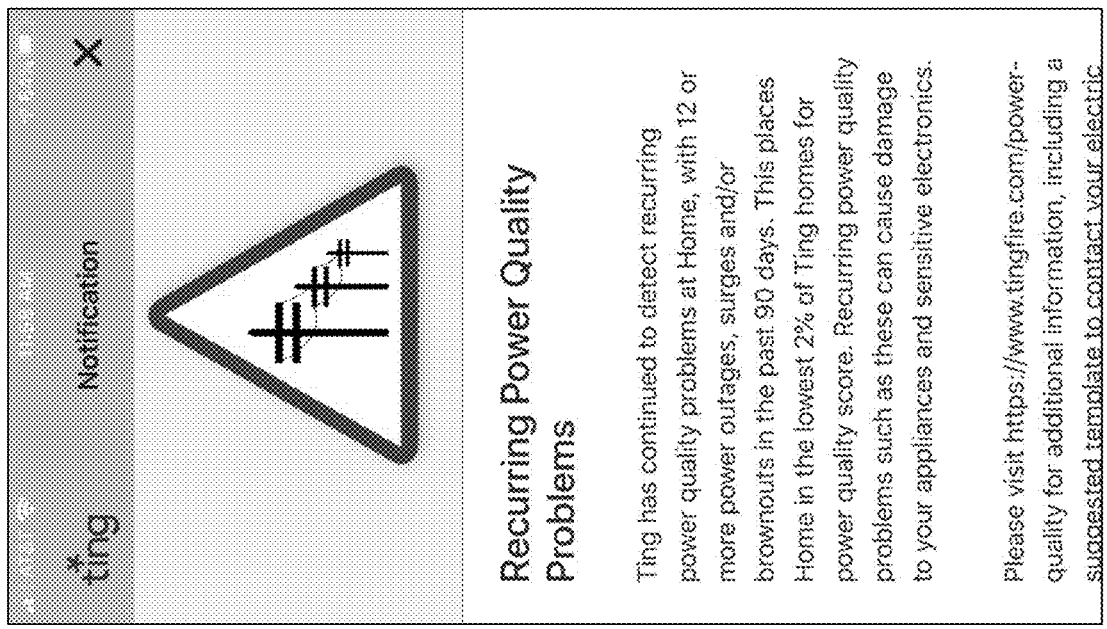
FIG. 27E is a diagram of a user interface that shows a recurring power quality problems alert notification sent by the server computing device to a remote computing device for display.

In conjunction with the power quality reports and graphs described above, the server computing device 106 can also generate and transmit power quality notifications to one or more remote computing devices. FIG. 27A is a diagram of a user interface that shows push notification alerts sent by the server computing device 106 to a remote device for display. As shown in FIG. 27A, the push alerts comprise a description of the related power quality event along with a time that the event occurred. Similarly, FIG. 27B is a diagram of a user interface that shows a list of power quality notifications relating to a sensor device. FIGS. 27C, 27D and 27E are detailed power quality event alert notifications displayed to users of remote computing devices. FIG. 27C is a power surge notification providing the user with detailed information regarding the timing, location (e.g., which sensor device captured the data associated with the event), and voltage reading for the surge event. FIG. 27D is a power brownout notification providing the user with detailed information regarding the timing, location, and voltage reading for the brownout event. FIG. 27E is a recurring power quality problems notification providing the user with detailed information regarding the cadence and amount of power quality problems experienced by a home's electrical system. As a result, the system 100 is configured to automatically generate and transmit these alerts quickly to relevant users so that the users can stay up-to-date on power quality events that affect their home or business.

In addition to event notification messages, the systems and methods described herein can generate maps that display the location of particular power quality events in relation to each other and enables users (e.g., consumers, grid operators, utility companies) to quickly and easily determine whether a particular geographic area is experiencing a type of power quality event that needs to be resolved.

Figure 28A:
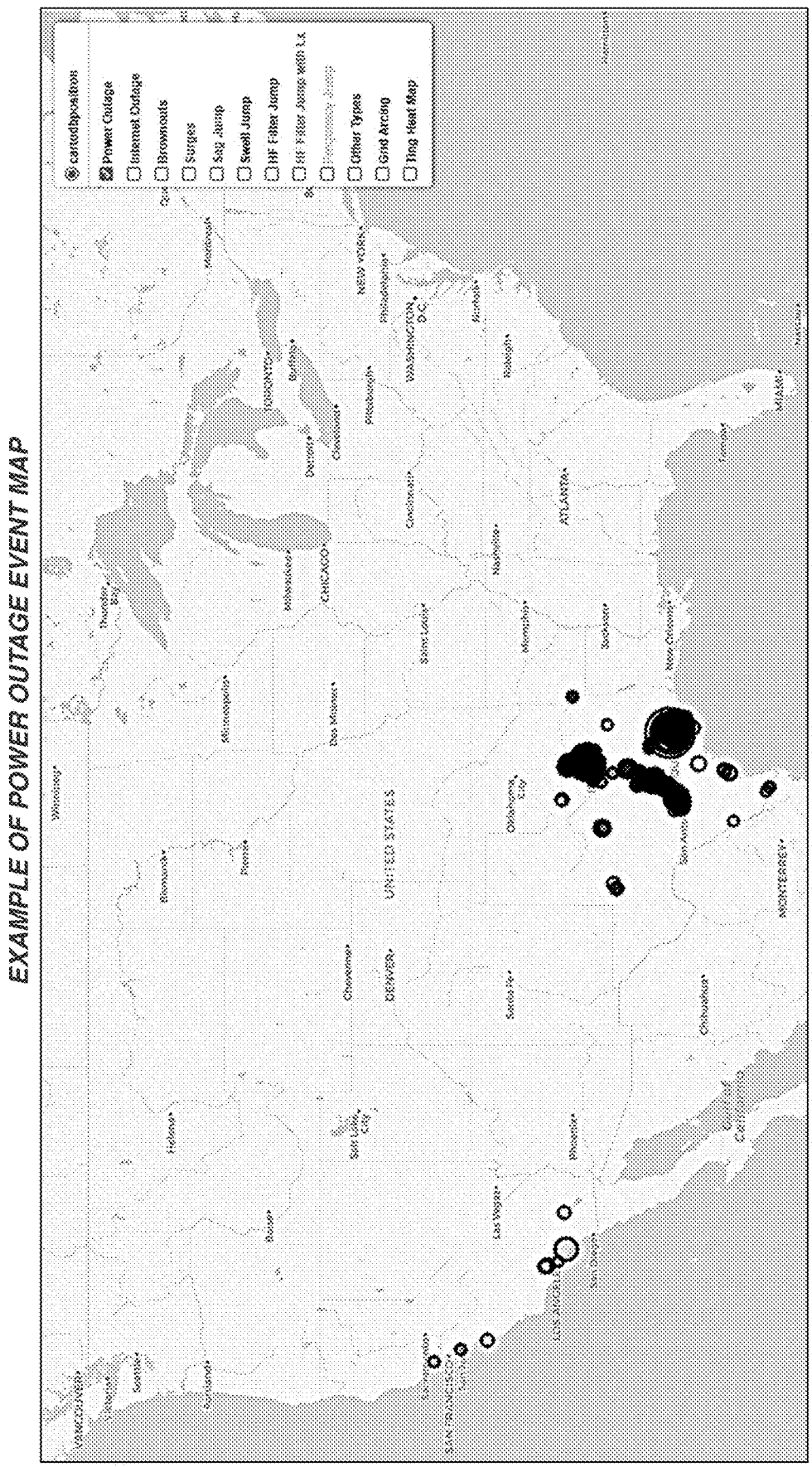
FIG. 28A is a diagram of a geographic map generated by the server computing device that depicts the location of detected power outage events by a network of sensor devices.
Figure 28B:
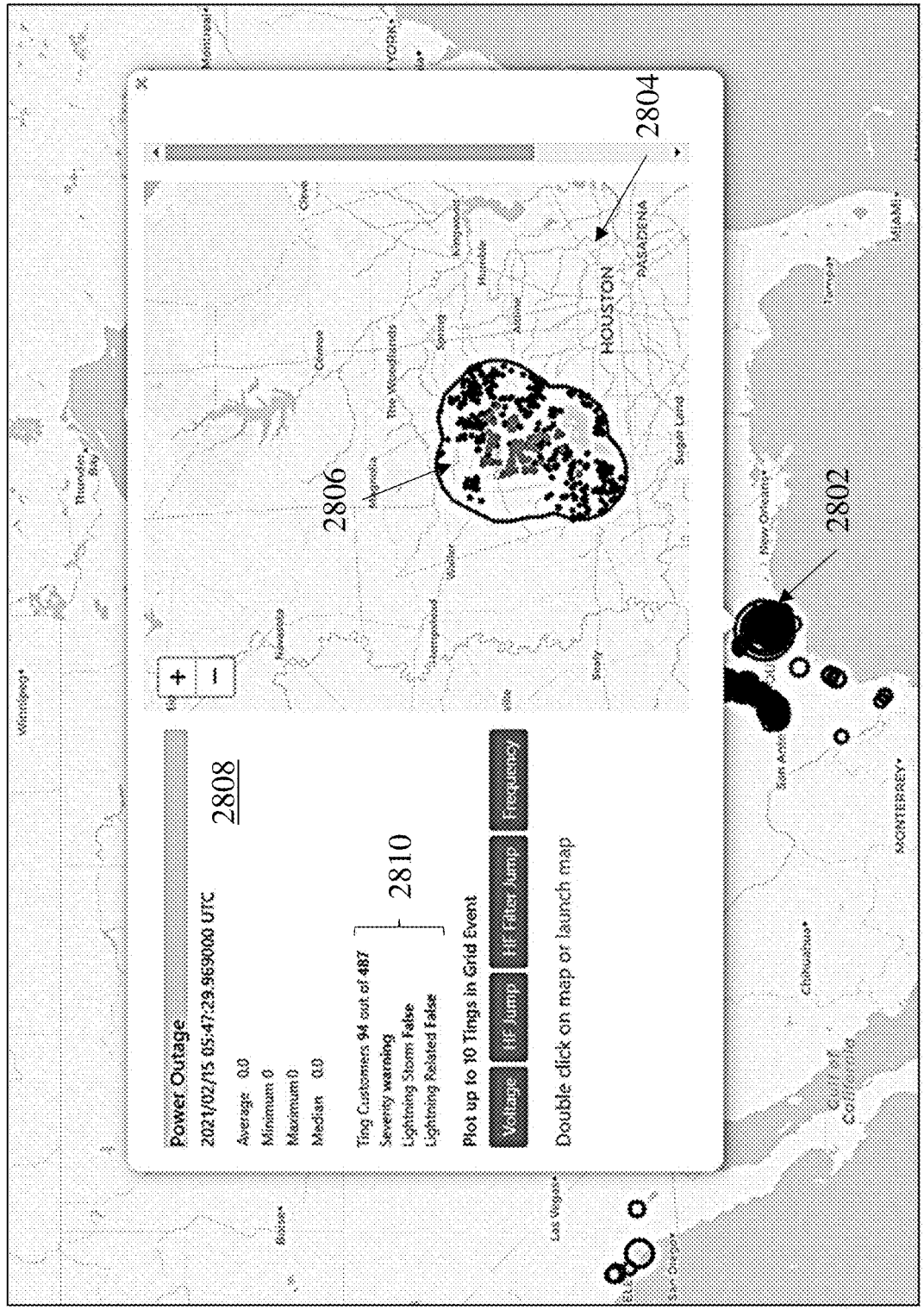
FIG. 28B is a diagram of a detailed view of the geographic map generated by the server computing device that depicts the location of detected power outage events by a network of sensor devices.

FIG. 28A is a diagram of a geographic map generated by the server computing device 106 that depicts the location of detected power outage events by the network of sensor devices. As shown in FIG. 28A, each circle on the map represents one or more power outage events with bigger circles identifying more widespread outages. A user can interact with the map of FIG. 28A (e.g., by clicking on one of the circles) to see a more detailed view of a particular geographic area—as shown in FIG. 28B, where the user selected a power outage event 2802 in the greater Houston, Texas area, and the server computing device 106 generates a zoomed-in view 2804 of the map including a plot 2806 of the specific sensor device locations as well as an information area 2808 that includes details about the outage event, including number of customers affected, a summary of the readings captured by the sensor devices, correlated events 2810 and other power quality data information.

Figure 29A:
FIG. 29A is a diagram of a geographic map generated by the server computing device that depicts the location of detected grid surge and brownout events by a network of sensor devices.
Figure 29B:
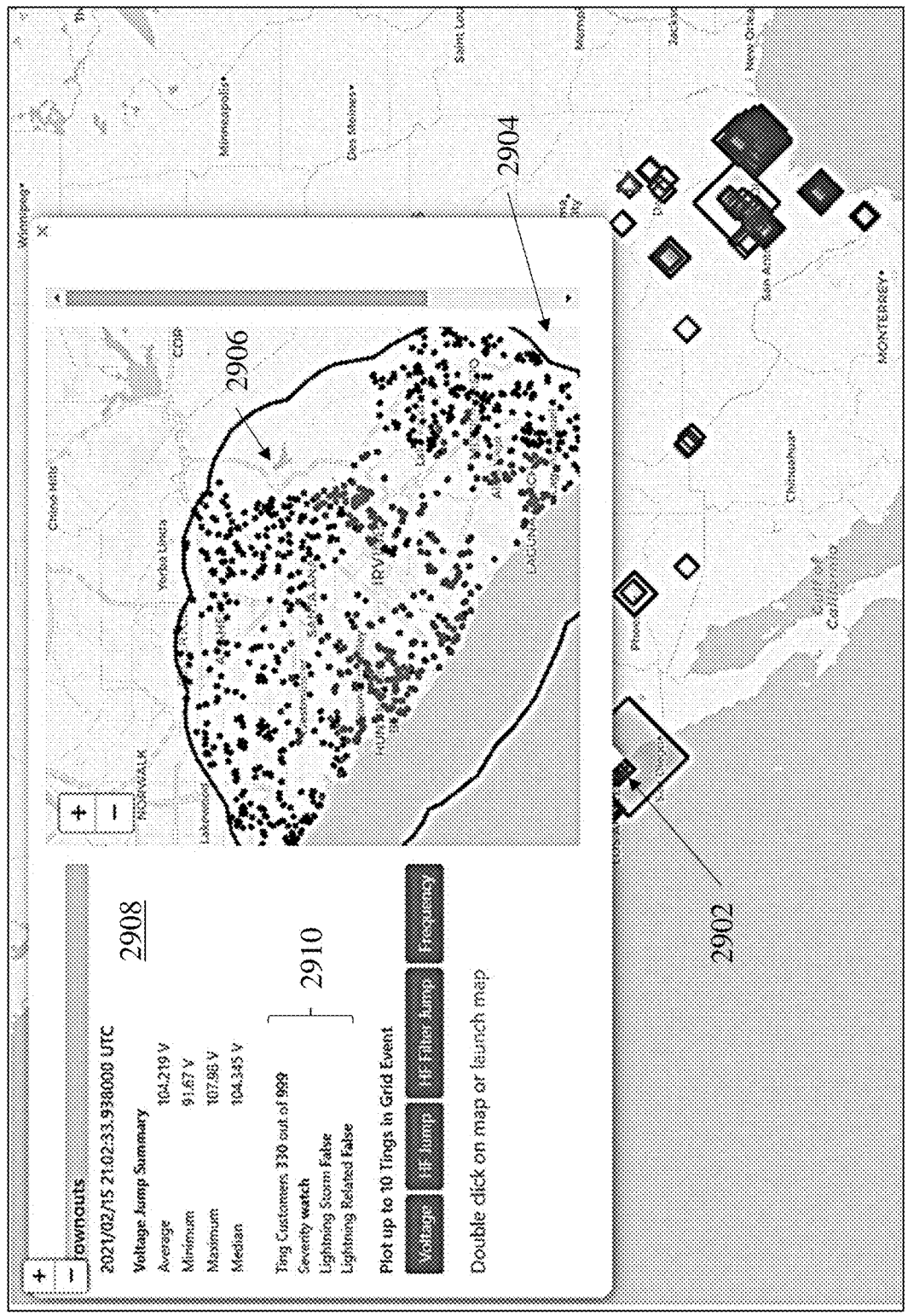
FIG. 29B is a diagram of a detailed view of the geographic map generated by the server computing device that depicts the location of detected grid surge and brownout events by a network of sensor devices.

FIG. 29A is a diagram of a geographic map generated by the server computing device 106 that depicts the location of detected grid surge and brownout events by the network of sensor devices. As shown in FIG. 29A, each diamond on the map represents one or more grid surge and/or brownout events with bigger diamonds identifying more widespread events. A user can interact with the map of FIG. 29A (e.g., by clicking on one of the diamonds) to see a more detailed view of a particular geographic area—as shown in FIG. 29B, where the user selected a brownout event 2902 in the greater Los Angeles area, and the server computing device 106 generates a zoomed-in view 2904 of the map including a plot 2906 of the specific sensor device locations as well as an information area 2908 that includes details about the brownout event, including the number of customers affected, a summary of the readings captured by the sensor devices, correlated events 2910 and other power quality data information.

Figure 30:
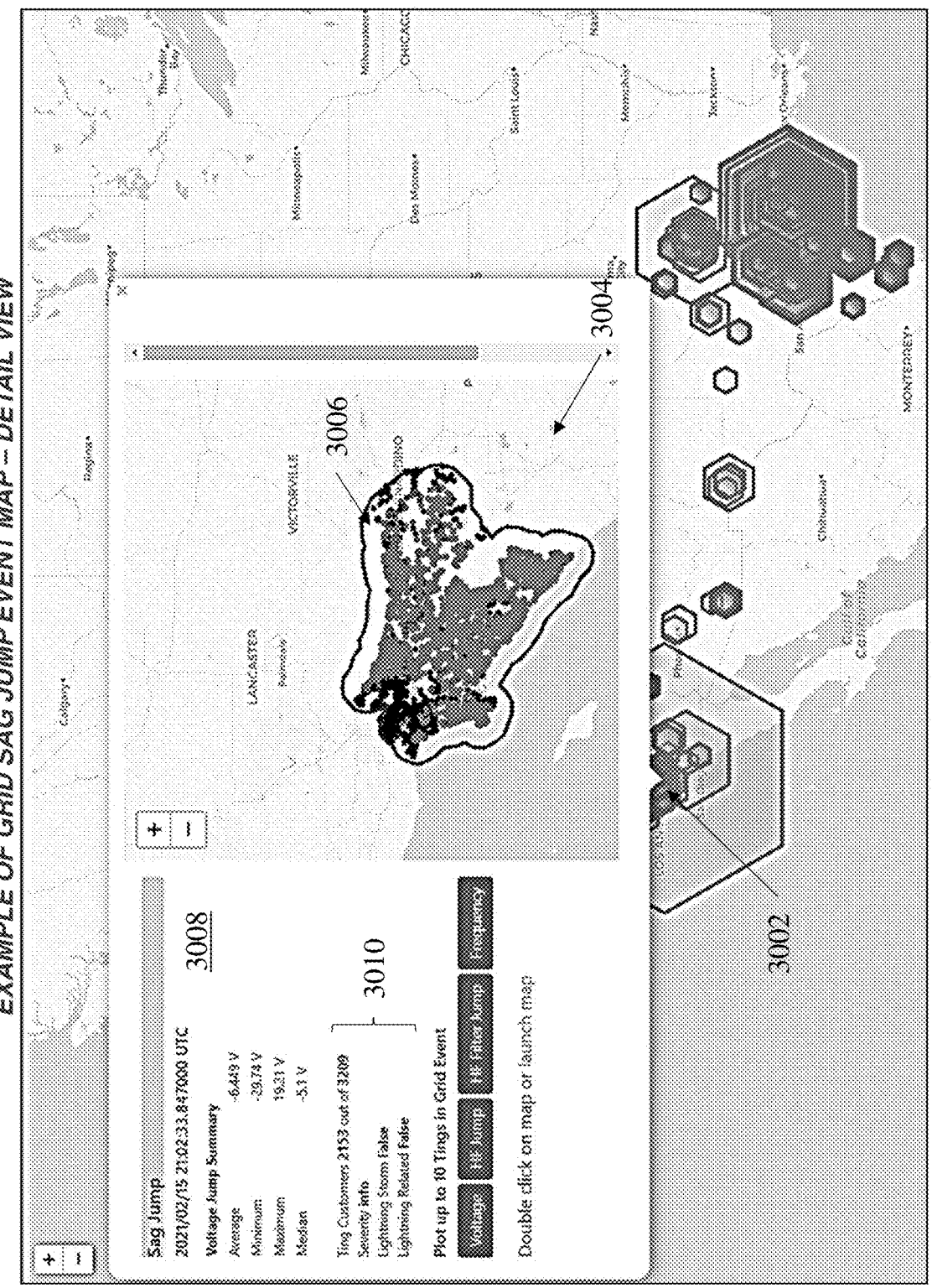
FIG. 30 is a diagram of a detailed view of a geographic map generated by the server computing device that depicts the location of detected grid sag jump events by a network of sensor devices.

Similarly, FIG. 30 is a diagram of detailed view of a map depicting grid sag jump events detected in a particular geographic area (i.e., Los Angeles). As shown in FIG. 30, the user selects a sag jump event 3002 near Los Angeles and the server computing device 106 generates a zoomed-in view 3004 of the map including a plot 3006 of the specific sensor device locations as well as an information area 2808 that includes details about the grid sag jump event, including the number of customers affected, a summary of the readings captured by the sensor devices, correlated events 3010 and other power quality data information.

Figure 31:
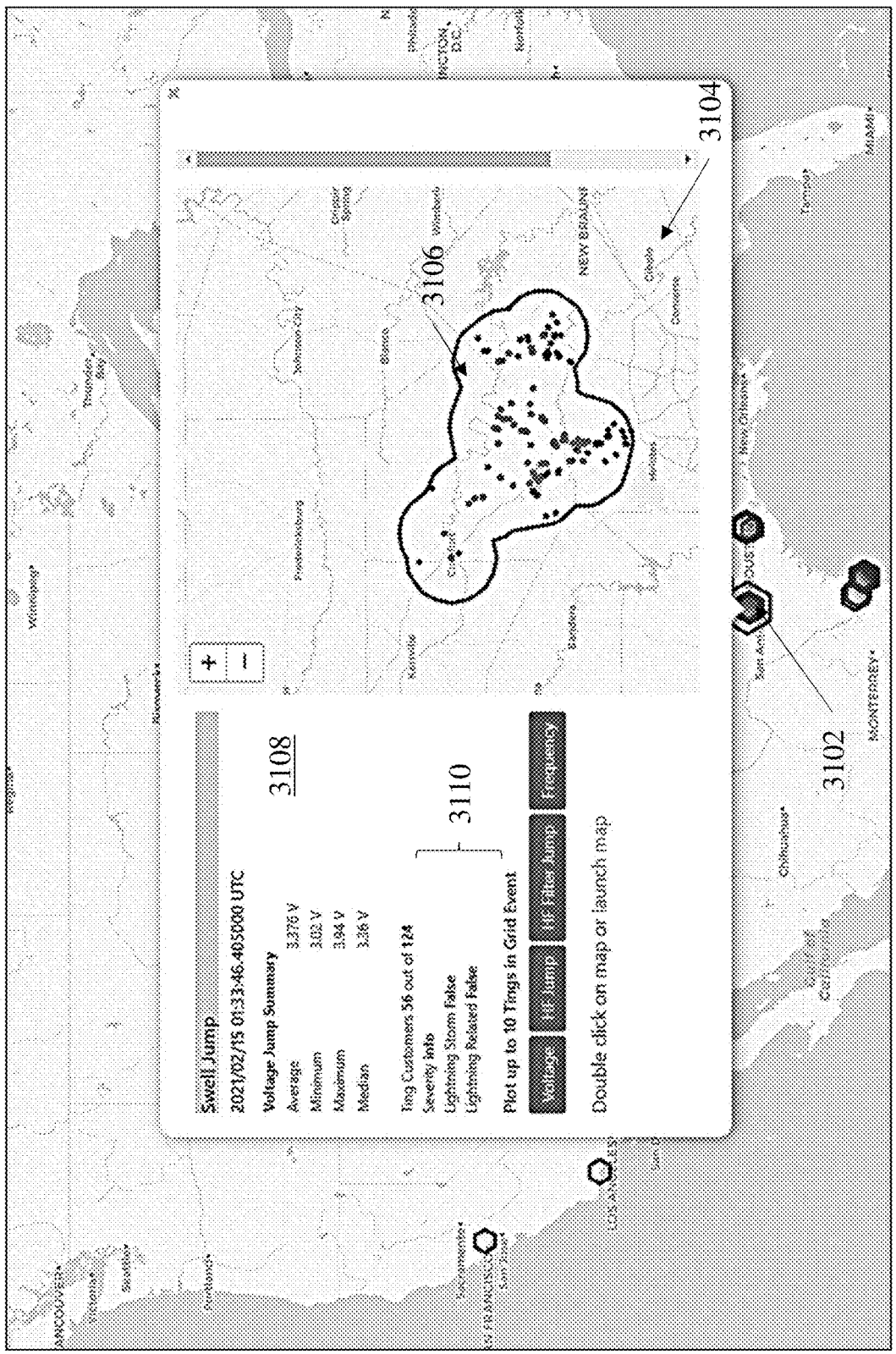
FIG. 31 is a diagram of a detailed view of a geographic map generated by the server computing device that depicts the location of detected grid swell jump events by a network of sensor devices.

FIG. 31 is a diagram of detailed view of a map depicting grid swell jump events detected in a particular geographic area (i.e., near San Antonio, Texas). As shown in FIG. 31, the user selects a swell jump event 3102 near San Antonio and the server computing device 106 generates a zoomed-in view 3104 of the map including a plot 3106 of the specific sensor device locations as well as an information area 3108 that includes details about the swell jump event, including the number of customers affected, a summary of the readings captured by the sensor devices, correlated events 3110 and other power quality data information.

Figure 32A:
FIG. 32A is a diagram of a geographic map generated by the server computing device that depicts the location of detected grid frequency jump events by a network of sensor devices.
Figure 32B:
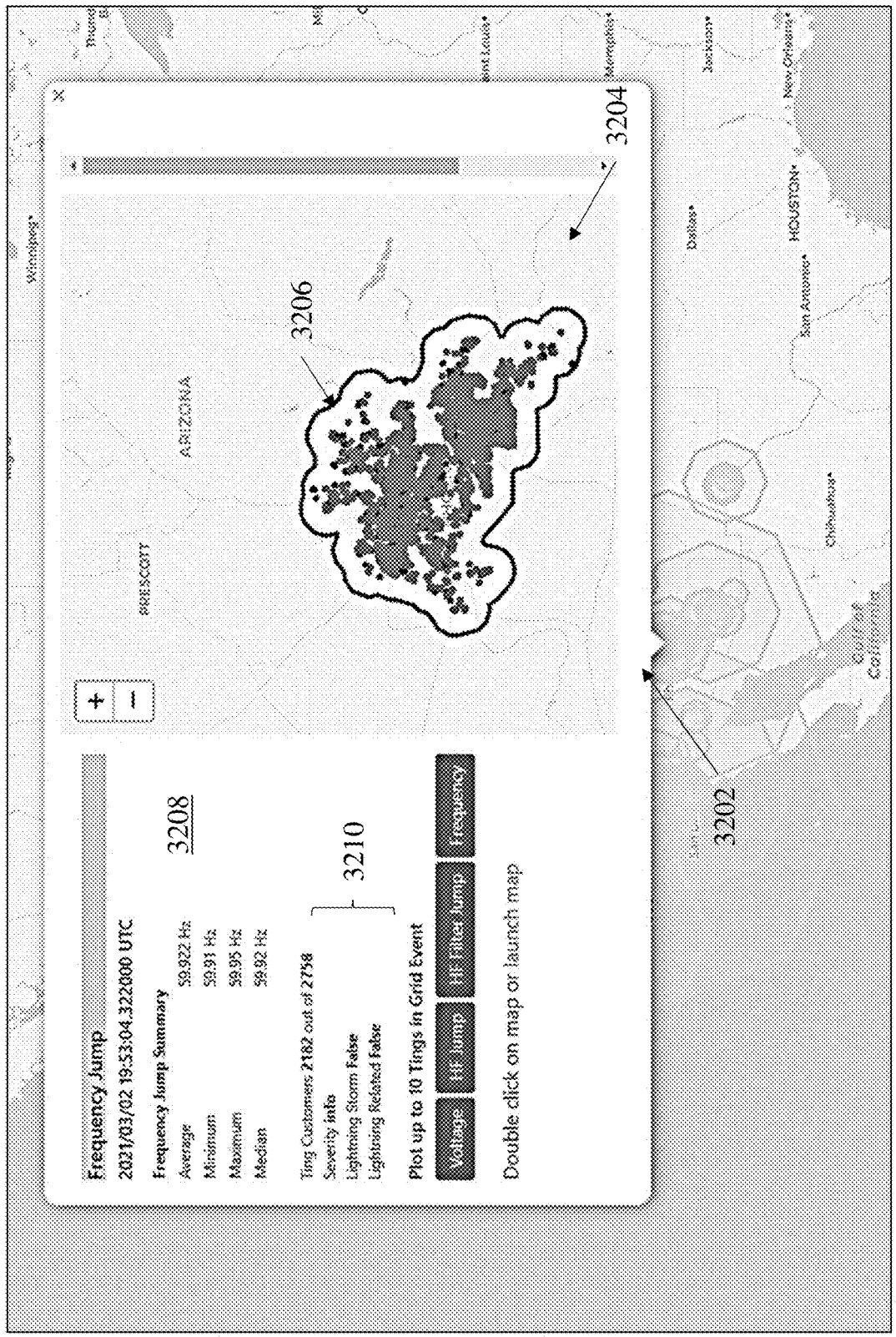
FIG. 32B is a diagram of a detailed view of the geographic map generated by the server computing device that depicts the location of detected grid frequency jump events by a network of sensor devices.

FIG. 32A is a diagram of a geographic map generated by the server computing device 106 that depicts the location of detected grid frequency events by the network of sensor devices. As shown in FIG. 32A, each octagon on the map represents one or more grid frequency events with bigger octagons identifying more widespread events. Like the maps above, a user can interact with the map of FIG. 32A to see a more detailed view of a particular geographic area—as shown in FIG. 32B, where the user selected a frequency event 3202 in the greater Los Angeles area, and the server computing device 106 generates a zoomed-in view 3204 of the map including a plot 3206 of the specific sensor device locations as well as an information area 3208 that includes details about the outage event, including the number of customers affected, a summary of the readings captured by the sensor devices, correlated events 3210 and other power quality data information.

Figure 33:
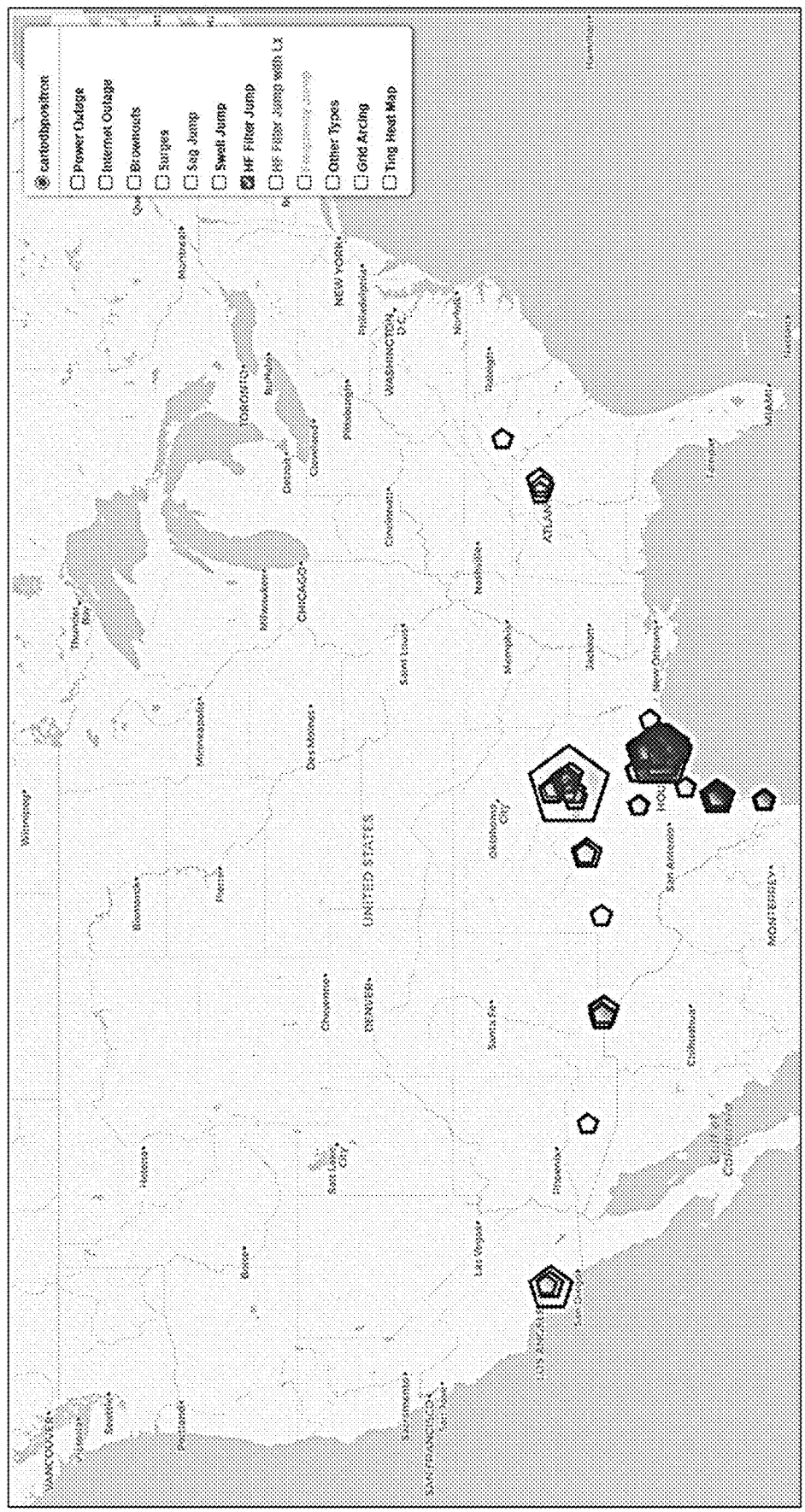
FIG. 33 is a diagram of a geographic map generated by the server computing device that depicts the location of detected high frequency (HF) filter jump events by a network of sensor devices.

FIG. 33 is a diagram of a geographic map generated by the server computing device 106 that depicts the location of detected HF Filter jump events by the network of sensor devices. As shown in FIG. 33, each pentagon on the map represents one or more grid frequency events with bigger pentagons identifying more widespread events. Like the maps above, a user can interact with the map of FIG. 33 to see a more detailed view of a particular geographic area.

It should be appreciated that the server computing device 106 can generate maps that comprise a plurality of different power outage and/or power quality events on the same geographic area. For example, in some embodiments a user can select multiple different events (e.g., in a checkbox menu) and the server computing device 106 can display each type of event using a different indicator, such as a different shape, color, etc.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, smartphone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing devices include, for example, iOS™-based devices such as the iPhone™ and iPad™ available from Apple, Inc., and Android™-based devices such as the Galaxy™ available from Samsung Corp., the Pixel™ available from Google, Inc., and the Kindle Fire™ available from Amazon, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A system for estimating an originating location of a power quality event in an electrical grid, the system comprising:
   a plurality of sensor devices connected to the electrical grid, each sensor device configured to:
   detect an input signal generated by electrical activity on the electrical grid,
   generate an output signal based upon the detected input signal, and
   transmit power quality data to a computing device via a communications network, wherein the power quality data is based upon the output signal; and
   the computing device configured to:
   analyze the power quality data from at least a subset of the sensor devices to determine a power quality event occurring in the electrical grid,
   estimate an originating location of the power quality event based upon the power quality data, and
   transmit a notification to one or more remote computing devices based upon the estimated originating location of the power quality event.

2. The system of claim 1, wherein analyzing the power quality data from at least a subset of the sensor devices to determine a power quality event occurring in the electrical grid comprises:
   generating a signature based upon the power quality data received from the subset of the sensor devices, and
   comparing the generated signature to one or more known power quality event signatures to determine a type of the power quality event.

3. The system of claim 1, wherein the power quality event comprises one or more of:
   a surge event, a surge jump event, a sag event, a sag jump event, a brownout event, a swell jump event, a high frequency (HF) filter jump event, a frequency jump event, a phase angle jump event, a high voltage condition event, a low voltage condition event, an equipment failure event, a vegetation interference event, a conductor slap event, an electrical arcing event, a flicker event, a failing transformer event, or a distributed energy resource (DER) stress event.

4. The system of claim 3, wherein when the power quality event is a DER stress event, the step of generating an output signal based upon the detected input signal comprises determining a harmonic component associated with a waveform detected in the input signal and including a representation of the harmonic component in the output signal.

5. The system of claim 4, wherein the harmonic component comprises a total harmonic distortion (THD) reading associated with the waveform detected in the input signal.

6. The system of claim 4, wherein the computing device determines that the DER stress event is occurring in the electrical grid based upon the harmonic components determined by the sensor devices.

7. The system of claim 6, wherein the computing device estimates the originating location of the DER stress event based upon the physical locations of the sensor devices that determine the harmonic components.

8. The system of claim 7, wherein the DER stress event is attributed to one or more of: a photovoltaic resource connected to the electrical grid, an energy storage resource connected to the electrical grid, or a wind energy generation resource connected to the electrical grid.

9. The system of claim 1, wherein estimating an originating location of the power quality event based upon the power quality data comprises:
   selecting two or more sensor devices each associated with power quality data having one or more common features; and
   estimating the originating location of the power quality event based upon the physical locations of the selected sensor devices.

10. The system of claim 9, wherein the one or more common features comprise one or more of: relative amplitudes of the input signals detected by the two or more sensor devices, relative times of arrival of the input signals detected by the two or more sensor devices, or location coordinates of the two or more sensor devices.

11. The system of claim 1, wherein the computing device is further configured to determine a phase of the detected input signal based upon the power quality data.

12. The system of claim 1, wherein when the power quality event is an equipment failure event, the server computing device is further configured to identify one or more components of the electrical grid causing the equipment failure event based upon the power quality data.

13. The system of claim 12, wherein the components of the electrical grid comprise a plurality of devices including one or more of substations, feeder lines, capacitor banks, transformer taps, voltage regulators, or circuit breakers.

14. The system of claim 1, wherein the computing device is further configured to generate a topology of at least a portion of the electrical grid based upon the power quality data received from at least a subset of the plurality of sensor devices.

15. The system of claim 1, wherein the computing device is further configured to measure resiliency of the electrical grid in a geographic location based upon power quality events associated with the geographic location.

16. The system of claim 15, wherein the computing device associates one or more power quality events with the geographic location based upon power quality data received from at least a subset of the sensor devices associated with the geographic location.

17. The system of claim 16, wherein the computing device generates a power quality index for one or more utilities in the geographic location based upon the power quality events associated with the geographic location.

18. The system of claim 17, wherein the computing device generates a ranking of the one or more utilities in the geographic region based upon the power quality index associated with each utility.

19. A computerized method of estimating an originating location of a power quality event in an electrical grid, the method comprising:
  detecting, by each of a plurality of sensor devices connected to the electrical grid, an input signal generated by electrical activity on the electrical grid;
  generating, by each sensor device, an output signal based upon the detected input signal;
  transmitting, by each sensor device, power quality data to a computing device via a communications network, wherein the power quality data is based upon the output signal;
  analyzing, by the computing device, the power quality data from at least a subset of the sensor devices to determine a power quality event occurring in the electrical grid;
  estimating, by the computing device, an originating location of the power quality event based upon the power quality data; and
  transmitting, by the computing device, a notification to one or more remote computing devices based upon the estimated originating location of the power quality event.

20. The method of claim 19, wherein analyzing the power quality data from at least a subset of the sensor devices to determine a power quality event occurring in the electrical grid comprises:
  generating a signature based upon the power quality data received from the subset of the sensor devices, and
  comparing the generated signature to one or more known power quality event signatures to determine a type of the power quality event.

21. The method of claim 19, wherein the power quality event comprises one or more of: a surge event, a surge jump event, a sag event, a sag jump event, a brownout event, a swell jump event, a high frequency (HF) filter jump event, a frequency jump event, a phase angle jump event, a high voltage condition event, a low voltage condition event, an equipment failure event, a vegetation interference event, a conductor slap event, an electrical arcing event, a flicker event, a failing transformer event, or a distributed energy resource (DER) stress event.

22. The method of claim 21, wherein when the power quality event is a DER stress event, the step of generating an output signal based upon the detected input signal comprises determining a harmonic component associated with a waveform detected in the input signal and including a representation of the harmonic component in the output signal.

23. The method of claim 22, wherein the harmonic component comprises a total harmonic distortion (THD) reading associated with the waveform detected in the input signal.

24. The method of claim 22, wherein the computing device determines that the DER stress event is occurring in the electrical grid based upon the harmonic components determined by the sensor devices.

25. The method of claim 24, wherein the computing device estimates the originating location of the DER stress event based upon the physical locations of the sensor devices that determine the harmonic components.

26. The method of claim 25, wherein the DER stress event is attributed to one or more of: a photovoltaic resource connected to the electrical grid, an energy storage resource connected to the electrical grid, or a wind energy generation resource connected to the electrical grid.

27. The method of claim 19, wherein estimating an originating location of the power quality event based upon the power quality data comprises:
  selecting two or more sensor devices each associated with power quality data having one or more common features; and
  estimating the originating location of the power quality event based upon the physical locations of the selected sensor devices.

28. The method of claim 27, wherein the one or more common features comprise one or more of: relative amplitudes of the input signals detected by the two or more sensor devices, relative times of arrival of the input signals detected by the two or more sensor devices, or location coordinates of the two or more sensor devices.

29. The method of claim 19, wherein the computing device is further configured to determine a phase of the detected input signal based upon the power quality data.

30. The method of claim 19, wherein when the power quality event is an equipment failure event, the server computing device is further configured to identify one or more components of the electrical grid causing the equipment failure event based upon the power quality data.

31. The method of claim 30, wherein the components of the electrical grid comprise a plurality of devices including one or more of substations, feeder lines, capacitor banks, transformer taps, voltage regulators, or circuit breakers.

32. The method of claim 19, wherein the computing device is further configured to generate a topology of at least a portion of the electrical grid based upon the power quality data received from at least a subset of the plurality of sensor devices.

33. The method of claim 19, wherein the computing device is further configured to measure resiliency of the electrical grid in a geographic location based upon power quality events associated with the geographic location.

34. The method of claim 33, wherein the computing device associates one or more power quality events with the geographic location based upon power quality data received from at least a subset of the sensor devices associated with the geographic location.

35. The method of claim 34, wherein the computing device generates a power quality index for one or more utilities in the geographic location based upon the power quality events associated with the geographic location.

36. The method of claim 35, wherein the computing device generates a ranking of the one or more utilities in the geographic region based upon the power quality index associated with each utility.

* * * * *